(12) United States Patent
Takagi

(10) Patent No.: US 7,385,918 B2
(45) Date of Patent: Jun. 10, 2008

(54) PACKET PROTECTION METHOD AND TRANSMISSION DEVICE IN RING NETWORK, AND PROGRAM THEREFOR

(75) Inventor: Kazuo Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 1095 days.

(21) Appl. No.: 10/364,519

(22) Filed: Feb. 12, 2003

(65) Prior Publication Data

US 2003/0152027 A1    Aug. 14, 2003

(30) Foreign Application Priority Data

Feb. 13, 2002  (JP) .............................. 2002-035160

(51) Int. Cl.
*H04L 1/00*  (2006.01)
(52) U.S. Cl. ..................... 370/222; 370/216; 370/397
(58) Field of Classification Search ............... 370/222, 370/216, 218, 228, 225, 223, 227; 379/221.01, 379/221.03, 221.04; 709/239; 340/827
See application file for complete search history.

(56) References Cited

U.S. PATENT DOCUMENTS

| | | | | |
|---|---|---|---|---|
| 5,267,238 A * | 11/1993 | Yano et al. | .................. | 370/452 |
| 5,442,620 A * | 8/1995 | Kremer | ...................... | 370/224 |
| 5,469,428 A * | 11/1995 | Tokura et al. | ............... | 370/224 |
| 5,859,836 A * | 1/1999 | Eslambolchi | ................ | 370/222 |
| 5,982,747 A * | 11/1999 | Ramfelt et al. | ............. | 370/224 |
| 6,091,705 A * | 7/2000 | Regula | ........................ | 370/223 |
| 6,177,139 B1 * | 1/2001 | Rouvelin | ..................... | 118/663 |
| 6,269,452 B1 * | 7/2001 | Daruwalla et al. | ............. | 714/4 |
| 6,324,280 B2 * | 11/2001 | Dunn et al. | .................. | 379/230 |
| 6,400,682 B1 * | 6/2002 | Regula | ........................ | 370/223 |
| 6,952,396 B1 * | 10/2005 | Cottreau et al. | ............ | 370/222 |
| 6,973,028 B1 * | 12/2005 | Huai et al. | ................... | 370/222 |
| 2001/0038633 A1 * | 11/2001 | Robertson et al. | .......... | 370/412 |
| 2002/0141334 A1 * | 10/2002 | Deboer et al. | .............. | 370/227 |
| 2002/0191538 A1 * | 12/2002 | Ono | ............................ | 370/222 |
| 2003/0152027 A1 * | 8/2003 | Takagi | ........................ | 370/222 |

(Continued)

FOREIGN PATENT DOCUMENTS

JP            02079636        *   3/1990   .................. 370/222

(Continued)

OTHER PUBLICATIONS

Bellcore, "Sonet Bidirectional Line-Switched Ring Equipment Generic Criteria", A Module of TSGR, FR-440, GR-1230-CORE, Dec. 4, 1998, 276 pages total.

*Primary Examiner*—Hassan Kizou
*Assistant Examiner*—Mounir Moutaouakil
(74) *Attorney, Agent, or Firm*—McGinn IP Law Group, PLLC

(57) ABSTRACT

Two transmission devices connected to a link in which a failure occurs turn back a ring. Other transmission device changes a transmission ring of an NNI packet which is a UNI packet whose transmission source is its own transmission device and which had been transmitted through the link before the failure occurs to have a reverse direction. In addition, each transmission device, upon receiving an NNI packet whose transmission destination NNI address is one or any one of a plurality of NNI addresses applied to its own transmission device, outputs the packet to a self-owned tributary port irrespectively of whether it is sent through an inner ring or an outer ring.

21 Claims, 34 Drawing Sheets

U.S. PATENT DOCUMENTS

2005/0002329 A1 * 1/2005 Luft et al. .................. 370/222

FOREIGN PATENT DOCUMENTS

| JP | 05-268235 | 10/1993 |
| JP | 07-212381 | 8/1995 |
| JP | 08-316978 | 11/1996 |
| JP | 09-093278 | 4/1997 |
| JP | 2001-053772 | 2/2001 |

* cited by examiner

PACKET PROTECTION METHOD AND TRANSMISSION DEVICE IN RING NETWORK, AND PROGRAM THEREFOR

BACKGROUND OF THE INVENTION

1. Field of the Invention

The present invention relates to a technique for packet protection in a packet transfer ring.

2. Description of the Related Art

With an increase in data system traffic whose representative is IP, efficient transmission of data is demanded from conventional communication service providers (hereinafter referred to as carriers) which provide transmission service mainly for voice. Together with the demand, as highly reliable protection method as "SONET, GR-1230-Core, Issue 3 Dec. 1996 Bellcore" on which conventional transmission networks base is demanded also in a data transmission network. Among highly reliable protection methods in data transmission networks is Spatial Reuse Protocol (hereinafter referred to as SRP)(RFC 2982 IETF).

With reference to FIGS. 22 to 25, a protection method using the conventional SRP will be described.

FIG. 22 is a block diagram showing an example of a structure of a transmission device which executes protection using the SRP. A transmission device 100 includes link monitors 110 and 111, a failure information collection unit 120, Add/Drop 130 and 131, Wrap switches 140 and 141, frame conversion units 150 and 151, inverse frame conversion units 152 and 153, Trb-UNI switches (UNI tributary packet switches) 160 and 161 and a UNI forwarding table 170.

The link monitors 110 and 111 each monitor a failure condition of an input link 101-IN of an inner ring and an input link 102-IN of an outer ring and when detecting a failure, notify the failure information collection unit 120 of link failure information indicative of the detected failure.

When notified link failure information by the link monitors 110 and 111, the failure information collection unit 120 generates a ring network failure information notification packet containing the link failure information and transmits the packet to other transmission device through the Add/Drop 130 and 131, as well as switching an operation mode of the Wrap switch 140 or the Wrap switch 141 from a pass mode to a Wrap mode according to the input link having the failure. When the failure occurs in the input link 101-IN, switch the Wrap switch 141 to the Wrap mode and when the failure occurs in the input link 102-IN, switch the Wrap switch 140 to the Wrap mode.

When a ring network failure information notification packet sent from other transmission device indicates that a failure occurs in an output link of the inner ring or the outer ring directly connected to its own transmission device 100, the failure information collection unit 120 switches the operation mode of the Wrap switch 140 or the Wrap switch 141 from the pass mode to the Wrap mode according to the output link in which the failure occurs. When the failure occurs in an output link 101-OUT of the inner ring, switch the Wrap switch 140 to the Wrap mode and when the failure occurs in an output link 102-OUT of the outer ring, switch the Wrap switch 141 to the Wrap mode.

The Add/Drop 130 and 131 decipher a kind of an NNI packet (packet for use in a ring) applied from the link monitors 110 and 111, the Wrap switches 140 and 141, the Trb-UNI switches 160 and 161 or the failure information collection unit 120 and a transfer destination NNI address of the NNI packet and when the kind indicates a ring network failure information notification packet, drop the packet into the failure information collection unit 120, when the kind indicates a data packet which is an NNI packet to be terminated at its own transmission device, drop the packet into the inverse frame conversion units 152 and 153 and when the kind indicates other kind of NNI packet, pass the packet through the Wrap switches 140 and 141. Here, to the transmission device 100, two MAC addresses #A and #B are assigned and the Add/Drop 130 drops only an NNI packet whose transfer destination NNI address is #A into the inverse frame conversion unit 152, while the Add/Drop 131 drops only an NNI packet whose transfer destination NNI address is #B into the inverse frame conversion unit 153.

The Wrap switches 140 and 141 have their modes controlled by the failure information collection unit 120 and transfer NNI packets applied from the Add/Drop 130 and 131 to the output links 101-OUT and 102-OUT of the inner ring and the outer ring, respectively, at the time of the pass mode and transfer the same to the Add/Drop 131 and 130, respectively, at the time of the Wrap mode.

When a UNI packet (user packet sent from a network or a terminal connected to a tributary port) is sent through the Trb-UNI switch 160, the frame conversion units 150 and 151 derive a transmission destination NNI address based on its transmission destination UNI address, convert the packet into an NNI packet having the transmission destination NNI address and a predetermined transmission source NNI address and transfer the obtained packet to the Add/Drop 130 and 131. The frame conversion unit 150 applies #A as a transmission source NNI address of the NNI packet and the frame conversion unit 151 applies #B as a transmission source NNI address of the NNI packet.

The inverse frame conversion units 152 and 153 convert an NNI packet into a UNI packet and send the converted packet to a tributary port 103-OUT.

The Trb-UNI switches 160 and 161 transfer a UNI packet to a desired output port with reference to a transfer destination address of the UNI packet and the UNI forwarding table 170.

FIGS. 23A and 23B show two-fiber rings with transmission devices 100-1 to 100-6 connected in a ring through an inner ring 101 and an outer ring 102. Each of the transmission device 100-1 to 100-6 has the same structure as that of the transmission device 100 shown in FIG. 22. In addition, the inner ring 101 is composed of links 101-1 to 101-6 to transfer a packet counterclockwise and the outer ring 102 is composed of links 102-1 to 102-6 to transfer a packet clockwise.

With reference to FIGS. 23A and 23B, description will be made of an SRP protection method in a case where a failure occurs in the links 101-5 and 102-5 between the transmission devices 100-5 and 100-6. It is assumed that before the failure occurs, a UNI packet sent from a terminal 210 is converted into an NNI packet at the transmission device 100-1 and after being transferred to the transmission device 100-4 through the inner ring 101, again converted into a UNI packet and then transferred to the terminal 211 as indicated on a path 201 shown in FIG. 23A.

When detecting failures in the links 101-5 and 102-5, respectively, the link monitors 110 and 111 of the transmission devices 100-5 and 100-6 notify the failure information collection units 120 in their own devices of the failures.

Responsively, the failure information collection unit 120 of the transmission device 100-5 switches the Wrap switch 141 from the pass mode to the Wrap mode. The failure information collection unit 120 also generates a ring network failure information notification packet indicative of a failure occurring in the link 101-5 and sends the packet to the inner ring 101 through the Add/Drop 130.

In the same manner, the failure information collection unit 120 of the transmission device 100-6 switches the Wrap switch 140 from the pass mode to the Wrap mode. The failure information collection unit 120 also generates a ring network failure information notification packet indicative of a failure occurring in the link 102-5 and sends the packet to the outer ring 102 through the Add/Drop 131.

The failure information collection units 120 of other transmission devices than 100-5 and 100-6 refer to the ring network failure information notification packets notified through the inner ring 101 and the outer ring 102 to transfer the packets as they are to the subsequent transmission devices.

Upon receiving the ring failure information notification packet indicating that a failure occurs in the link 102-5 which is sent from the transmission device 100-6, the failure information collection unit 120 in the transmission device 100-5 switches the Wrap switch 141 to the Wrap mode when the switch is at the pass mode. Since the switch is already at the Wrap mode in this case, no mode switching processing is conducted. Squelching of the ring network failure information notification packet is also conducted.

Similarly, upon receiving the ring failure information notification packet indicating that a failure occurs in the link 101-5 which is sent from the transmission device 100-5, the failure information collection unit 120 in the transmission device 100-6 switches the Wrap switch 140 to the Wrap mode when the switch is at the pass mode. Since the switch is already at the Wrap mode in this case, no mode switching processing is conducted. Squelching of the ring network failure information notification packet is also conducted.

As a result, the NNI packet sent from the transmission device 100-1 is transferred from the transmission device 100-1 to the transmission device 100-6 by using the inner ring 101, then turned back at the transmission device 100-6 as indicated in the path 202 shown in FIG. 23B, passed in the outer ring 102 through the transmission devices 100-1 to 100-4, again wrapped by the transmission device 100-5 and transferred to the transmission device 100-4 by using the inner ring 101. The NNI packet applied through the inner ring 101 to the transmission device 100-4 is converted into a UNI packet and then transferred to the desired terminal 211.

By thus using the SRP protection method, even when a fiber failure occurs, packets can be transferred to a desired transmission device by detouring around a failure section.

Since in SRP protection, a packet is wrapped by transmission devices at opposite ends sandwiching a failure point, at a section between one wrap point and a transmission source transmission device (i.e. a section between the transmission device 100-6 and the transmission device 100-1 in FIG. 23B) and a section between the other wrap point and a reception side transmission device (i.e. a section between the transmission device 100-4 and the transmission device 100-5 in FIG. 23B), twice a band is required for transferring a certain NNI packet to result in deteriorating band efficiency.

In the SRP protection method, when the transmission device 100-4 has a transmission failure as shown in FIG. 24A or when a multiple failure occurs at the links 101-3, 101-4, 102-3 and 102-4 as shown in FIG. 24B, an NNI packet transferred from the transmission device 100-1 to the transmission device 100-4 is wrapped at the transmission devices 100-3 and 100-5 at the opposite ends sandwiching the failure occurring position, so that it can not reach the transmission device 100-4 and makes a round of the network to be terminated at the input link 101-1 of the transmission source transmission device 100-1. When the NNI packet is thus unable to reach the transfer destination transmission device (when the NNI packet becomes an unreachable packet), the NNI packet wastefully uses a network band.

Also when the network is arranged such that a terminal 211 is connected to an Ethernet switch 410, and the Ethernet switch 410 and the transmission devices 100-4 and 100-3 are connected (dual homing) through an actual use port 401 and a spare port 402, respectively, as illustrated in FIG. 25, since a transmission destination address of an NNI packet to be transmitted to the terminal 211 is a MAC address applied to the transmission device 100-4, the transmission device 100-3 is unable to recognize the NNI packet as a self-addressed NNI packet and is therefore unable to process the NNI packet. As a result, when the transmission device 100-4 connected to the actual use port 401 has a transmission device failure, although a transfer path exists from the terminal 210 to the terminal 211 using the spare port 402, the packet becomes an unreachable NNI packet to result in deteriorating a failure recovery rate.

SUMMARY OF THE INVENTION

An object of the present invention is, when a failure occurs in a network, to efficiently use network resources to protect a packet, as well as increasing a failure recovery rate.

According to the first aspect of the invention, a packet protection method in a ring network in which a plurality of transmission devices having a tributary port are connected in a ring by an inner ring and an outer ring whose packet transfer directions are different from each other, wherein out of two transmission devices connected to a link in which a failure occurs, a transmission device having the link as an output link turns a transmission ring of an NNI packet passing through the link in which the failure occurs back to a reverse transmission ring, and each the transmission device, when receiving an NNI packet whose transmission destination NNI address is one or any one of a plurality of NNI addresses applied to its own transmission device, outputs either of the NNI packets sent through the inner ring and through the outer ring to the tributary port that its own transmission device has.

In the preferred construction, the transmission device which detects a failure in an input link connected to its own transmission device transmits a ring network failure information notification packet indicative of the occurrence of the failure in the input link to other transmission device, and out of the other transmission devices having received the ring network failure information notification packet, a transmission device not connected to the link in which the failure occurs changes a transmission ring of an NNI packet whose transmission source is its own transmission device and which had been transmitted through the input link before the failure occurs in the input link into a ring reverse to the ring used before the failure occurs in the input link.

In another preferred construction, each the transmission device, when determining that a received NNI packet is an NNI packet which is turned back by other transmission device and whose transmission source is its own transmission device, changes a transmission ring of an NNI packet whose transmission source is its own transmission device and whose transmission destination NNI address is the same as the address of the received NNI packet into a reverse ring.

In another preferred construction, out of the two transmission devices connected to the link in which a failure occurs, a transmission device having the link as an input link turns an NNI packet applied through a ring which fails to include the input link as a component back to a ring including the input link as a component, and each the transmission device, when determining that a received NNI packet is a loop NNI packet whose transmission source is its own transmission device and which is turned back after looping, thereinafter squelches an NNI packet whose transmission source is its own transmission device and whose transmission destination NNI address is the same as the address of the NNI packet.

In another preferred construction, the transmission device which detects a failure in an input link connected to its own transmission device transmits a ring network failure information notification packet indicative of the occurrence of a failure in the input link to other transmission device, as well as turning an NNI packet applied through a ring which fails to include the input link as a component back to a ring including the input link as a component, and when recognizing that there occurs the transmission device which becomes unreachable based on a received ring network failure information notification packet, each the transmission device thereinafter squelches an NNI packet whose transmission source is its own transmission device and whose transmission destination NNI address is an NNI address of the reachable transmission device.

In another preferred construction, out of the two transmission devices connected to the link in which a failure occurs, a transmission device having the link as an input link turns an NNI packet applied through a ring which fails to include the input link as a component back to a ring including the input link as a component, each the transmission device converts a UNI packet including a transmission destination UNI address which is applied through the tributary port into an NNI packet including a transmission destination NNI address and sends the NNI packet to the outer ring or inner ring, when determining that the ring network enters a state which makes a UNI packet including a certain transmission destination UNI address not be transmittable, each the transmission device transmits a protection path search packet including the certain transmission destination UNI address to other transmission device, each transmission device having received the protection path search packet in question determines whether its own transmission device is connected to a terminal or a network having the transmission destination UNI address included in the protection path search packet and returns a protection path search response packet including the determination result to a transmission device as a transmission source of the protection path search packet, and the transmission device having received the protection path search response packet thereinafter, at the time of converting a UNI packet including the transmission destination UNI address into an NNI packet, takes, as a transmission destination NNI address of the NNI packet in question, an NNI address applied to any one transmission device of transmission devices as transmission sources of the protection path search response packet indicating that a terminal or a network having the transmission destination UNI address is connected.

According to the second aspect of the invention, a transmission device connected to an input link and an output link of an inner ring and to an input link and an output link of an outer ring and having a tributary port, comprises means for, when a failure occurs in an output link of the inner ring connected to its own transmission device, outputting an NNI packet applied through an input link of the inner ring to an output link of the outer ring and when a failure occurs in an output link of the outer ring connected to its own transmission device, outputting an NNI packet applied through an input link of the outer ring to an output link of the inner ring, and means for, when receiving an NNI packet whose transmission destination NNI address is one or any one of a plurality of NNI addresses applied to its own transmission device, outputting either of NNI packets applied through the inner ring and the outer ring to the tributary port that its own transmission device has.

According to the third aspect of the invention, a transmission device connected to an input link and an output link of an inner ring and to an input link and an output link of an outer ring and having a tributary port, comprises a first link monitor for detecting a failure in an input link of the inner ring, a second link monitor for detecting a failure in an input link of the outer ring, a first Wrap switch for outputting an NNI packet applied through an input link of the inner ring to an ouput link of the inner ring at the time of a pass mode and outputting an NNI packet applied through an input link of the inner ring to an output link of the outer ring at the time of a Wrap mode, a second Wrap switch for outputting an NNI packet applied through an input link of the outer ring to an output link of the outer ring at the time of the pass mode and outputting an NNI packet applied through an input link of the outer ring to an output link of the inner ring at the time of the Wrap mode, a first Agg-Packet switch for holding one or a plurality of NNI addresses applied to its own transmission device and when a transmission destination NNI address of an NNI packet applied through an input link of the inner ring is the one or any one of the plurality of NNI addresses applied to the its own transmission device, outputting the NNI packet to the tributary port, a second Agg-Packet switch for holding one or a plurality of NNI addresses applied to its own transmission device and when a transmission destination NNI address of an NNI packet applied through an input link of the outer ring is one or any one of the plurality of NNI addresses applied to the its own transmission device, outputting the NNI packet to the tributary port, and a failure information collection & failure section specifying unit for, when the first link monitor or the second link monitor detects a failure, outputting a ring network failure information notification packet indicative of a failure section to an output link of the inner ring or an output link of the outer ring and when a ring network failure information notification packet is applied through an input link of the inner ring or through an input link of the outer ring, if the ring network failure information notification packet indicates the occurrence of a failure in an output link of the inner ring connected to its transmission device, changing the first Wrap switch to the Wrap mode and if the ring network failure information notification packet indicates the occurrence of a failure in an output link of the outer ring connected to its transmission device, changing the second Wrap switch to the Wrap mode.

In the preferred construction, when a failure occurs in a link not connected to its own transmission device, thereinafter changes a transmission ring of an NNI packet whose transmission source is its own transmission device and which had been transmitted through the link before the failure occurs in the link into a ring reverse to the ring used before the occurrence of the failure.

In another preferred construction, the first and the second Agg-Packet switches are structured to hold both of first and second NNI addresses, and which further comprises a first frame conversion unit for converting an applied UNI packet into an NNI packet including the first NNI address as a transmission source NNI address and outputting the converted NNI packet to an output link of the inner ring through the first Wrap switch, a second frame conversion unit for converting an applied NNI packet into an NNI packet including the second NNI address as a transmission source NNI address and outputting the converted NNI packet to an output link of the outer ring through the second Wrap switch, a UNI forwarding table in which a transmission destination UNI address of a UNI packet applied through the tributary port and information indicative of whether a transmission ring of an NNI packet converted from the UNI packet in question should be the outer ring or the inner ring are registered corresponding to each other, and a Trb-UNI switch for referring to the UNI forwarding table when a UNI packet is applied through the tributary port, and when information indicative of an inner ring is registered corresponding to a transmission destination UNI address of the UNI packet, transferring the UNI packet to the first frame conversion unit and when information indicative of an outer ring is registered, transferring the UNI packet to the second frame conversion unit, and wherein when a ring network failure information notification packet applied through an input link of the inner ring or an input link of the outer ring indicates the occurrence of a failure in a link not connected to its own transmission device, the failure information collection & failure section specifying unit rewrites the UNI forwarding table such that a transmission ring of an NNI packet whose transmission source is its own transmission device and which had been transmitted through the link before the failure occurs in the link is reversed to the ring used before the failure occurs in the link.

In another preferred construction, the transmission device further comprises, in place of the first Agg-Packet switch, a first Agg-Packet switch for holding an NNI address applied to its own transmission device and when a transmission destination NNI address of an NNI packet applied through an input link of the inner ring is the NNI address applied to the its own transmission device, outputting the NNI packet to the tributary port, in place of the second Agg-Packet switch, a second Agg-Packet switch for holding an NNI address applied to its own transmission device and when a transmission destination NNI address of an NNI packet applied through an input link of the outer ring is the NNI address applied to the its own transmission device, outputting the NNI packet to the tributary port, a frame conversion unit for converting an input UNI packet into an NNI packet including the NNI address applied to its own transmission device as a transmission source NNI address and including an address obtained based on a transmission destination UNI address of the UNI packet as a transmission destination NNI address, an NNI forwarding table in which a transmission destination NNI address of an NNI packet output from the frame conversion unit and information indicative of whether the NNI packet should be sent out through the inner ring or the outer ring are registered corresponding to each other, a Trb-NNI switch for, when an NNI packet is output from the frame conversion unit, determining whether the NNI packet is to be transmitted using the inner ring or the outer ring based on a transmission destination NNI address of the NNI packet in question and the contents of the NNI forwarding table and if the determination is made that transmission is to be made using the inner ring, outputting the NNI packet to an output link of the inner ring through the first Wrap switch and if the determination is made that transmission is to be made using the outer ring, outputting the NNI packet to the output link of the outer ring through the second Wrap switch, and in place of the failure information collection & failure section specifying unit, a failure information collection & failure section specifying unit for, when the first link monitor or the second link monitor detects a failure, outputting a ring network failure information notification packet indicative of a failure section to an output link of the inner ring or an output link of the outer ring, and when a ring network failure information notification packet is applied through an input link of the inner ring or an input link of the outer ring, if the ring network failure information notification packet indicates the occurrence of a failure in an output link of the inner ring connected to its own transmission device, changing the first Wrap switch to the Wrap mode, if the ring network failure information notification packet indicates the occurrence of a failure in an output link of the outer ring connected to its own transmission device, changing the second Wrap switch to the Wrap mode and if a ring network failure information notification packet applied through an input link of the inner ring or an input link of the outer ring indicates the occurrence of a failure in a link not connected to its own transmission device, rewriting the NNI forwarding table such that a transmission ring of an NNI packet whose transmission source is its own transmission device and which had been transmitted through the link before the failure occurs in the link is reversed to the ring used before the occurrence of the failure.

In another preferred construction, when a received NNI packet is determined to be an NNI packet which is turned back by other device and whose transmission source is its own transmission device, thereinafter changes a transmission ring of an NNI packet whose transmission source is its own transmission device and whose transmission destination NNI address is the same as an address of the received NNI packet into a reverse ring.

In another preferred construction, the first and the second Agg-Packet switches are structured to hold both of first and second NNI addresses, and which further comprises a first frame conversion unit for converting an applied UNI packet into an NNI packet including the first NNI address as a transmission source NNI address and outputting the converted NNI packet to an output link of the inner ring through the first Wrap switch, a second frame conversion unit for converting an applied NNI packet into an NNI packet including the second NNI address as a transmission source NNI address and outputting the converted NNI packet to an output link of the outer ring through the second Wrap switch, a UNI forwarding table in which a transmission destination UNI address of a UNI packet applied through the tributary port and information indicative of whether a transmission ring of an NNI packet converted from the UNI packet in question should be the outer ring or the inner ring are registered corresponding to each other, a Trb-UNI switch for referring to the UNI forwarding table when a UNI packet is applied through the tributary port, and if information indicative of an inner ring is registered corresponding to a transmission destination UNI address of the UNI packet, transferring the UNI packet to the first frame conversion unit and if information indicative of an outer ring is registered, transferring the UNI packet to the second frame conversion unit, a first Wrap detector for determining whether an NNI packet applied from an input link of the inner ring is a return NNI packet turned back by other transmission device after being output from an output link of the outer ring or not and when the determination is made that the packet is a return back NNI packet, updating the UNI forwarding table such that thereinafter a transmission ring of an NNI packet whose transmission source is its own transmission device and whose transmission destination is the same as a transmission destination of the return NNI packet is reversed to the ring used before, and a second Wrap detector for determining whether an NNI packet applied from an input link of the outer ring is a return NNI packet turned back by other transmission device after being output from an output link of the inner ring or not and when the determination is made that the packet is a return NNI packet, updating the UNI forwarding table such that thereinafter a transmission ring of an NNI packet whose transmission source is its own transmission device and whose transmission destination is the same as a transmission destination of the return NNI packet is reversed to the ring used before.

In another preferred construction, the transmission device further comprises, in place of the failure information collection & failure section specifying unit, a failure information collection & failure section specifying unit for, when the first link monitor or the second link monitor detects a failure, outputting a ring network failure information notification packet indicative of a failure section to an output link of the inner ring or an output link of the outer ring and when a ring network failure information notification packet is applied through an input link of the inner ring or through an input link of the outer ring, if the ring network failure information notification packet indicates the occurrence of a failure in an output link of the inner ring connected to its transmission device, changing the first Wrap switch to the Wrap mode and if the ring network failure information notification packet indicates the occurrence of a failure in an output link of the outer ring connected to its transmission device, changing the second Wrap switch to the Wrap mode, a first Wrap detector for determining whether an NNI packet applied from an input link of the inner ring is a return NNI packet turned back by other transmission device after being output from an output link of the outer ring or not and when the determination is made that the packet is a return NNI packet, updating the NNI forwarding table such that thereinafter a transmission ring of an NNI packet whose transmission source is its own transmission device and whose transmission destination is the same as a transmission destination of the return NNI packet is reversed to the ring used before, and a second Wrap detector for determining whether an NNI packet applied from an input link of the outer ring is a return NNI packet turned back by other transmission device after being output from an output link of the inner ring or not and when the determination is made that the packet is a return NNI packet, updating the NNI forwarding table such that thereinafter a transmission ring of an NNI packet whose transmission source is its own transmission device and whose transmission destination is the same as a transmission destination of the return NNI packet is reversed to the ring used before.

In another preferred construction, when detecting a failure in an input link, turn an NNI packet applied through a ring using none of the input link as a component back to a ring using the input link as a component, and when determining that the ring network enters a state which makes an NNI packet including a certain NNI address as a transmission destination NNI address not be transmittable, thereinafter squelch an NNI packet whose transmission source is its own transmission device and whose transmission destination NNI address is the same as a transmission destination NNI address of the NNI packet.

In another preferred construction, the transmission device further comprises a first Loop detector for determining whether an NNI packet applied to an input link of the inner ring is a loop NNI packet returned after being output from an output link of the inner ring to loop, a second Loop detector for determining whether an NNI packet applied to an input link of the outer ring is a loop NNI packet returned after being output from an output link of the outer ring to loop, and a squelch circuit for, when the determination is made by the first Loop detector or the second Loop detector that the packet is a loop NNI packet, thereinafter squelching an NNI packet whose transmission source is its own transmission device and whose transmission destination NNI address is the same as a transmission destination NNI address of the loop NNI packet.

In another preferred construction, when detecting a failure in an input link of the inner ring, thereinafter output an NNI packet applied from an input link of the outer ring to an output link of the inner ring, when detecting a failure in an input link of the outer ring, thereinafter output an NNI packet applied from an input link of the inner ring to an output link of the outer ring, and when there occurs a transmission device which becomes unreachable among other transmission devices connected to its transmission device in a ring through the inner ring and the outer ring, squelch an NNI packet whose transmission source is its own transmission device and whose transmission destination NNI address is an NNI address of the unreachable transmission device.

In another preferred construction, the transmission device further comprises, in place of the failure information collection & failure sector specifying unit, a failure information collection & squelch determination unit for, when the first link monitor or the second link monitor detects a failure, outputting a ring network failure information notification packet indicative of a failure section to an output link of the inner ring or an output link of the outer ring, when a ring network failure information notification packet is applied through an input link of the inner ring or through an input link of the outer ring, if the ring network failure information notification packet indicates the occurrence of a failure in an output link of the inner ring connected to its transmission device, changing the first Wrap switch to the Wrap mode and if the ring network failure information notification packet indicates the occurrence of a failure in an output link of the outer ring connected to its transmission device, changing the second Wrap switch to the Wrap mode, and when there occurs a transmission device which becomes unreachable among other transmission devices connected to its transmission device in a ring through the inner ring and the outer ring, instructing on squelching of an NNI packet whose transmission source is its own transmission device and whose transmission destination NNI address is an NNI address of the unreachable transmission device, and a squelch circuit for squelching an NNI packet according to an instruction of the failure information collection & squelch determination unit.

In another preferred construction, when there occurs a failure in an input link of the inner ring, outputs an NNI packet applied from an input link of the outer ring to an output link of the inner ring, when there occurs a failure in an input link of the outer ring, outputs an NNI packet applied from an input link of the inner ring to an output link of the outer ring, when determining that the ring network enters a state which makes a UNI packet including a certain transmission destination UNI address not be transmittable, transmits a protection path search packet including the certain transmission destination when receiving a protection path search packet, determines whether a terminal or a network having the transmission destination UNI address included in the protection path search packet in question is reachable, and returns a protection path search response packet including the determination result to a transmission device which has transmitted the protection path search packet through the inner ring or outer ring, and when receiving the protection path search response packet, at the time of converting a UNI packet including the transmission destination UNI address into an NNI packet, taking, as a transmission destination NNI address of the NNI packet in question, an NNI address applied to any one transmission device among transmission devices as transmission sources of the protection path search response packet indicating that a terminal or a network having the transmission destination UNI address is connected.

In another preferred construction, the transmission device further comprises a UNI-NNI ARP for, when determining that the ring network enters a state which makes a UNI packet including a certain transmission destination UNI address not be transmittable, transmitting a protection path search packet including the certain transmission destination UNI address to other transmission device, when receiving a protection path search packet, determining whether a terminal or a network having the transmission destination UNI address included in the protection path search packet in question is reachable, and returning a protection path search response packet including the determination result to a transmission device which has transmitted the protection path search packet through the inner ring or outer ring, and when receiving the protection path search response packet, at the time of converting a UNI packet including the transmission destination UNI address into an NNI packet, taking, as a transmission destination NNI address of the NNI packet in question, an NNI address applied to any one transmission device among transmission devices as transmission sources of the protection path search response packet indicating that a terminal or a network having the transmission destination UNI address is connected.

According to another aspect of the invention, a program executed on a computer for causing the computer to function as a transmission device connected to an input link and an output link of an inner ring and to an input link and an output link of an outer ring and having a tributary port, comprising the functions of when a failure occurs in an output link of the inner ring connected to its own transmission device, outputting an NNI packet applied through an input link of the inner ring to an output link of the outer ring and when a failure occurs in an output link of the outer ring connected to its own transmission device, outputting an NNI packet applied through an input link of the outer ring to an output link of the inner ring, and when receiving an NNI packet whose transmission destination NNI address is one or any one of a plurality of NNI addresses applied to its own transmission device, outputting either of NNI packets applied through the inner ring and the outer ring to the tributary port that its own transmission device has.

Since the packet protection method in a ring network according to the present invention enables network resources to be efficiently used by relatively increasing a band efficiency when a failure occurs in a network as compared with that by a conventional method, every NNI packet sent through an inner ring or an outer ring, as long as its transmission destination NNI address is one or any one of a plurality of NNI addresses applied to its own transmission device, is output to a tributary port. More specifically, when an NNI packet transmitted by a certain transmission source transmission device by using the inner ring is turned back due to a failure and applied to its own transmission device through the outer ring, the NNI packet is not output to the tributary port but to the outer ring by a conventional method, while it is output to the tributary port to enable efficient use of network resources according to the present invention.

In addition, in the packet protection method in a ring network according to the present invention, when receiving a ring network failure information notification packet indicative of an input link having a failure, a transmission ring of an NNI packet transmitted through the input link before the failure occurs is reversed to that used before the occurrence of the failure and when an NNI packet whose transmission source is its own transmission device is turned back, a transmission ring of an NNI packet whose transmission destination NNI address is the same as that of the above-described NNI packet and whose transmission source is its own transmission device is reversed, whereby deterioration in network efficiency due to wrap can be prevented except for when immediately after the occurrence of a failure.

Moreover, the packet protection method in a ring network according to the present invention prevents an increase in useless traffic because when an NNI packet whose transmission source is its own transmission device returns after looping, an NNI packet whose transmission destination NNI address is the same as that of the above-described NNI packet and whose transmission source is its own transmission device is squelched and when recognizing that a transmission device becomes unreachable based on a ring network failure information notification packet, an NNI packet whose transmission source is its own transmission device and whose transmission destination NNI address is the NNI address of the unreachable transmission device is squelched.

Furthermore, the packet protection method in a ring network according to the present invention enables protection efficiency in a ring network to be increased because a protection path is searched by using a protection path search packet.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment of the Present Invention

Figure 1:
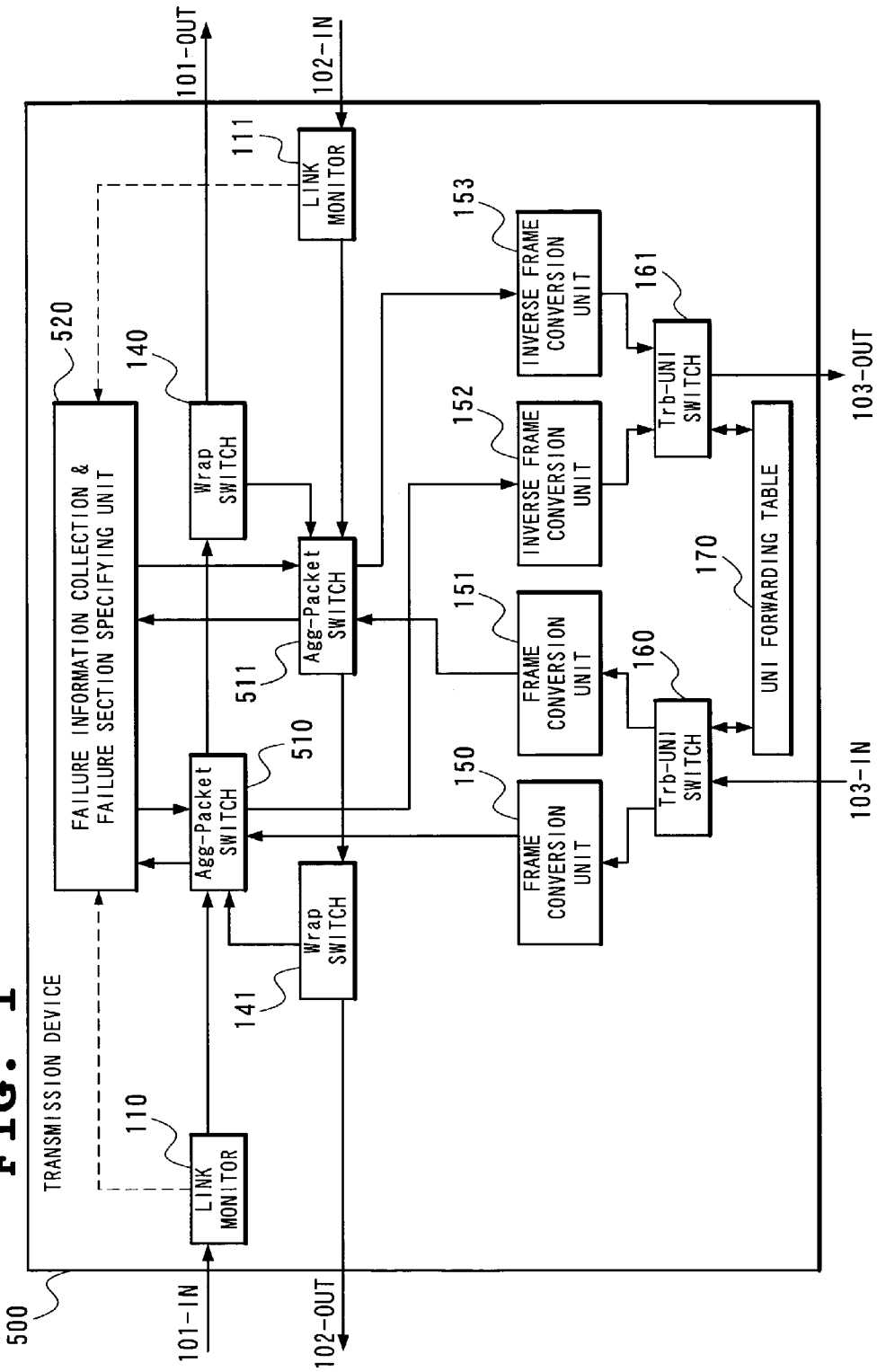
FIG. 1 is a block diagram showing an example of a structure of a transmission device 500 for use in realizing a first embodiment of a packet protection method in a ring network according to the present invention.

FIG. 1 is a block diagram showing an example of a structure of a transmission device 500 for use in realizing a first embodiment of a packet protection method in a ring network according to the present invention.

The transmission device 500 includes the link monitors 110 and 11, the Wrap switches 140 and 141, the frame conversion units 150 and 151, the inverse frame conversion units 152 and 153, the Trb-UNI switches 160 and 161, the UNI forwarding table 170, Agg-Packet switches 510 and 511 and a failure information collection & failure section specifying unit 520. Since the functions of the link monitors 110 and 111, the Wrap switches 140 and 141, the frame conversion units 150 and 151, the inverse frame conversion units 152 and 153 and the Trb-UNI switches 160 and 161 have been already described in detail in the Related Art, description will be here made only of newly added components.

The Agg-Packet switches 510 and 511 decipher a kind of an NNI packet applied from the link monitors 110 and 111, and the Wrap switches 140 and 141 and a transfer destination NNI address of the packet and when the kind indicates a ring network failure information notification packet, transfer the packet to the failure information collection & failure section specifying unit 520, and when the kind indicates a data packet whose transmission destination NNI address coincides with an NNI address (a transmission source NNI address to be applied when converting a UNI packet into an NNI packet and the NNI address of the frame conversion unit 150 is #A and that of the frame conversion unit 151 is #B) of either the frame conversion unit 150 or 151 in its own transmission device, drop the packet to transfer the same to the inverse frame conversion units 152 and 153.

The Agg-Packet switches 510 and 511 also multiplex other NNI packets, NNI packets from the frame conversion units 150 and 151 and a ring network failure information notification packet from the failure information collection & failure section specifying unit 520 to transfer the obtained packets to the Wrap switches 140 and 141. Here, both the Agg-Packet switches 510 and 511 store the NNI addresses #A and #B of the frame conversion units 150 and 151 and drop only an NNI packet whose transmission destination NNI address coincides with either of the stored NNI address #A or #B to transfer the same to the inverse frame conversion units 152 and 153.

When notified of link failure information by the link monitors 110 and 111 in its own device, the failure information collection & failure section specifying unit 520 generates a ring network failure information notification packet including the link failure information and transmits the same to other transmission device through the Agg-Packet switches 510 and 511, as well as switching the operation mode of the Wrap switch 140 or the Wrap switch 141 from the pass mode to the Wrap mode according to an input link in which a failure occurs. When a failure occurs in the input link 101-IN, switch the Wrap switch 141 to the Wrap mode and when a failure occurs in the input link 102-IN, switch the Wrap switch 140 to the Wrap mode.

The failure information collection & failure section specifying unit 520 also refers to a ring network failure information notification packet sent from other transmission device to specify a failure section based on link failure information included therein. Thereafter, the failure information collection & failure section specifying unit 520 rewrites the UNI forwarding table 170 (in which a transmission destination UNI address of a UNI packet applied through a tributary port 103-IN and information about whether a transmission ring of an NNI packet converted from the UNI packet should be an outer ring or an inner ring are registered corresponding to each other) to make a transmission ring of an NNI packet whose transmission source is its own transmission device and which passes through the failure section be reverse to that used before the failure occurs. As a result, the UNI packet to be transferred through the failure section is transferred to a ring reverse to that used before the failure by the Trb-UNI switch 160 which refers to the UNI forwarding table 170.

Next, detailed description will be made of the first embodiment of the packet protection method in a ring network according to the present invention with reference to FIGS. 1, 2A, 2B and 2C.

Figure 2A:
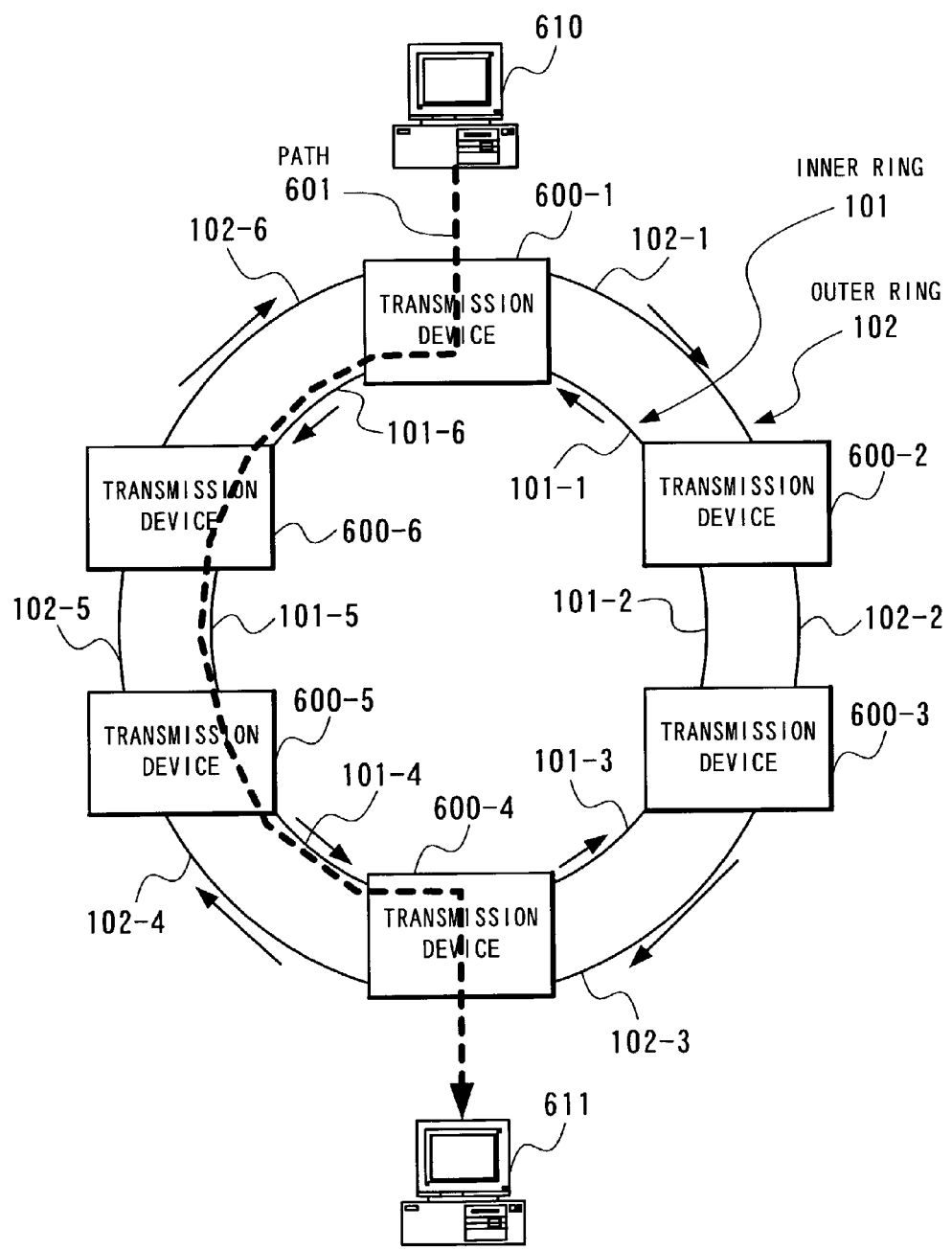
FIG. 2A is a diagram for use in explaining the first embodiment of the packet protection method in a ring network according to the present invention.
Figure 2B:
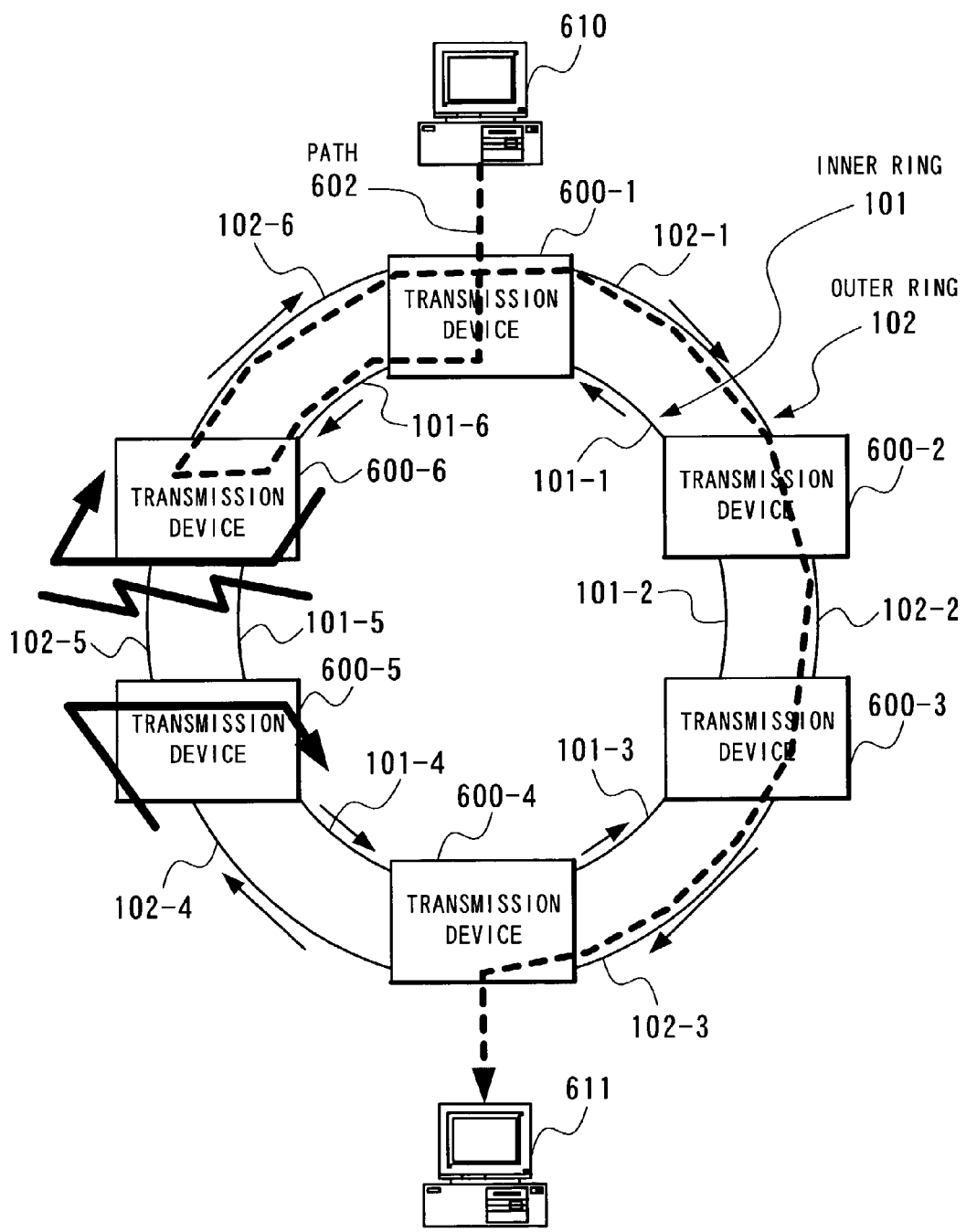
FIG. 2B is a diagram for use in explaining the first embodiment of the packet protection method in a ring network according to the present invention.
Figure 2C:
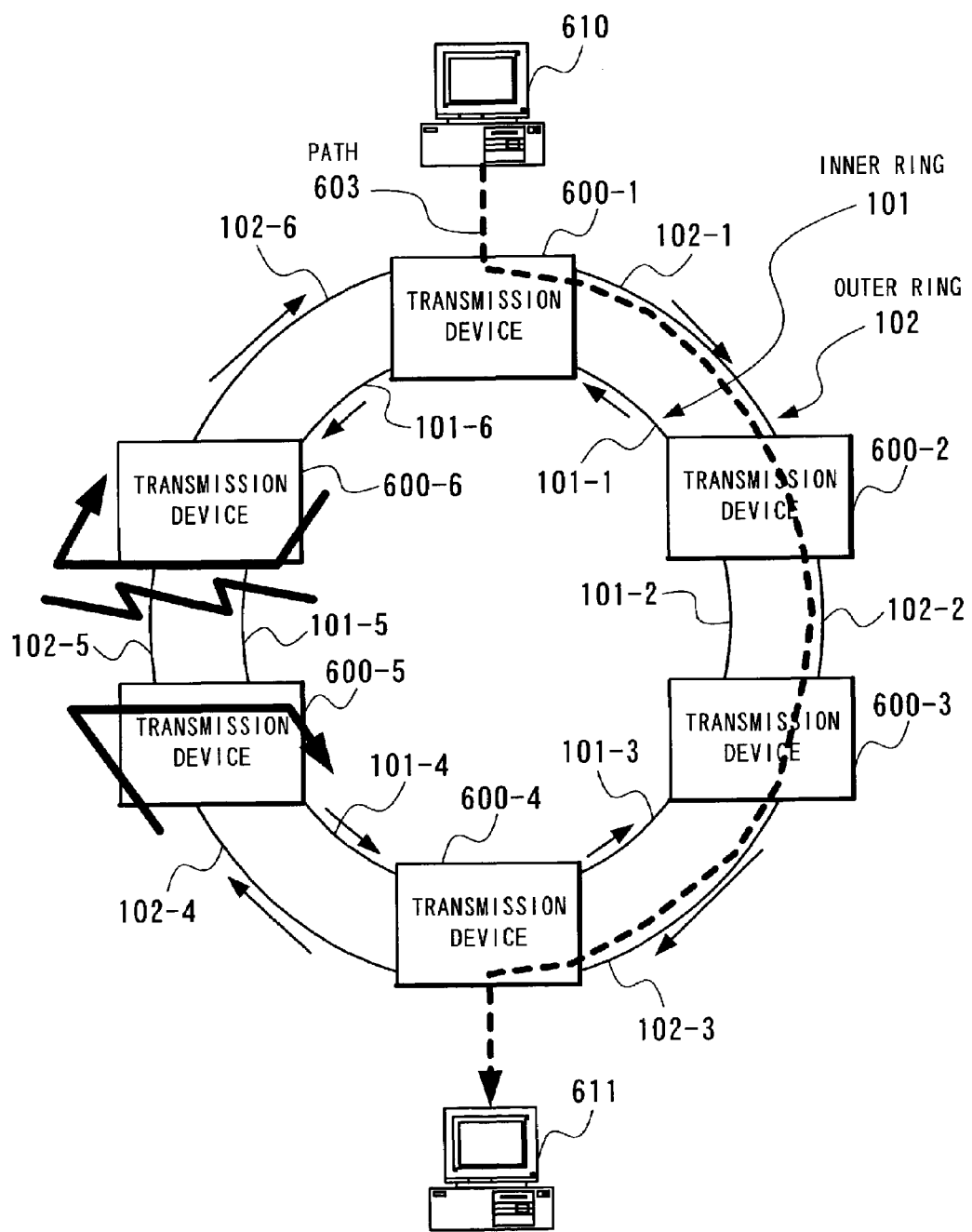
FIG. 2C is a diagram for use in explaining the first embodiment of the packet protection method in a ring network according to the present invention.

FIGS. 2A, 2B and 2C show a two-fiber ring in which a plurality of transmission devices 600-1 to 600-6 are connected in a ring by using the inner ring 101 and the outer ring 102. Here, each of the transmission devices 600-1 to 600-6 has the same structure as that of the transmission device 500 shown in FIG. 1.

Protection method will be described with respect to a case where a failure occurs in a link 101-5 and in a link 102-5 between the transmission devices 600-5 and 600-6. It is assumed that before the failure occurs, a UNI packet sent out from a terminal 610 is converted into an NNI packet at the transmission device 600-1 and transferred to the transmission device 600-4 through the inner ring 101, and again converted into a UNI packet which will be transferred to a terminal 611 connected to the transmission device 600-4.

When detecting the failure in the link 101-5, the link monitor 110 in the transmission device 600-5 sends link failure information indicative of the failure to the failure information collection & failure section specifying unit 520 in its own device. When detecting the failure in the link 102-5, the link monitor 111 in the transmission device 600-6 sends link failure information indicative of the failure to the failure information collection & failure section specifying unit 520 in its own transmission device.

When recognizing that a failure occurs in the link 101-5 of the inner ring 101 based on the link failure information from the link monitor 110 (FIG. 3, Step S71), the failure information collection & failure section specifying unit 520 in the transmission device 600-5 switches the Wrap switch 141 from the pass mode to the Wrap mode such that an NNI packet is turned back to the inner ring side (Step S72). The failure information collection & failure section specifying unit 520 also generates a ring network failure information notification packet indicating that the failure occurs in the link 101-5 and sends the same to a link 101-4 through the Agg-Packet switch 510 (Step S73). The ring network failure information notification packet is sequentially transferred to each transmission device through the inner ring 101.

On the other hand, when recognizing that a failure occurs in the link 102-5 of the outer ring 102 based on the link failure information from the link monitor 111 (FIG. 3, Step S71), the failure information collection & failure section specifying unit 520 in the transmission device 600-6 switches the Wrap switch 141 from the pass mode to the Wrap mode such that that an NNI packet is turned back to the outer ring side (Step S74). The failure information collection & failure section specifying unit 520 also generates a ring network failure information notification packet indicating that the failure occurs in the link 102-5 and sends the same to a link 102-6 through the Agg-Packet switch 511 (Step S75). The ring network failure information notification packet is sequentially transferred to each transmission device through the outer ring 102.

Figure 4:
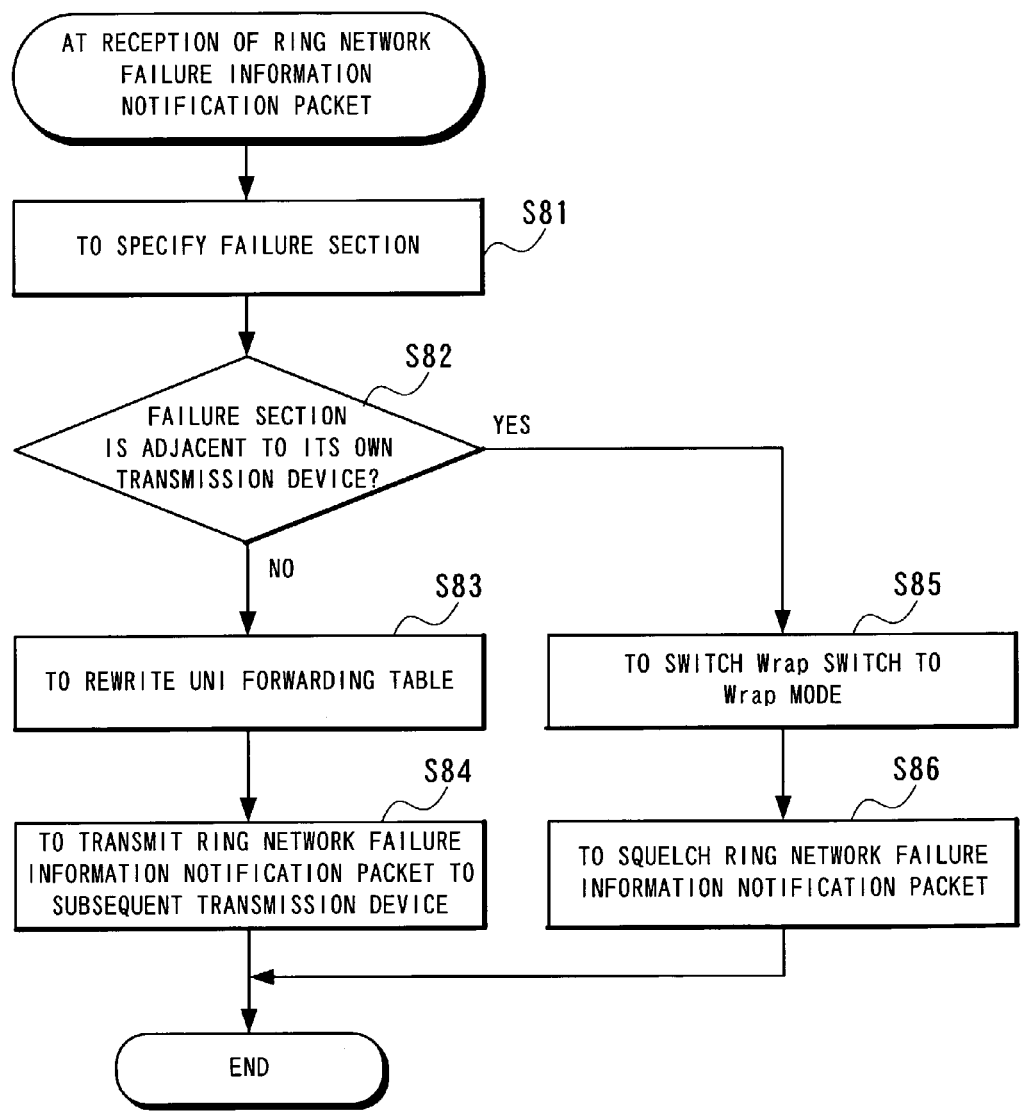
FIG. 4 is a flow chart showing an example of processing of the failure information collection & failure section specifying unit 520.

The failure information collection & failure section specifying unit 520 in the transmission device 600-4 having received through the inner ring 101 the ring network failure information notification packet sent from the transmission device 600-5 specifies the failure section as being the link 101-5 of the inner ring 101 based on the contents of the ring network failure information notification packet (FIG. 4, Step S81). Thereafter, since the failure section is a link not adjacent to its own transmission device (NO at Step S82), the failure information collection & failure section specifying unit 520 in the transmission device 600-4 updates the UNI forwarding table 170 in order to switch a transmission ring of an NNI packet whose transmission source is its own transmission device 600-4 and whose transfer path includes the failure section to a ring of a reverse direction (Step S83). Thereafter, the failure information collection & failure section specifying unit 520 in the transmission device 600-4 transmits the ring network failure information notification packet to the subsequent transmission device 600-3 (Step S84). Also at the transmission devices 600-3, 600-2 and 600-1, the same processing as that described above (Steps S81 to S84) is conducted to result in transferring the ring network failure information notification packet to the transmission device 600-6.

Here, the processing conducted at Step S83 will be detailed with respect to processing conducted at the failure information collection & failure section specifying unit 520 in the transmission device 600-1 as an example. Now, assume that registered in the UNI forwarding table 170 in the transmission device 600-1 is information indicating that an NNI packet to be transferred to the transmission devices 600-6, 600-5 and 600-4 will be output to the inner ring 101. In a case where the contents of the UNI forwarding table 170 are as described above, when receiving a ring network failure information notification packet indicating that a failure occurs in the link 101-5, because the NNI packet to be transferred to the transmission devices 600-5 and 600-4 becomes an NNI packet whose transfer path includes the failure section (link 101-5), the failure information collection & failure section specifying unit 520 updates the contents of the UNI forwarding table 170 such that the packet to be transferred to the transmission devices 600-4 and 600-5 will be sent to the outer ring 102. The foregoing is the detailed description of the processing to be executed at Step S83.

In addition, the transmission device 600-6 having received the ring network failure information notification packet from the transmission device 600-5 through the respective transmission devices 600-4, 600-3, 600-2 and 600-1 specifies the failure section as being the link 101-5 of the inner ring 101 (Step S81). Thereafter, since the failure section is the link 101-5 directly connected to its own transmission device 600-6 (YES at Step S82), when the Wrap switch 140 is at the pass mode, change the mode to the Wrap mode to make an NNI packet be turned back to the outer ring 102 (Step S85). In a case of this example, since the Wrap switch 140 is already changed to the Wrap mode at Step S74, no mode switching processing is conducted of the Wrap switch 140. Thereafter, the failure information collection & failure section specifying unit 520 squelches the ring network failure information notification packet (Step S86).

On the other hand, the failure information collection & failure section specifying unit 520 in the transmission device 600-1 having received through the outer ring 102 the ring network failure information notification packet output from the transmission device 600-6 recognizes the failure section as being the link 102-5 based on the link failure information notification packet (Step S81). Thereafter, since the failure section is a link not adjacent to its own transmission device (No at Step S82), the failure information collection & failure section specifying unit 520 in the transmission device 600-1 updates the UNI forwarding table 170 in order to switch a transmission ring of an NNI packet whose transfer path includes the failure section to a ring of a reverse direction (Step S83). Thereafter, the failure information collection & failure section specifying unit 520 in the transmission device 600-1 transmits the ring network failure information notification packet to the subsequent transmission device 600-2 (Step S84). Also at the transmission devices 600-2, 600-3 and 600-4, the same processing as that described above (Steps S81 to S84) is conducted to result in transferring the ring network failure information notification packet to the transmission device 600-5.

Since the failure section notified by the ring network failure information notification packet is the link 102-5 adjacent to its own transmission device 600-5 (Step S81 and YES at Step S82), the failure information collection & failure section specifying unit 520 in the transmission device 600-5 switches the Wrap switch 141 to the Wrap mode when it is not such that an NNI packet is turned back to the inner ring 101 (Step S85) if the Wrap switch 141 is not in the Wrap mode. In a case of this example, since the Wrap switch 141 is already set at the Wrap mode at Step S72, no operation mode switching processing is conducted. Thereafter, the failure information collection & failure section specifying unit 520 squelches the ring network failure information notification packet (Step S86).

As a result of the series of the protection process, immediately after the detection of the failure, the NNI packet transferred to a link 101-6 of the inner ring 101 from the terminal 610 through the transmission device 600-1 is turned back to the link 102-6 of the outer ring 102 at the transmission device 600-6, converted into a UNI packet by the transmission device 600-4 through the transmission devices 600-1 to 600-3 and transferred to the terminal 611 as shown in a path 602 in FIG. 2B. In addition, after the ring network failure information notification packet reaches the transmission device 600-1 to execute the processing of Step S83, an NNI packet will be sent out from the transmission device 600-1 as a transmission source to the outer ring 102 and transferred to the transmission device 600-4 through the transmission devices 600-2 and 600-3 as shown in a path 603 in FIG. 2C.

Figure 5:
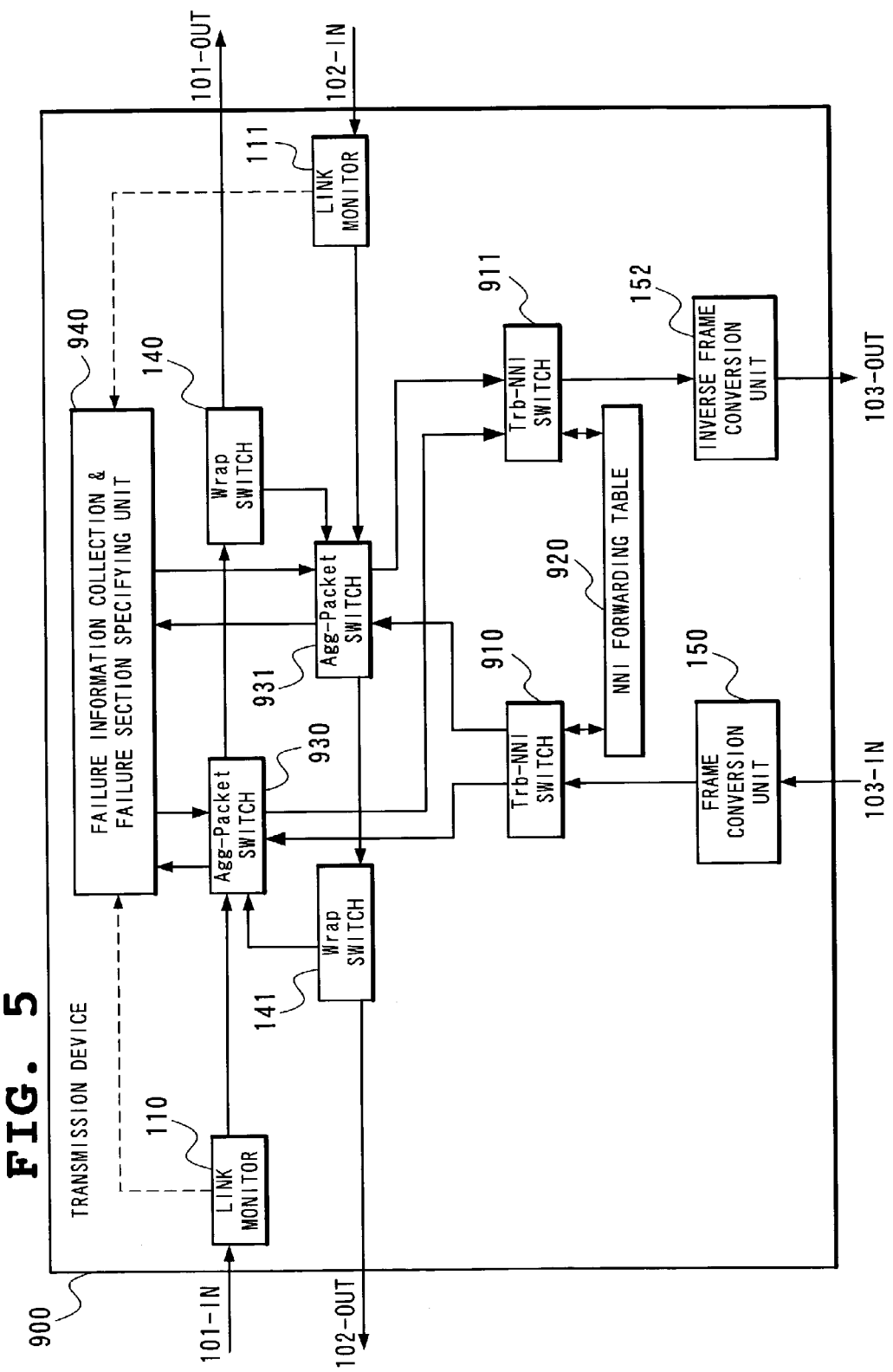
FIG. 5 is a block diagram showing an example of a structure of a transmission device 900 for use in realizing the first embodiment of the packet protection method in a ring network according to the present invention.

FIG. 5 is a block diagram showing another example of a structure of a transmission device for use in realizing the above-described first embodiment of the packet protection method in a ring network according to the present invention. A transmission device 900 shown in FIG. 5 includes, the link monitors 110 and 111, the Wrap switches 140 and 141, the frame conversion unit 150, the inverse frame conversion unit 152, Agg-Packet switches 930 and 931, a failure information collection & failure section specifying unit 940, an NNI forwarding table 920 and Trb-NNI switches 910 and 911. Since the functions of the link monitors 110 and 111, the Wrap switches 140 and 141, the frame conversion unit 150 and the inverse frame conversion unit 152 have been already described in detail in the Related Art and with respect to the transmission device 500, no description thereof will be made here and description will be made only of newly added components and their peripheral portions.

The NNI forwarding table 920 is a table of correspondence between a transmission destination NNI address and an output port. More specifically, registered corresponding to each other in the NNI forwarding table 920 are a transmission destination NNI address of an NNI packet output from the frame conversion unit 150 and information about through which of the inner ring 101 or the outer ring 102 the NNI packet should be transmitted.

The Trb-NNI switches 910 and 911 send out an NNI packet to an appropriate output port with reference to a transmission destination NNI address of an applied NNI packet and the NNI forwarding table 920.

Although the Agg-Packet switches 930 and 931 have approximately the same function as that of the Agg-Packet switches 510 and 511, they differ from the Agg-Packet switches 510 and 511 in storing the address #A of the frame conversion unit 150 and dropping only an NNI packet coincident with the address #A into the Trb-NNI switch 911.

Although the failure information collection & failure section specifying unit 940 has approximately the same function as that of the failure information collection & failure section specifying unit 520, it differs from the failure information collection & failure section specifying unit 520 in rewriting the NNI forwarding table 920 in place of the UNI forwarding table 170.

Figure 3:
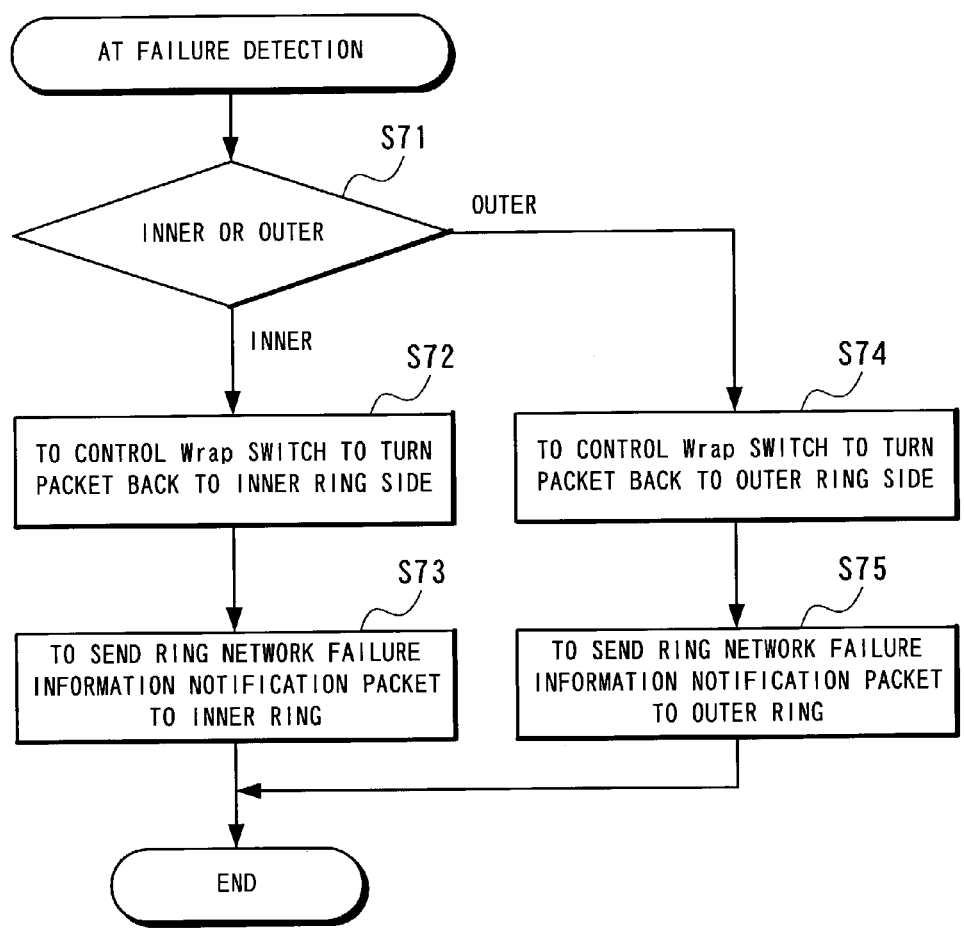
FIG. 3 is a flow chart showing an example of processing of a failure information collection & failure section specifying unit 520.

The failure information collection & failure section specifying unit 940 conducts the processing shown in the flow chart of FIG. 3 when the link monitors 110 and 111 in its own transmission device 900 detect a failure.

In addition, when receiving a ring network failure information notification packet from other transmission device, the failure information collection & failure section specifying unit 940 conducts the same processing as that shown in the flow chart of FIG. 4 except for the processing at Step S83. In place of Step S83, the failure information collection & failure section specifying unit 940 conducts rewriting processing of the NNI forwarding table 920 to make a transmission ring of an NNI packet which is applied from its own transmission device to the ring network and which passes through a failure section be reverse to that used before the failure occurs. As a result, the NNI packet transferred through the failure section will be transferred by the Trb-NNI switch 911 which refers to the NNI forwarding table 920 to an output port reverse to that used before the failure occurs.

When a packet applied from the tributary port 103-IN is an NNI packet whose frame has been already converted, the frame conversion unit 150 and the inverse frame conversion unit 152 are unnecessary. At this time, the Agg-Packet switches 930 and 931 learn and store a transmission source NNI address of an NNI packet applied from the Trb-NNI switch 910.

Also when the transmission device 900 shown in FIG. 5 is used as each of the transmission devices 600-1 to 600-6 shown in FIGS. 2A, 2B and 2C, the protection process itself is the same as that of a case where the transmission device 500 of FIG. 1 is used, in which an NNI packet is protected on a path indicated as the path 602 in FIG. 2B immediately after the occurrence of a failure and thereafter protected on a path indicated as the path 603 in FIG. 2C.

Although in the foregoing description, switching of the operation mode of the Wrap switches 140 and 141 is conducted by the failure information collection & failure section specifying unit 520, it may be conducted by the link monitors 110 and 111.

Second Embodiment of the Present Invention

Figure 6:
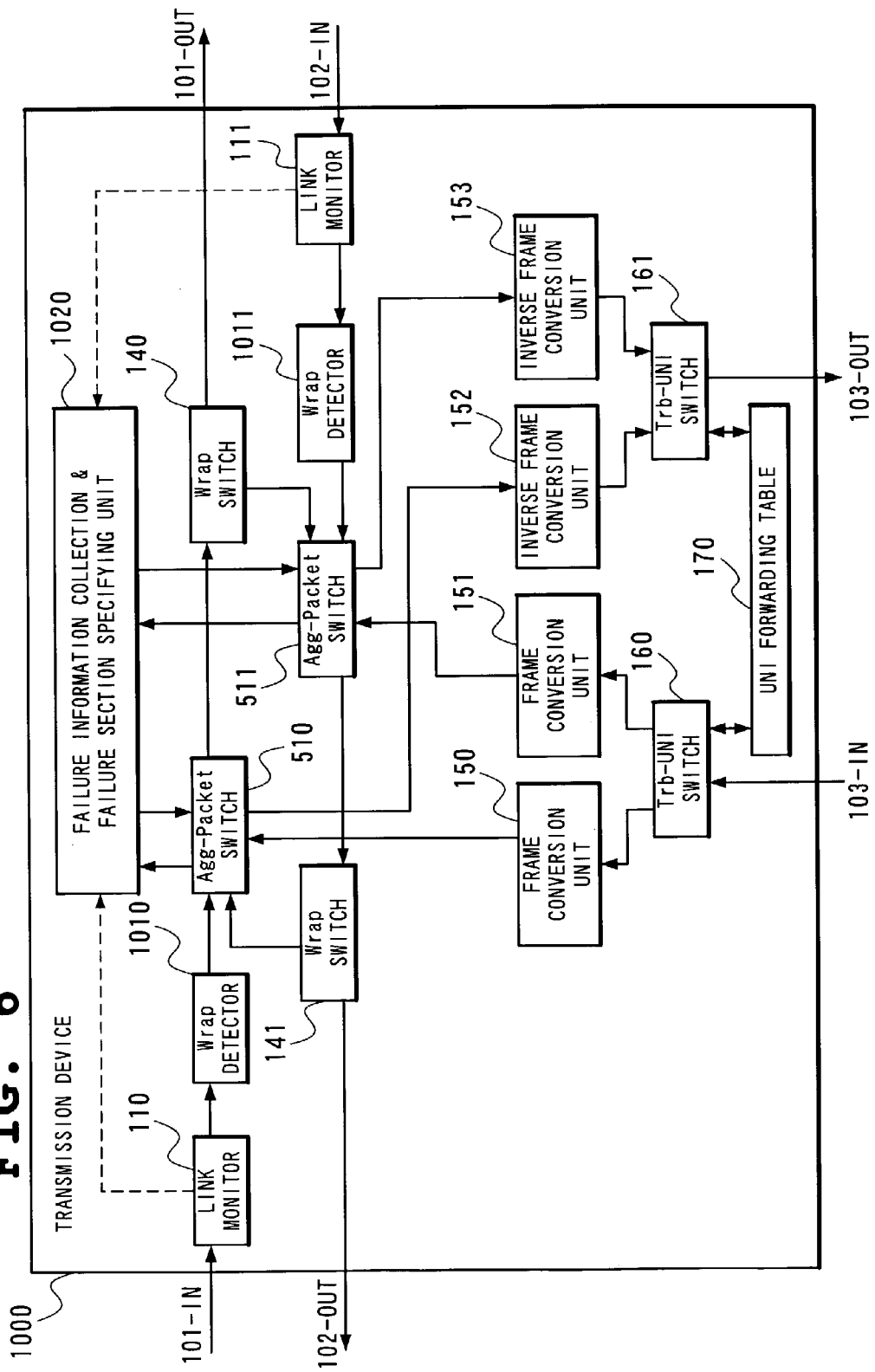
FIG. 6 is a block diagram showing an example of a structure of a transmission device for use in realizing a second embodiment of a packet protection method in a ring network according to the present invention.

FIG. 6 is a block diagram showing an example of a structure of a transmission device for use in realizing a second embodiment of the above-described packet protection method in a ring network according to the present invention.

A transmission device 1000 shown in FIG. 6 differs from the transmission device 500 shown in FIG. 1 in additionally including Wrap detectors 1010 and 1011 and including a failure information collection & failure section specifying unit 1020 in place of the failure information collection & failure section specifying unit 520. In the following, description will be made only of operation of the Wrap detectors 1010 and 1011 and the related parts, and as to operation of the remaining parts, reference should be made to the description of the operation in the first embodiment and that of the operation of the Related Art.

The Wrap detector 1010 stores the transmission source NNI address #B applied by the frame conversion unit 151 and refers to a transmission source/transmission destination NNI address of an NNI packet applied from the input link 101-IN of the inner ring. When the transmission source NNI address coincides with the NNI address #B applied by the frame conversion unit 151, determination is made that the NNI packet is wrapped by other transmission device in the ring to update the UNI forwarding table 170 in order to change a transmission ring to the transmission destination NNI address to have a reverse direction. Hereinafter, an NNI packet from the transmission source transmission device to its transmission destination transmission device will be transferred to a ring of a direction reverse to that used so far.

Similarly, the Wrap detector 1011 stores the transmission source NNI address #A applied by the frame conversion unit 150 and refers to a transmission source/transmission destination NNI address of an NNI packet applied from the input link 102-IN of the outer ring. When the transmission source NNI address coincides with the NNI address #A applied by the frame conversion unit 150, determination is made that the NNI packet is wrapped by other transmission device in the ring to update the UNI forwarding table 170 in order to change a transmission ring to the transmission destination NNI address to have a reverse direction. Hereinafter, an NNI packet from the transmission source transmission device to its transmission destination transmission device will be transferred to a ring of a direction reverse to that used so far.

The failure information collection & failure section specifying unit 1020 has the same function as that of the failure information collection & failure section specifying unit 520 with the only difference being in having no function of rewriting the UNI forwarding table 170.

Next, description will be made of the second embodiment of the packet protection method in a ring network according to the present invention with reference to FIGS. 2A, 2B, 2C and 6. Here, assume that the structure of each of the transmission devices 600-1 to 600-6 shown in FIGS. 2A, 2B and 2C is the same as that of the transmission device 1000 shown in FIG. 6.

When the link monitor 110 in the transmission device 600-5 detects a failure in the link 101-5 of the inner ring 101, the failure information collection & failure section specifying unit 1020 switches the Wrap switch 141 to the Wrap mode such that an NNI packet is turned back to the inner ring 101 side, as well as sending a ring network failure information notification packet indicative of the occurrence of the failure in the link 101-5 to the inner ring 101 (FIG. 3, Steps S71 to S73). The ring network failure information notification packet is sent to the transmission device 600-6 through the transmission devices 600-4, 600-3, 600-2 and 600-1.

Figure 7:
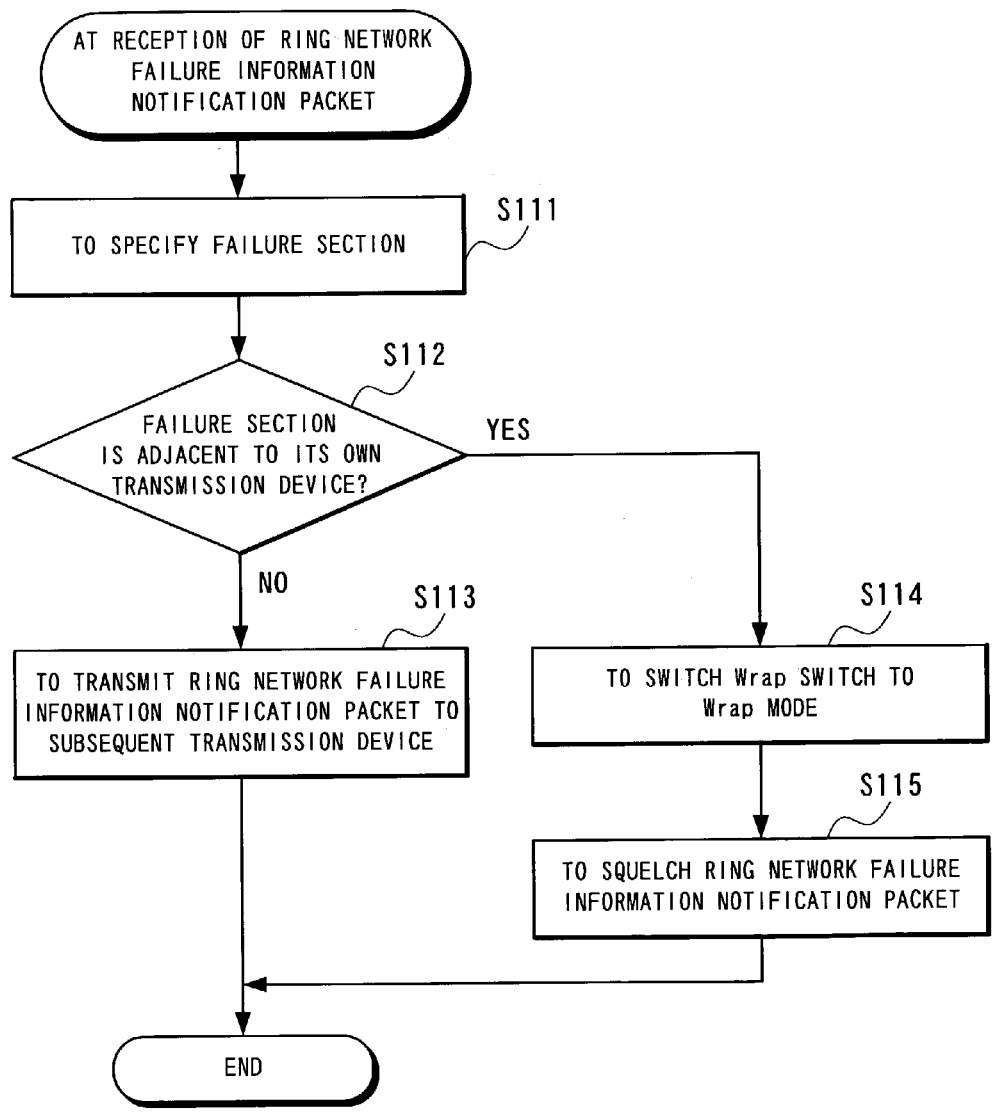
FIG. 7 is a flow chart showing an example of processing of a failure information collection & failure section specifying unit 1020.

The failure information collection & failure section specifying unit 1020 in each of the transmission devices 600-4, 600-3, 600-2 and 600-1 specifies a failure section based on the ring network failure information notification packet and because the failure section is not adjacent to its own transmission device, transmits the ring network failure information notification packet to the subsequent transmission device (FIG. 7, Step S111, NO at S112, S113). In addition, since the failure section is adjacent to its own transmission device, the failure information collection & failure section specifying units 1020 in the transmission device 600-6 switches the Wrap switch 140 to the Wrap mode to make the NNI packet be turned back to the outer ring side, as well as squelching the ring network failure information notification packet (Steps S111, YES at Step S112, S114, S115).

On the other hand, when the link monitor 111 in the transmission device 600-6 detects a failure in the input link 102-5 of the outer ring 102, the failure information collection & failure section specifying unit 1020 switches the Wrap switch 140 to the Wrap mode and furthermore sends out the ring network failure information notification packet indicative of a failure occurring in the input link 102-5 to the outer ring 102 (FIG. 3, Steps S71, S74, S75). The ring network failure information notification packet is sent to the transmission device 600-5 through the transmission devices 600-1, 600-2, 600-3 and 600-4.

The failure information collection & failure section specifying unit 1020 in each of the transmission devices 600-1, 600-2, 600-3 and 600-4 specifies a failure part based on the ring network failure information notification packet and since the failure section is not adjacent to its own transmission device, transmits the ring network failure information notification packet to the subsequent transmission device (FIG. 7, Step S111, NO at S112, S113). In addition, since the failure section is adjacent to its own transmission device, the failure information collection & failure section specifying units 1020 in the transmission device 600-5 switches the Wrap switch 141 to the Wrap mode and then squelches the ring network failure information notification packet (Steps S111, YES at S112, S114, S115).

Figure 8:
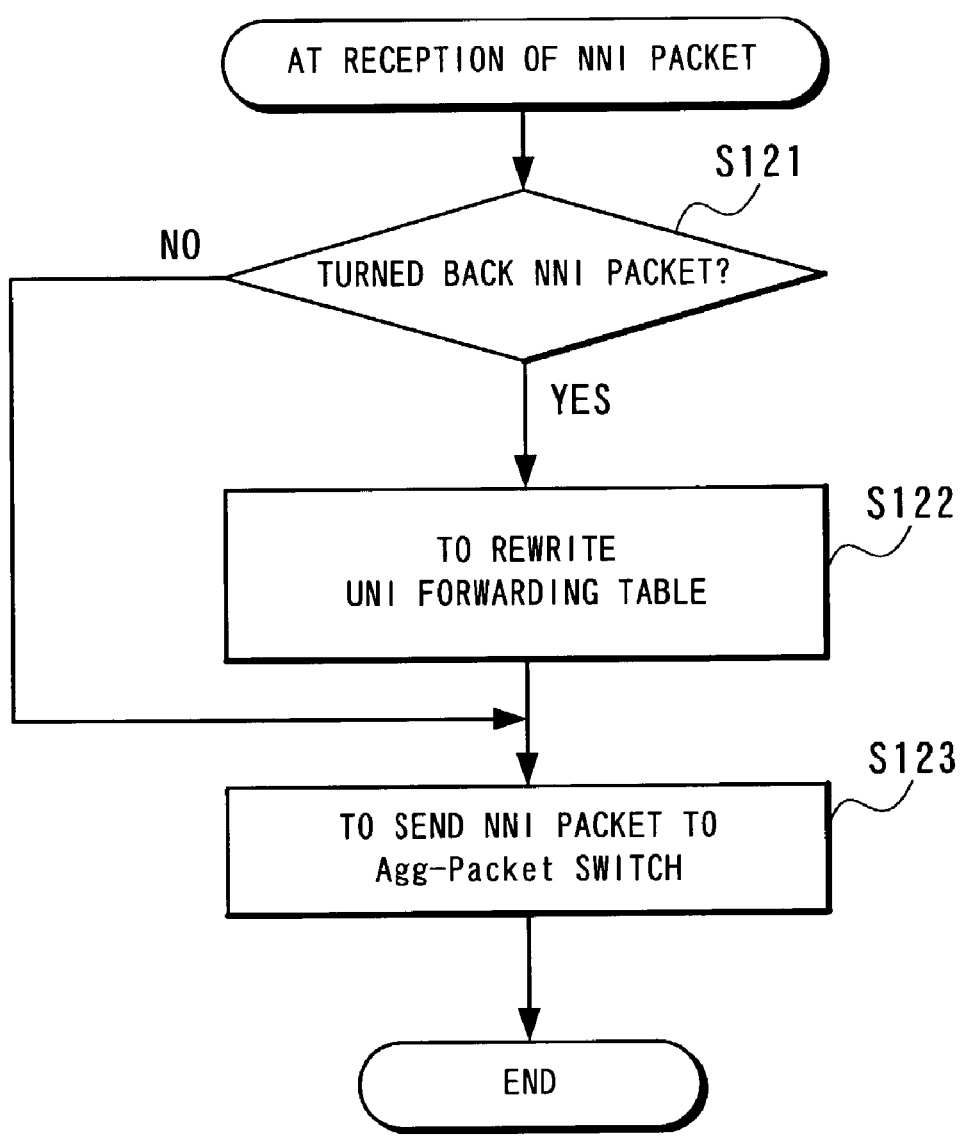
FIG. 8 is a flow chart showing an example of processing of Wrap detectors 1010 and 1011.

As a result of a series of protection processes, immediately after the detection of the failure, the NNI packet transferred to the inner ring 101 from the terminal 610 through the transmission device 600-1 is turned back at the transmission device 600-6 to the outer ring 102, converted into an UNI packet by the transmission device 600-4 through the transmission devices 600-1 to 600-3 and transferred to the terminal 611 as shown in the path 602 in FIG. 2B. When the NNI packet is applied from the outer ring 102 to the transmission device 600-1, the Wrap detector 1011 of the transmission device 600-1 detects the packet being wrapped based on the transmission source NNI address of the NNI packet (FIG. 8, YES at Step S121) and rewrites the UNI forwarding table 170 in order to change the forwarding direction of the NNI packet having the transmission destination NNI address in question from the inner ring 101 to the outer ring 102, as well as transmitting the NNI packet to the Agg-Packet switch 511 (Steps S122 and S123). After the UNI forwarding table 170 is rewritten, the NNI packet is transferred using the path denoted as the path 602 in FIG. 2C.

Figure 9:
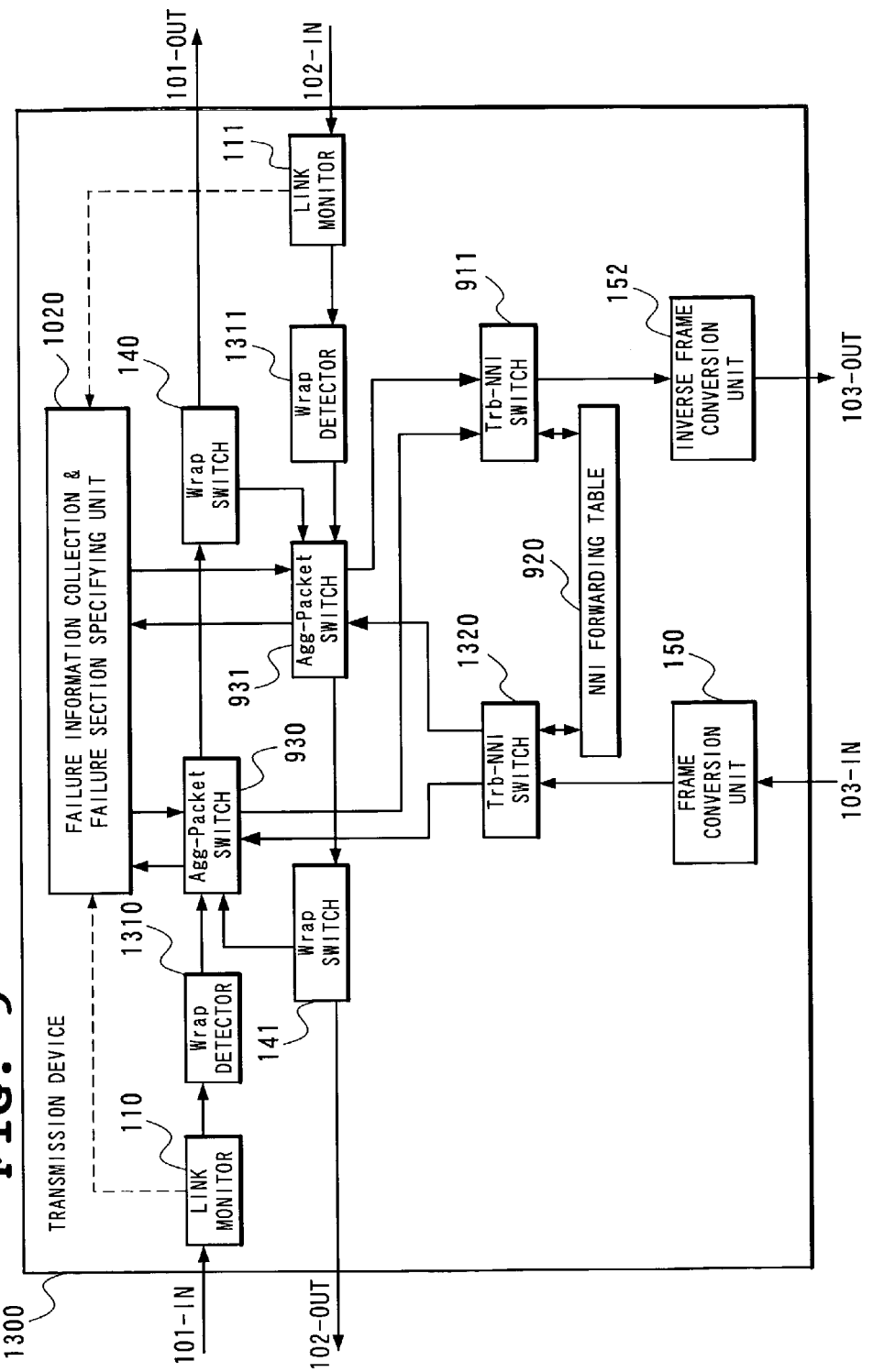
FIG. 9 is a block diagram showing an example of a structure of a transmission device 1300 for use in realizing the second embodiment of the packet protection method in a ring network according to the present invention.

FIG. 9 is a block diagram showing another example of a structure of a transmission device for use in realizing the second embodiment of the packet protection method in a ring network according to the present invention. A transmission device 1300 shown in the figure includes the link monitors 110 and 111, the Wrap switches 140 and 141, the frame conversion unit 150, the inverse frame conversion unit 152, the Agg-Packet switches 930 and 931, the failure information collection & failure section specifying unit 1020, the NNI forwarding table 920 and Trb-NNI switches 1320 and 911. Since the other components than the Trb-NNI switch 1320 and the Wrap detectors 1310 and 1311 have been already described, description will be here made only of the Trb-NNI switch 1320 and the Wrap detectors 1310 and 1311.

The Trb-NNI switch 1320 sends out an NNI packet to an appropriate output port with reference to a transmission destination NNI address of an applied NNI packet and the NNI forwarding table 920. At this time, apply an identifier corresponding to a transmission destination ring (identifier indicative of being an inner ring or an outer ring) to the NNI packet to be transferred.

The Wrap detector 1310 stores a transmission source NNI address #A applied by the frame conversion unit 150, as well as recognizing that its own Wrap detector 1310 is a Wrap detector on the inner ring side. When an NNI packet is applied from the input link 101-IN of the inner ring, extract a transmission source NNI address, a transmission destination NNI address and an identifier indicative of being an inner ring or an outer ring which are applied to the packet. Then, when the extracted transmission source NNI address is coincident with the address #A applied by the frame conversion unit 150 and the identifier indicates an outer ring, determination is made that the NNI packet is wrapped by other transmission device in the ring to update the NNI forwarding table 920 in order to change a transmission ring to the transmission destination NNI address to have a reverse direction. Hereinafter, an NNI packet from a transmission source transmission device to its transmission destination transmission device will be transferred to a ring reverse to that used so far.

Similarly, the Wrap detector 1311 stores the transmission source NNI address #A applied by the frame conversion unit 150 and recognizes that its own Wrap detector 1311 is a Wrap detector on the outer ring side. When an NNI packet is applied from the input link 102-IN of the outer ring, extract a transmission source NNI address, a transmission destination NNI address and an identifier indicative of being an inner ring or an outer ring which are applied to the packet. Then, when the extracted transmission source NNI address is coincident with the address #A applied by the frame conversion unit 150 and the identifier indicates an inner ring, determination is made that the packet is wrapped by other transmission device in the ring to update the NNI forwarding table 920 in order to change a transmission ring to the transmission destination NNI address to have a reverse direction. Hereinafter, an NNI packet from a transmission source transmission device to its transmission destination transmission device will be transferred to a ring reverse to that used so far.

Also in a case where each of the transmission devices 600-1 to 600-6 in FIGS. 2A, 2B and 2C is formed of the transmission device 1300 shown in FIG. 9, the protection process itself is the same as that of a case where the transmission device 1000 shown in FIG. 6 is used, in which an NNI packet is protected on the path 602 in FIG. 2B immediately after a failure occurs and thereafter protected on the path 603 in FIG. 2C.

When an NNI packet is applied from the tributary port 103-IN, the frame conversion unit 150 and the inverse frame conversion unit 152 are unnecessary in the transmission device 1300. Although in the foregoing description, switching of the Wrap switches 140 and 141 is conducted by the failure information collection & failure section specifying unit 520, it may be conducted by the link monitors 110 and 111. Thus, the present embodiment also enables deterioration in network efficiency caused by wrapping to be avoided except for immediately after the occurrence of a failure.

Third Embodiment of the Present Invention

Figure 10:
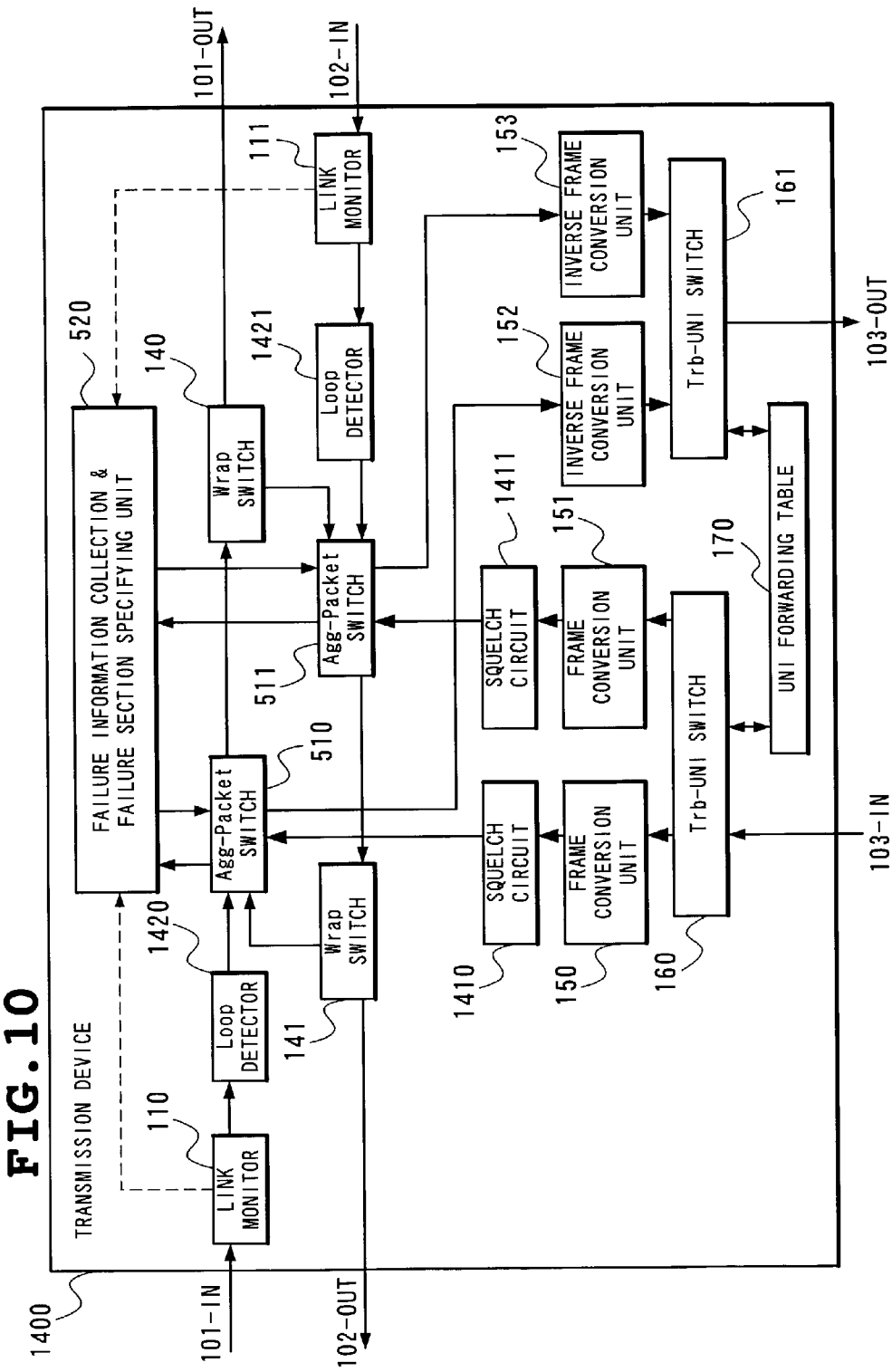
FIG. 10 is a block diagram showing an example of a structure of a transmission device 1400 for use in realizing a third embodiment of a packet protection method in a ring network according to the present invention.

FIG. 10 is a block diagram showing an example of a structure of a transmission device for use in realizing a third embodiment of the packet protection method in a ring network according to the present invention. A transmission device 1400 shown in FIG. 10 is structured to further include squelch circuits 1410 and 1411 and Loop detectors 1420 and 1421 in the transmission device 500 shown in FIG. 1. In the following, description of the components which have been already made is omitted and only the newly added components and their peripheral portions will be described.

The Loop detectors 1420 and 1421 internally hold the addresses #A and #B applied to NNI packets by the frame conversion units 150 and 151, respectively. The loop detectors 1420 and 1421 each have the function of recognizing a transmission source NNI address and a transmission destination NNI address of an NNI packet applied from the link monitors 110 and 111, the function of determining whether a transmission source of the NNI packet is its own transmission device or not based on the held addresses #A and #B and the transmission source NNI address of the NNI packet, and the function of instructing the squelch circuits 1410 and 1411 to squelch an NNI packet having the same transmission destination NNI address as the transmission destination NNI address of the above-described NNI packet when the transmission source of the above-described NNI packet is its own transmission device.

The squelch circuits 1410 and 1411 have the function of squelching an NNI packet having a specific transmission destination NNI address according to an instruction from the Loop detectors 1420 and 1421.

Figure 11:
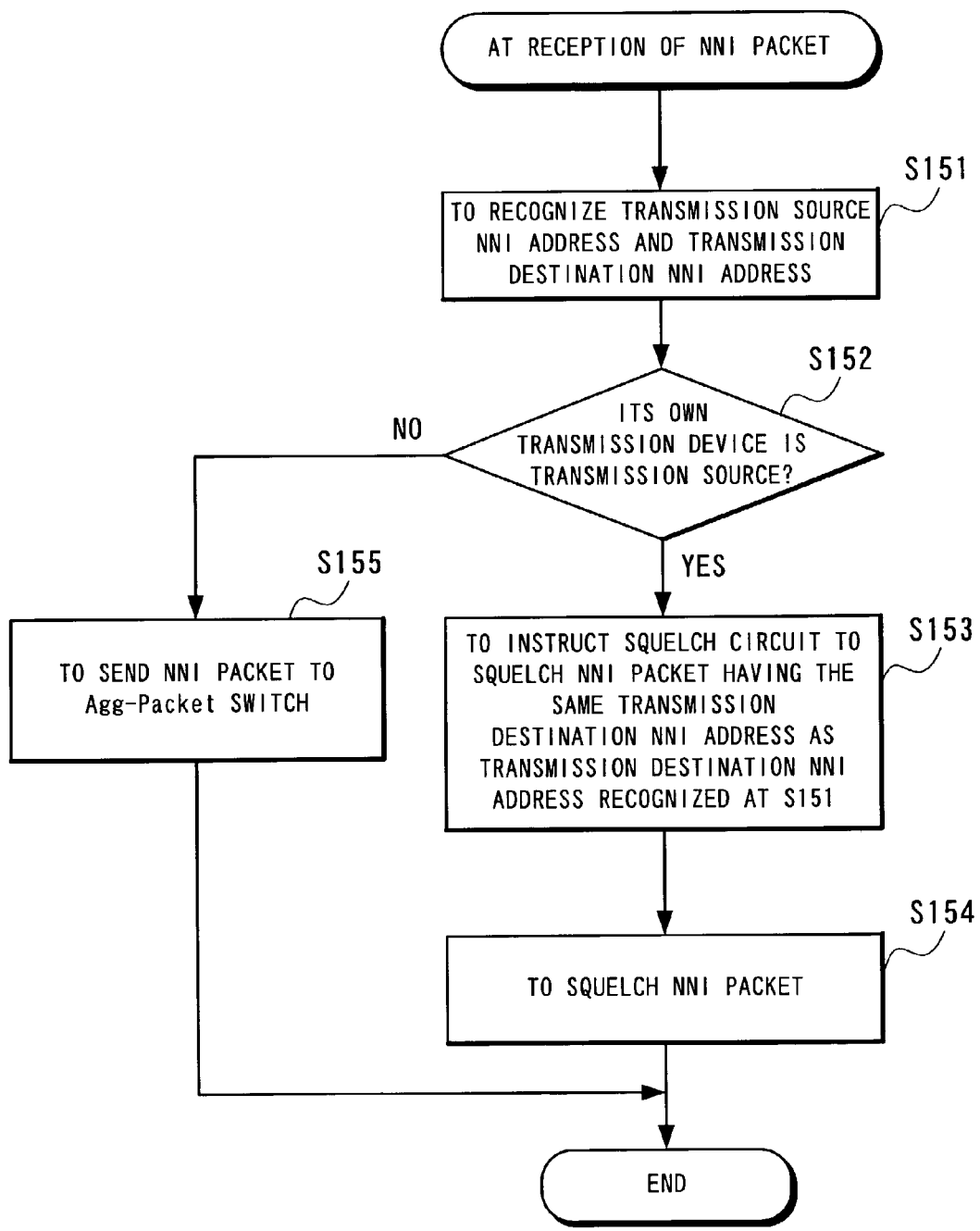
FIG. 11 is a flow chart showing an example of processing of Loop detectors 1420 and 1421.

When receiving input of an NNI packet from the link monitor 110, the Loop detector 1420 recognizes its transmission source NNI address and transmission destination NNI address (FIG. 11, Step S151). Thereafter, the Loop detector 1420 determines whether the held address #A and the transmission source NNI address of the NNI packet coincide with each other to determine whether the NNI packet is an NNI packet whose transmission source is its own transmission device or not (Step S152). In other words, determination is made whether there exists a transmission device as a transmission destination of the NNI packet in question or not. Then, when the determination is made that its own transmission device is not the transmission source, output the NNI packet to the Agg-Packet switch 510 (NO at Step 152, S155). On the other hand, when the determination is made that its own transmission device is the transmission source, notify the squelch circuit 1410 of the transmission destination NNI address of the NNI packet in question recognized at Step S151 and give an instruction on squelching of an NNI packet having the transmission destination NNI address in question (YES at Step S152, Steps 153, S154). The Loop detector 1421 also conducts the same processing.

Figure 12:
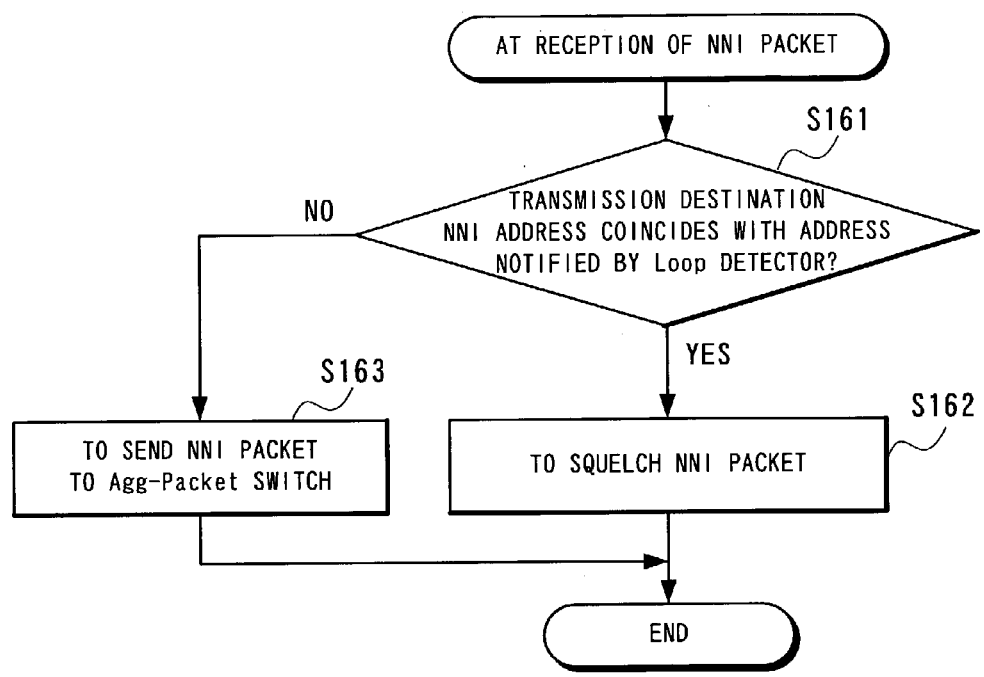
FIG. 12 is a flow chart showing an example of processing of squelch circuits 1410 and 1411.

When receiving input of an NNI packet from the frame conversion unit 150, the squelch circuit 1410 determines whether a transmission destination NNI address of the NNI packet coincides with an address notified by the Loop detector 1420 (FIG. 12, Step S161). Then, when they coincide with each other (YES at Step S161), squelch the NNI packet (Step S162) and otherwise (NO at Step S161), output the NNI packet to the Agg-Packet switch 510 (Step S163). The squelch circuit 1411 also conducts the same processing as that of the squelch circuit 1410.

Figure 13A:
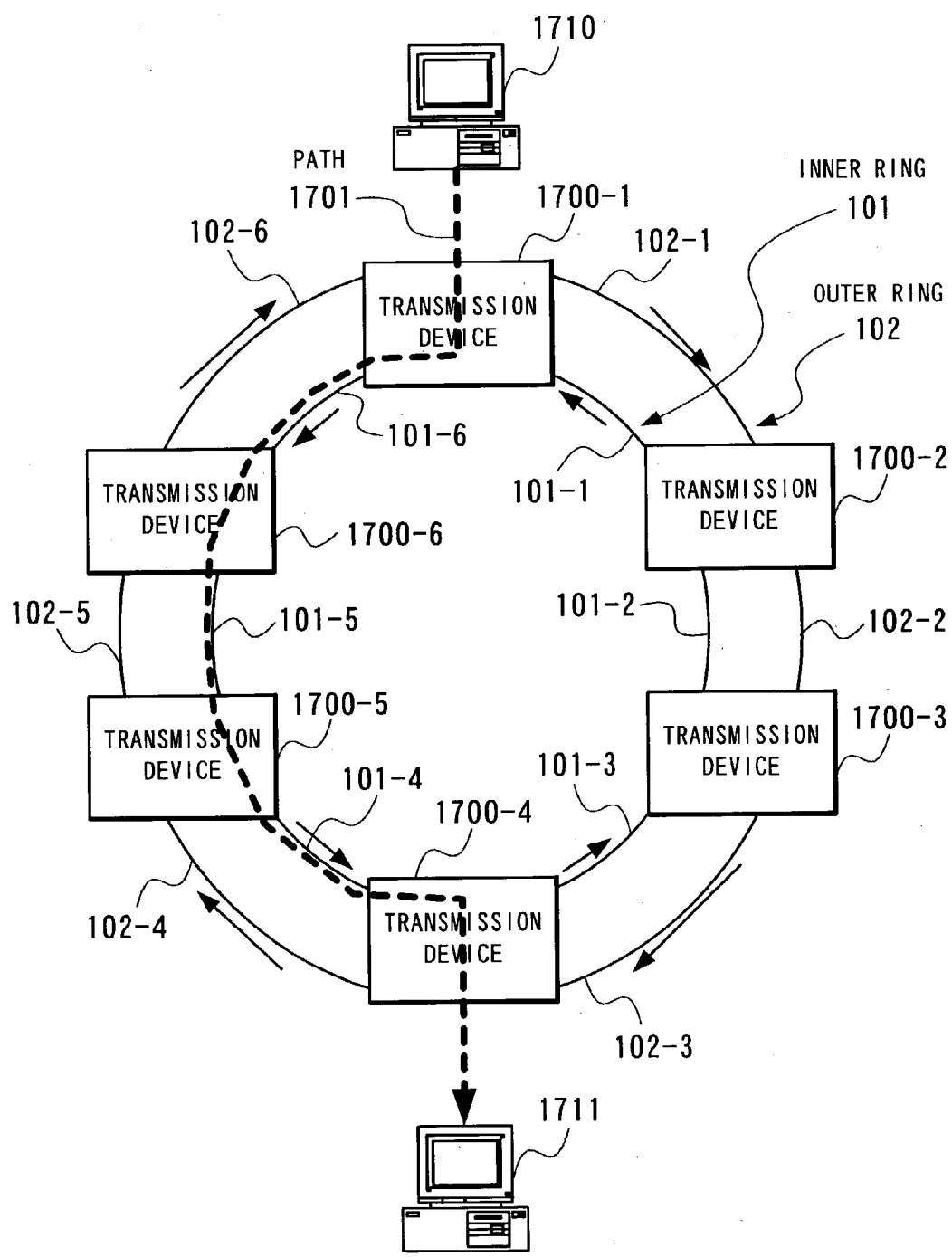
FIG. 13A is a diagram for use in explaining the third embodiment of the packet protection method in a ring network according to the present invention.
Figure 13B:
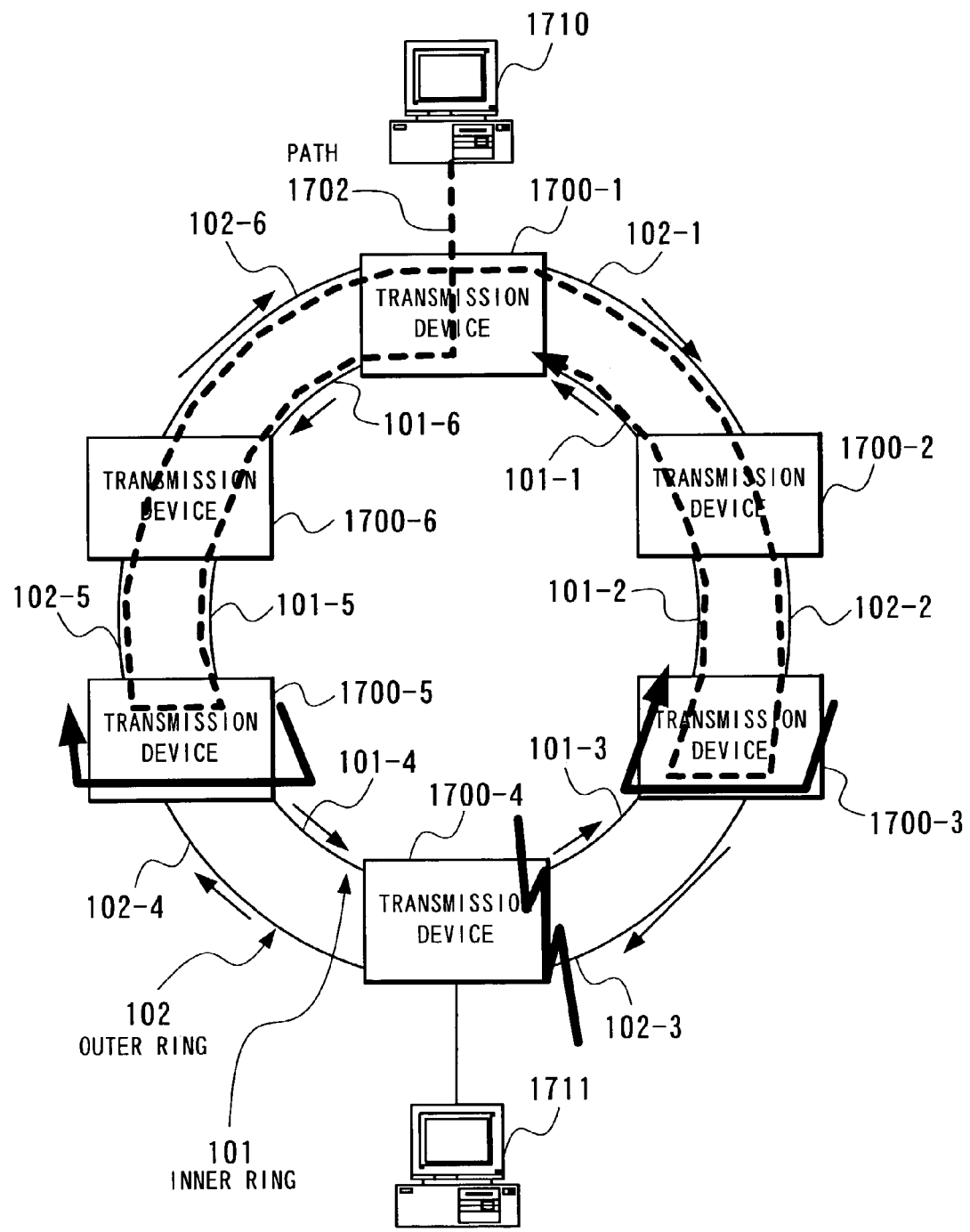
FIG. 13B is a diagram for use in explaining the third embodiment of the packet protection method in a ring network according to the present invention.
Figure 13C:
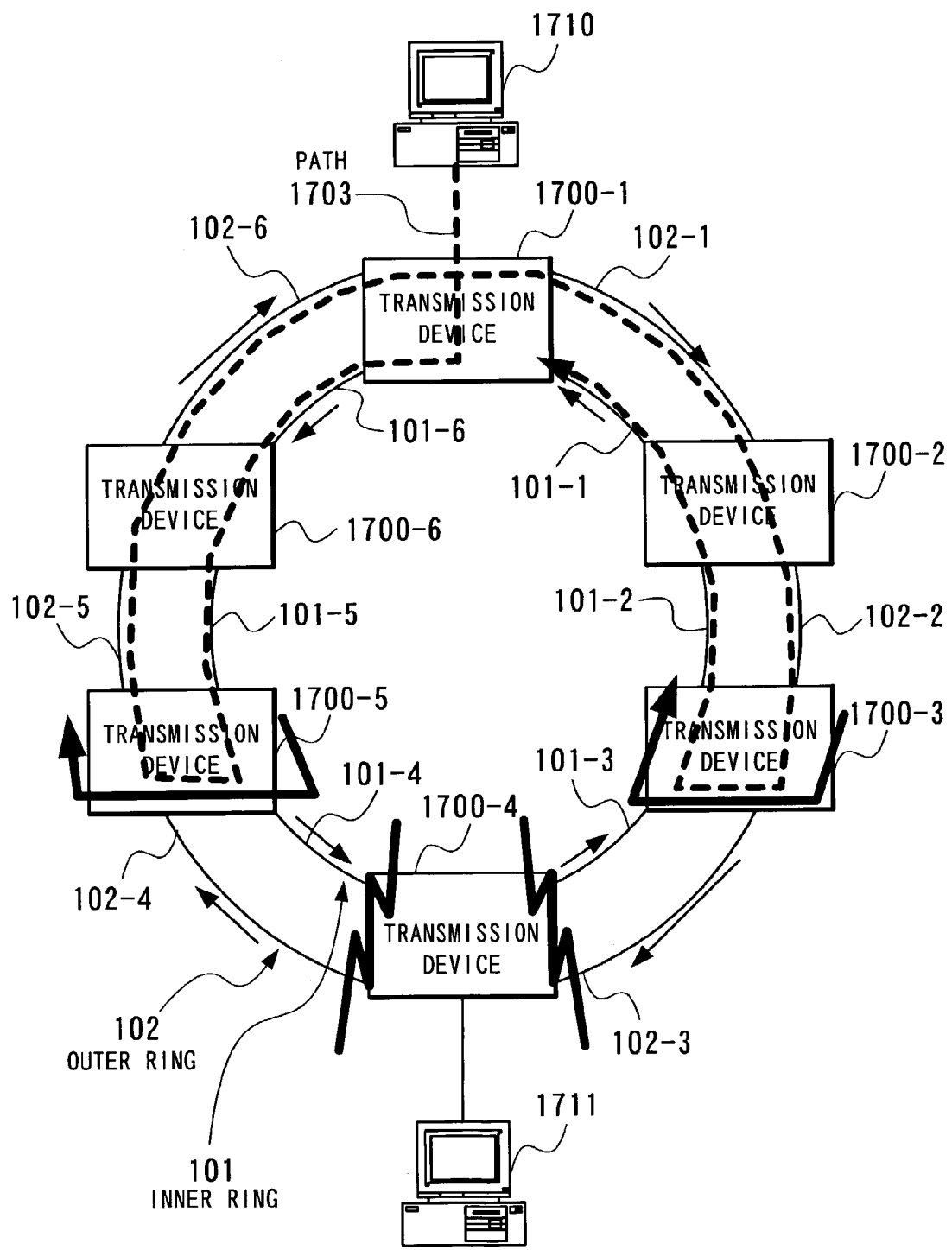
FIG. 13C is a diagram for use in explaining the third embodiment of the packet protection method in a ring network according to the present invention.

Next, the third embodiment of the packet protection method in a ring network according to the present invention will be described. FIGS. 13A, 13B and 13C show a two-fiber ring in which transmission devices 1700-1 to 1700-6 are connected in a ring. Each of the transmission devices 1700-1 to 1700-6 has the same structure as that of the transmission device 1400

As shown in a path 1701 in FIG. 13A, assume that before a failure occurs, a UNI packet sent out from a terminal 1710 is converted into an NNI packet at the transmission device 1700-1 and after transferred to the transmission device 1700-4 through the inner ring 101, again converted into a UNI packet and transferred to a terminal 1711 connected to the transmission device 1700-4.

Upon detecting a failure, the link monitors 110 and 111 of the transmission devices 1700-3 and 1700-5 adjacent to the transmission device 1700-4 notify the failure information collection & failure section specifying unit 520 of the detection. The failure information collection & failure section specifying units 520 of the transmission devices 1700-3 and 1700-5 switch the Wrap switches 140 and 141 to conduct wrapping, as well as sending a ring network failure information notification packet to the inner ring 101 and the outer ring 102 to notify all the transmission devices in the ring of the occurrence of the failure.

As a result, as shown in a path 1702 in FIG. 13B, an NNI packet sent from the transmission device 1700-1 to the transmission device 1700-4 through the inner ring 101 is wrapped at the transmission device 1700-5 and transferred to the transmission device 1700-3 through the transmission devices 1700-6, 1700-1 and 1700-2 by using the outer ring 102. The NNI packet is again wrapped at the transmission device 1700-3 and transferred to the transmission device 1700-1 through the transmission device 1700-2 by using the inner ring 101. At this time, the Loop detector 1421 of the transmission device 1700-1, since the transmission source NNI address of its received NNI packet is coincident with the NNI address applied by the frame conversion unit 150, squelches the NNI packet, as well as notifying the squelch circuit 1410 to squelch an NNI packet directed to the transmission destination NNI address in question. The squelch circuit 1410 squelches NNI packets which will be hereinafter applied bound for the transmission destination NNI address in question.

By the same manner, also in a protection method in a case where a multiple failure occurs in the links 101-3, 101-4, 102-3 and 102-4 to isolate the transmission device 1700-4 as well as a case of a transmission device failure, when a transmitted NNI packet makes a round of the ring, the NNI packet is squelched and an NNI packet which will be generated hereafter and has no transmission device as a transmission destination is also squelched to prevent the packet from entering the ring network as shown in FIG. 13C. Such situation can occur, irrespectively of occurrence/non-occurrence of a failure, when a transmission destination NNI address not existing in the ring is applied. Also in this case, by squelching an NNI packet after the packet makes a round, an increase in useless traffic can be prevented. As a matter of course, when a transmission media failure similar to that of FIG. 2B occurs in FIGS. 13A, 13B and 13C, the same protection process as that of the first and the second embodiments is executed.

Figure 14:
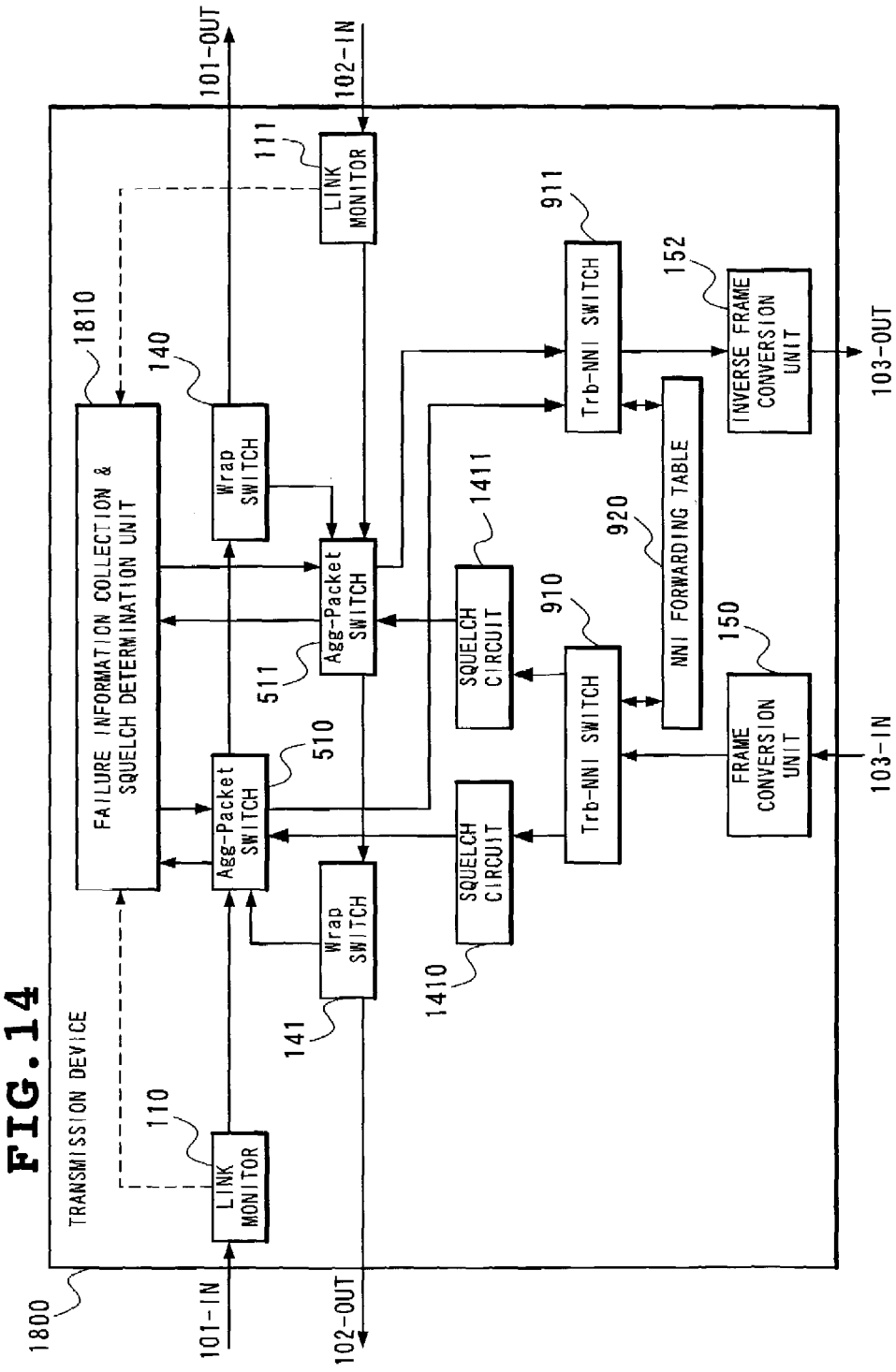
FIG. 14 is a block diagram showing an example of a structure of a transmission device 1800 for use in realizing the third embodiment of the packet protection method in a ring network according to the present invention.

FIG. 14 is a block diagram showing another example of a structure of a transmission device for use in realizing the third embodiment of the packet protection method in a ring network according to the present invention. A transmission device 1800 shown in FIG. 14 differs from the transmission device 1400 shown in FIG. 10 in having the Loop detectors 1420 and 1421 excluded and including a failure information collection & squelch determination unit 1810 in place of the failure information collection & failure section specifying unit 520.

The failure information collection & squelch determination unit 1810 has, in addition to the function held by the failure information collection & failure section specifying unit 520, the function of determining whether there exists a transmission device which becomes unreachable due to a transmission device failure or a multiple failure and the function of notifying the squelch circuits 1410 and 1411 of a transmission destination address of an NNI packet to be squelched.

Figure 15:
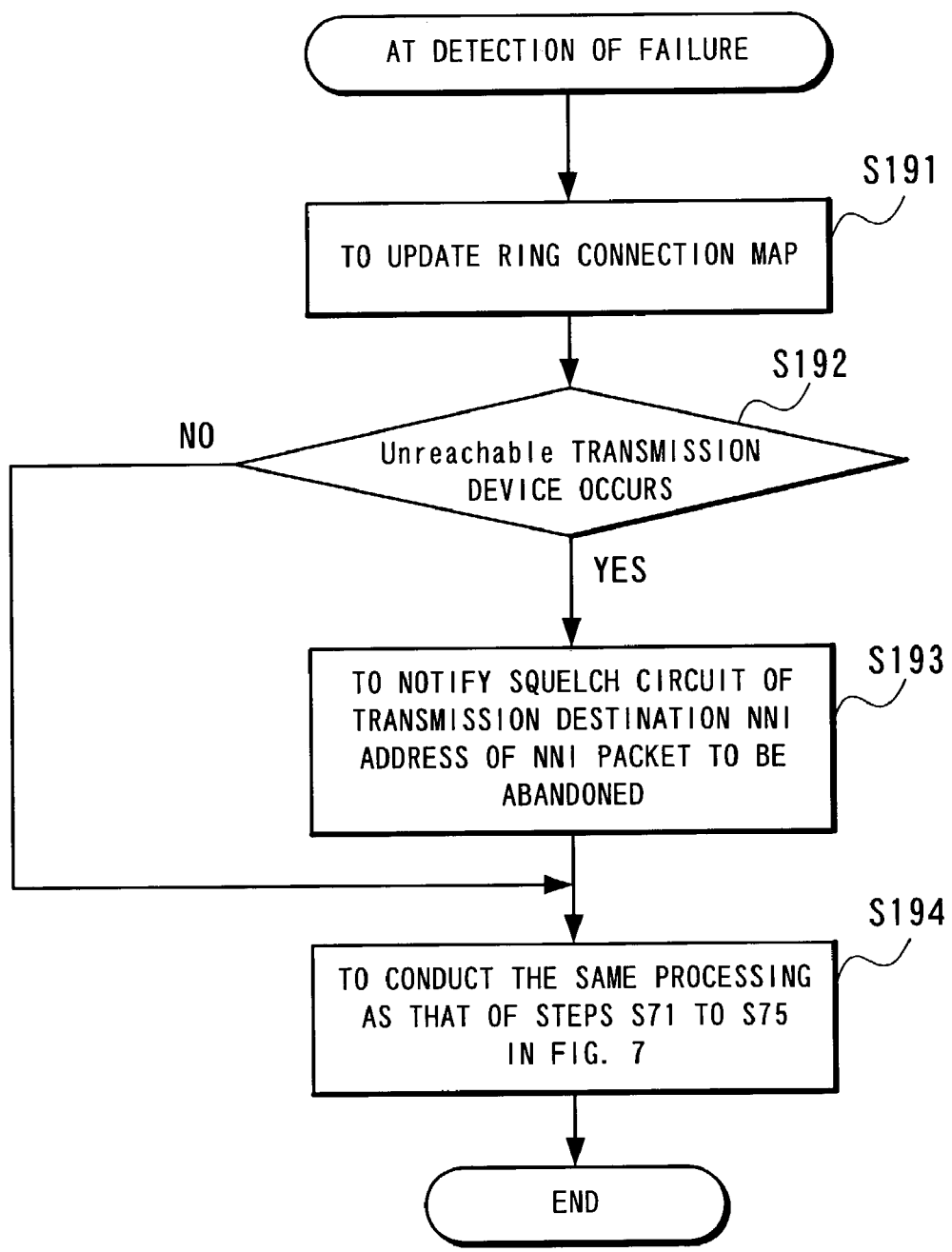
FIG. 15 is a flow chart showing an example of processing of a failure information collection & squelch determination unit 1810.

When notified the occurrence of a failure in the input links 101-IN and 102-IN by the link monitors 110 and 111, the failure information collection & squelch determination unit 1810 in the transmission device 1800 updates a ring connection map indicative of a ring connection state (FIG. 15, Step S191). Thereafter, based on the contents of the ring connection map, the failure information collection & squelch determination unit 1810 checks whether there occurs a transmission device which becomes unreachable due to a transmission device failure or a multiple failure (Step S192). Then, when determining that an unreachable transmission device occurs, notify the squelch circuits 1410 and 1411 of an NNI address of the transmission device in question as a transmission destination NNI address of an NNI packet to be squelched (Step S193). Thereafter, the failure information collection & squelch determination unit 1810 conducts the same processing as that of Steps S71 to S75 in FIG. 3 (Step S194). When the determination is made that no transmission device occurs which becomes unreachable at Step S192, immediately conduct the processing of Step S194.

Figure 16:
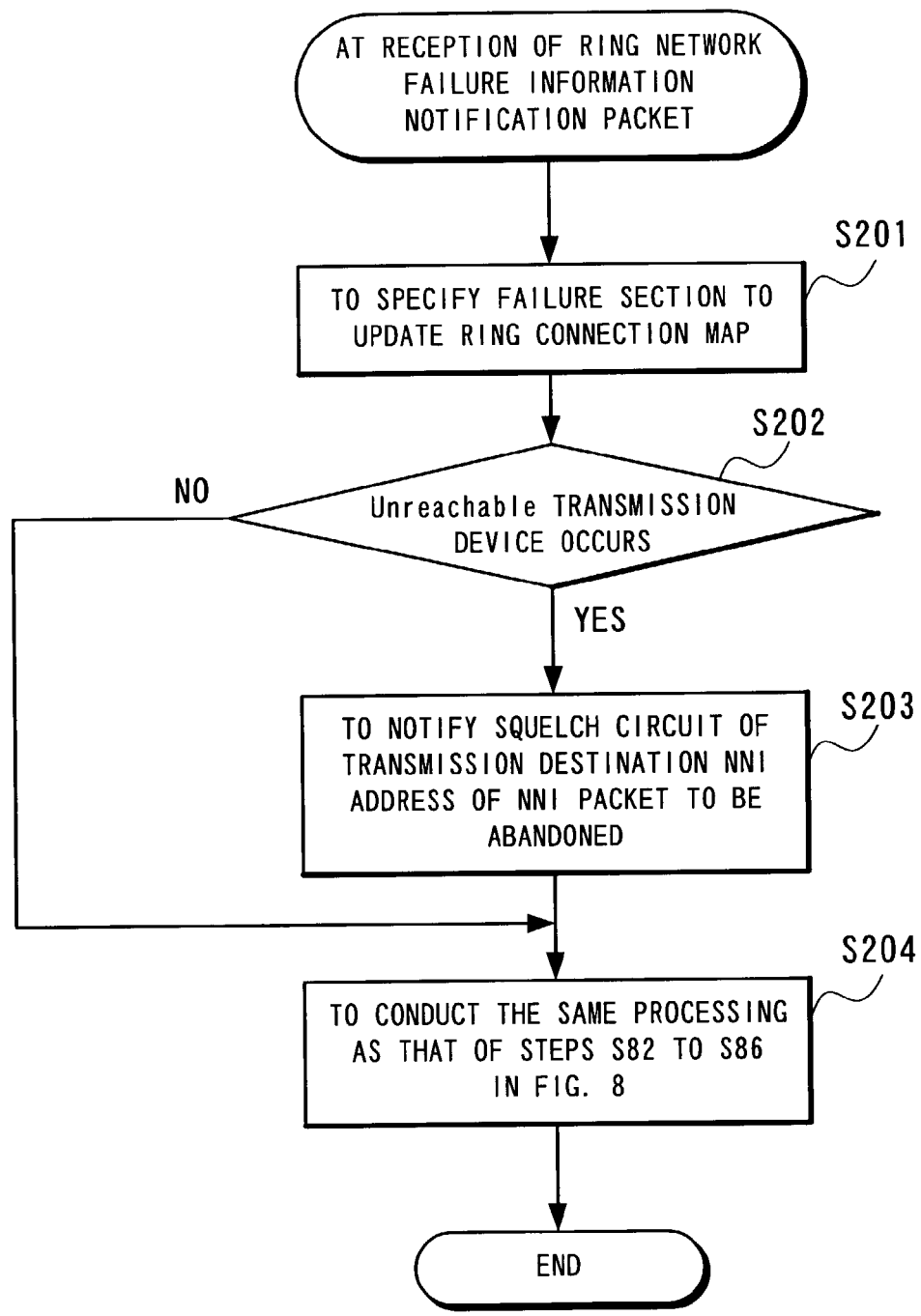
FIG. 16 is a flow chart showing an example of processing of the failure information collection & squelch determination unit 1810.

In addition, when receiving a ring network failure information notification packet from other transmission device forming the ring, the failure information collection & squelch determination unit 1810 in the transmission device 1800 specifies a failure part, as well as updating the ring connection map (FIG. 16, Step S201). Thereafter, based on the contents of the ring connection map, check whether a transmission device which becomes unreachable occurs (Step S202). Then, when an unreachable transmission device occurs, notify the squelch circuits 1410 and 1411 of an NNI address of the transmission device in question as a transmission destination NNI address of an NNI packet to be squelched (Step S203). Thereafter, the failure information collection & squelch determination unit 1810 conducts the same processing as that of Steps S82 to S86 in FIG. 4 (Step S204). When the determination is made that no transmission device occurs which becomes unreachable at Step S202, immediately conduct the processing of Step S204.

The squelch circuits 1410 and 1411 squelch a packet whose transmission NNI address is the NNI address notified by the failure information collection & squelch determination unit 1810 among NNI packets applied from the Trb-NNI switch 910.

State of squelch of a specific transmission destination NNI address in the squelch circuits 1410 and 1411 is released when the failure information collection & squelch determination unit 1810 confirms the elimination of a failure situation or when notified of the same by a network management system (not shown), or when a transmission source NNI address of a received NNI packet coincides with the NNI address designated to be squelched, or after a lapse of a certain time.

Also in a case where each of the transmission devices 1700-1 to 1700-6 in FIGS. 13A, 13B and 13C is formed of the transmission device 1800 shown in FIG. 14, the protection process itself is the same as that of a case where the transmission device 1400 shown in FIG. 10 is used. Thus, according to the present embodiment, when a transmission device as a transmission destination is eliminated due to a transmission device failure/multiple failure or when the device is cut off from the ring network, an NNI packet bound for the transmission destination transmission device can be squelched to realize efficient protection.

Fourth Embodiment of the Present Invention

Figure 17:
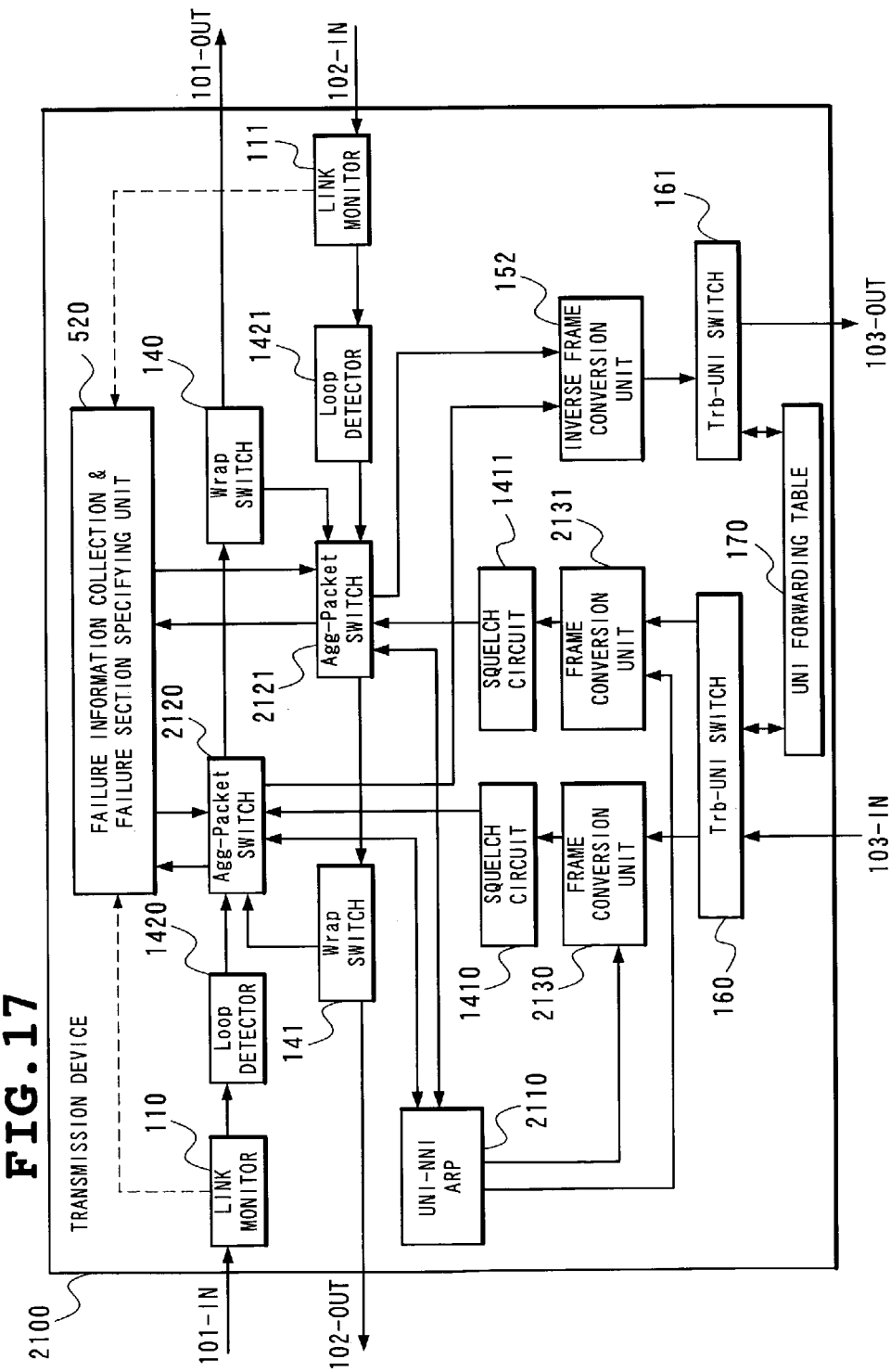
FIG. 17 is a block diagram showing an example of a structure of a transmission device 2100 for use in realizing a fourth embodiment of a packet protection method in a ring network according to the present invention.

FIG. 17 is a block diagram showing an example of a structure of a transmission device for use in realizing a fourth embodiment of the packet protection method in a ring network according to the present invention.

A transmission device 2100 shown in FIG. 17 differs from the transmission device 1400 shown in FIG. 10 in additionally including a UNI-NNI ARP 2110, and including Agg-Packet switches 2120 and 2121 in place of the Agg-Packet switches 510 and 511 and frame conversion units 2130 and 2131 in place of the frame conversion units 150 and 151.

The Agg-Packet switches 2120 and 2121 have the function, in addition to the function held by the Agg-Packet switches 510 and 511, of transmitting a protection path search packet and a protection path search response packet applied through the link monitors 110 and 111 to the UNI-NNI ARP 2110 and the function of outputting a protection path search packet and a protection path search response packet sent from the UNI-NNI ARP 2110 to the Wrap switches 140 and 141.

The UNI-NNI ARP 2110 has the function of searching for a protection path of a UNI packet transferred through a transmission device which is to be squelched due to a transmission device failure or a multiple failure. More specifically, the UNI-NNI ARP 2110 has the function of broadcasting a protection path search packet including a transmission destination UNI address and a transmission source NNI address of a UNI packet to be squelched through the inner ring 101-OUT or the outer ring 102-OUT, the function of checking, at the reception of a protection path search packet, whether a terminal or a transmission device whose address is coincident with a transmission destination UNI address in the protection path search packet is connected to the tributary port 103 to return the check result as a protection path search response packet and the function of, at the reception of a protection path search response packet, instructing to narrow down NNI addresses of a transmission device connected to a terminal as a UNI packet transfer destination to one, change the transmission destination NNI address of the NNI packet as a target of squelch to the narrowed down one NNI address and transfer the changed packet.

The frame conversion units 2130 and 2131 have the function, in addition to the functions held by the frame conversion units 150 and 151, of converting an NNI packet as a target of squelch into an NNI packet having a transmission destination NNI address which is not a target of squelch according to an instruction from the UNI-NNI ARP 2110.

Figure 18A:
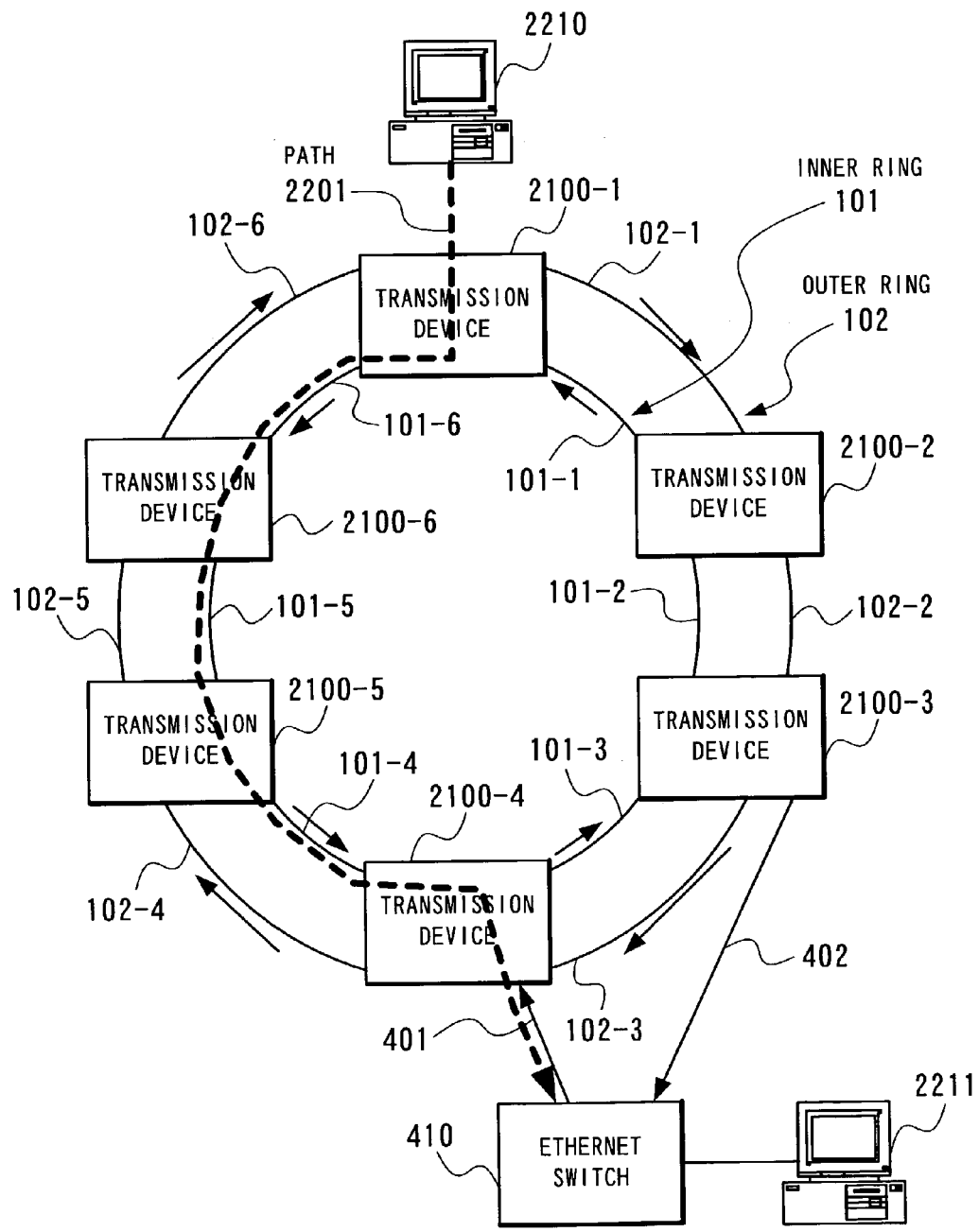
FIG. 18A is a diagram for use in explaining the fourth embodiment of the packet protection method in a ring network according to the present invention.

Next, the fourth embodiment of the packet protection method in a ring network according to the present invention will be described with reference to FIGS. 18A, 18B, 19A, 19B and 19C. Each of transmission devices 2100-1 to 2100-6 in FIGS. 18A and 18B has the same structure as that of the transmission device 2100 shown in FIG. 17. As shown in FIG. 18A, assume that before a failure occurs, a UNI packet from a terminal 2210 to a terminal 2211 is transferred through a path 2201. More specifically, assume that after converted into an NNI packet by the transmission device 2100-1, the UNI packet from the terminal 2210 to the terminal 2211 is output to the inner ring 101 and transferred to the terminal 2211 from an actual use port 401 through the transmission devices 2100-6, 2100-5 and 2100-4.

Figure 18B:
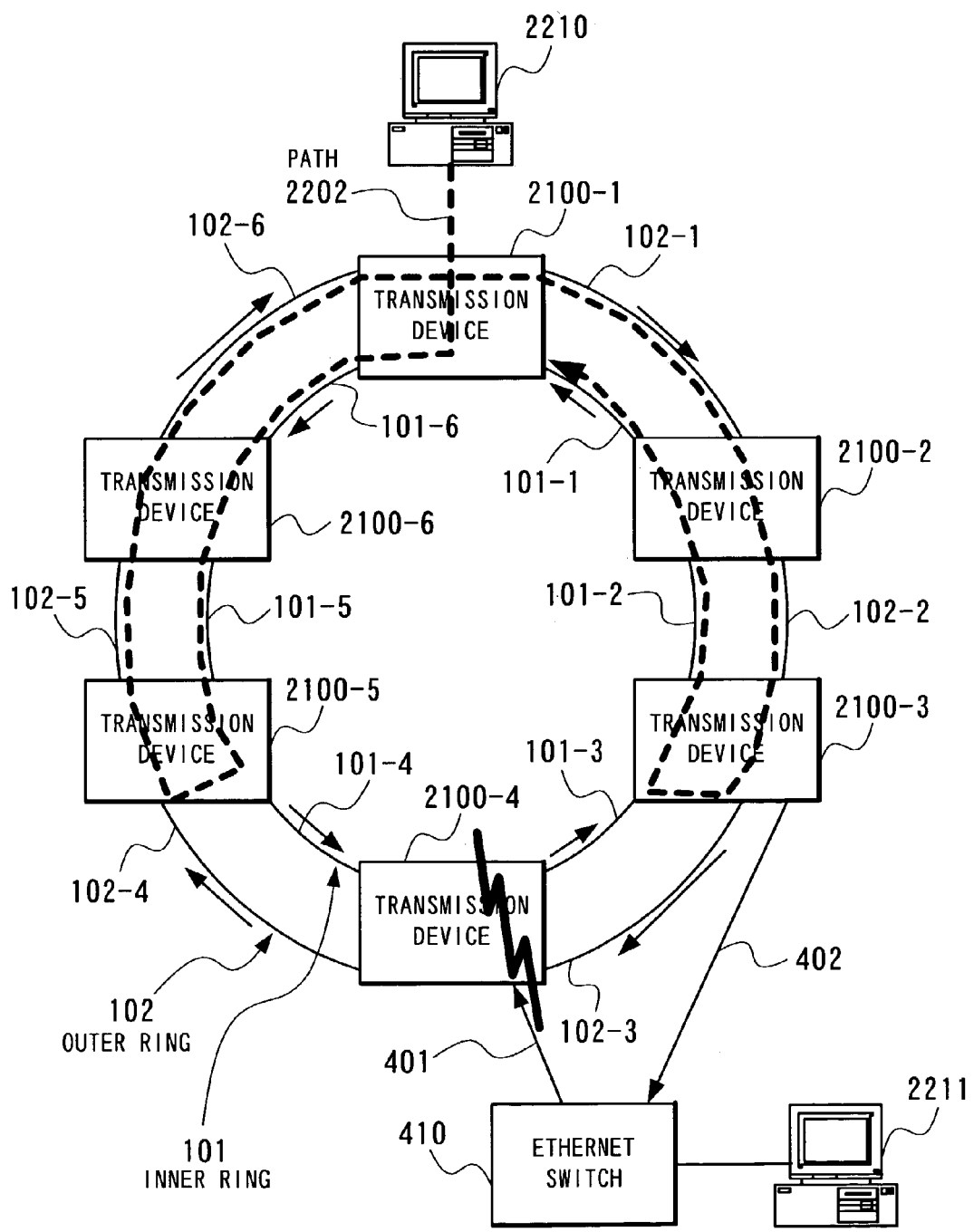
FIG. 18B is a diagram for use in explaining the fourth embodiment of the packet protection method in a ring network according to the present invention.

When a failure occurs in the transmission device 2100-4, as indicated in a path 2202 in FIG. 18B, an NNI packet output from the transmission device 2100-1 makes a round of the ring network and is applied to the transmission device 2100-1. Upon detecting the fact, the Loop detector 1420 in the transmission device 2100-1 instructs the squelch circuit 1410 to squelch an NNI packet whose transmission destination NNI address is the NNI address of the transmission device 2100-4. Hereinafter, an NNI packet from the transmission device 2100-1 to the transmission device 2100-4 will be squelched by the squelch circuit 1410 in the transmission device 2100-1.

Figure 20:
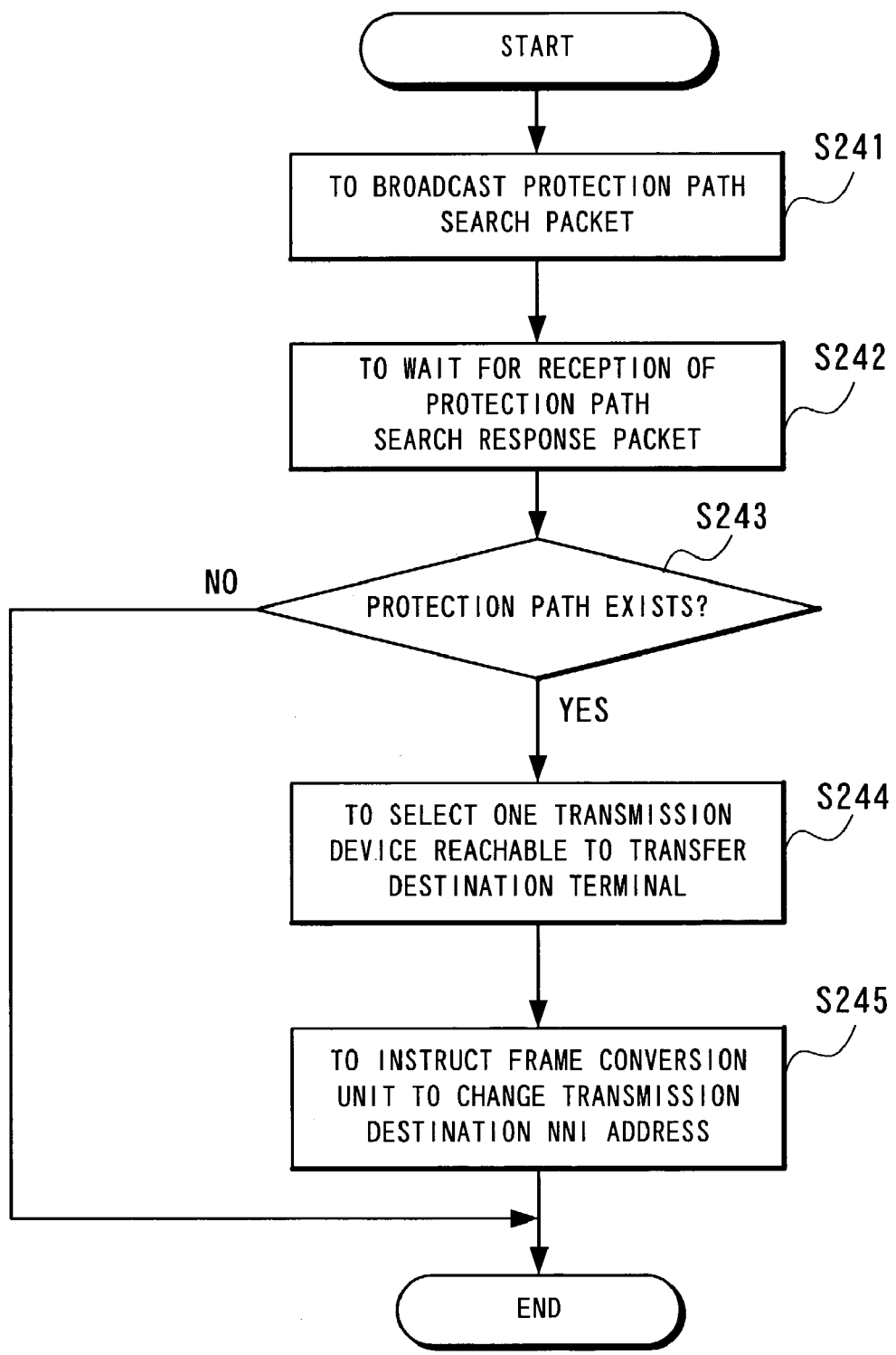
FIG. 20 is a flow chart showing an example of processing of a UNI-NNI ARP 2110.

When the Loop detector 1420 gives an instruction to the squelch circuit 1410, immediately or after a lapse of a fixed time, the UNI-NNI ARP 2110 of the transmission device 2100-1 starts processing shown in the flow chart of FIG. 20 and first, broadcasts a protection path search packet including the UNI address of the terminal 2211 (Step S241). As shown in a path 2203 in FIG. 19A, the protection path search packet is transferred to the transmission devices 2100-2, 2100-3, 2100-5 and 2100-6.

Figure 19A:
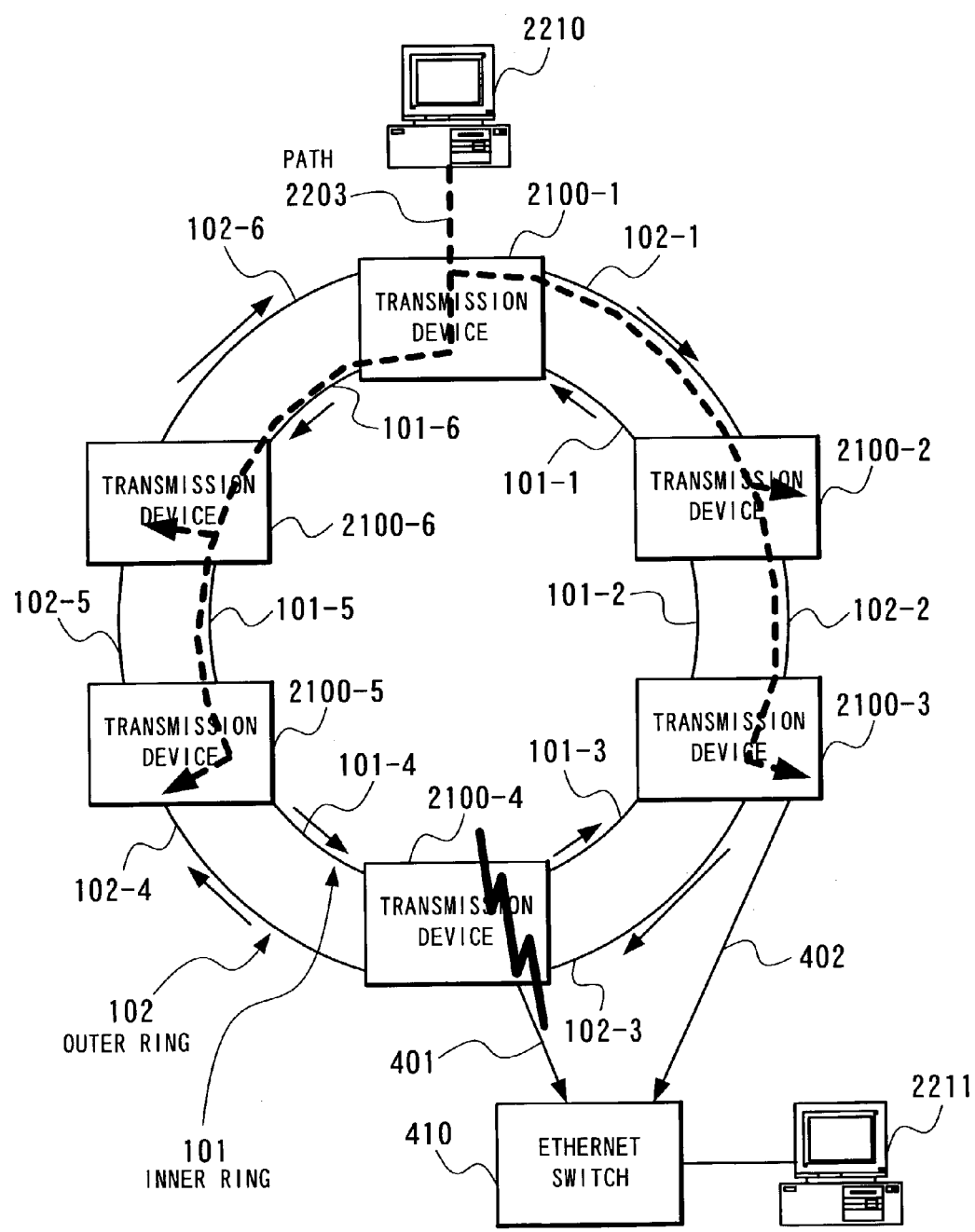
FIG. 19A is a diagram for use in explaining the fourth embodiment of the packet protection method in a ring network according to the present invention.
Figure 19B:
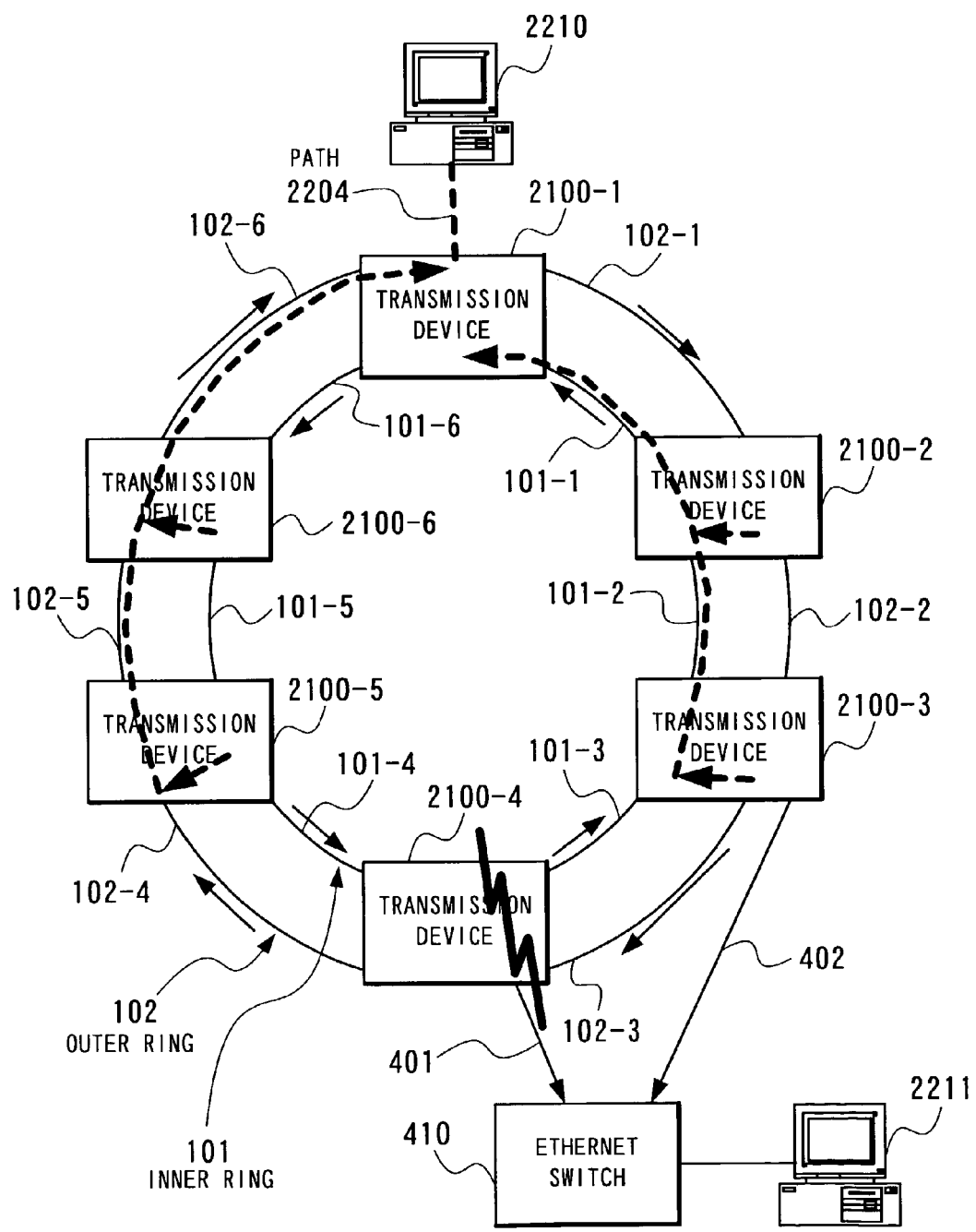
FIG. 19B is a diagram for use in explaining the fourth embodiment of the packet protection method in a ring network according to the present invention.
Figure 21:
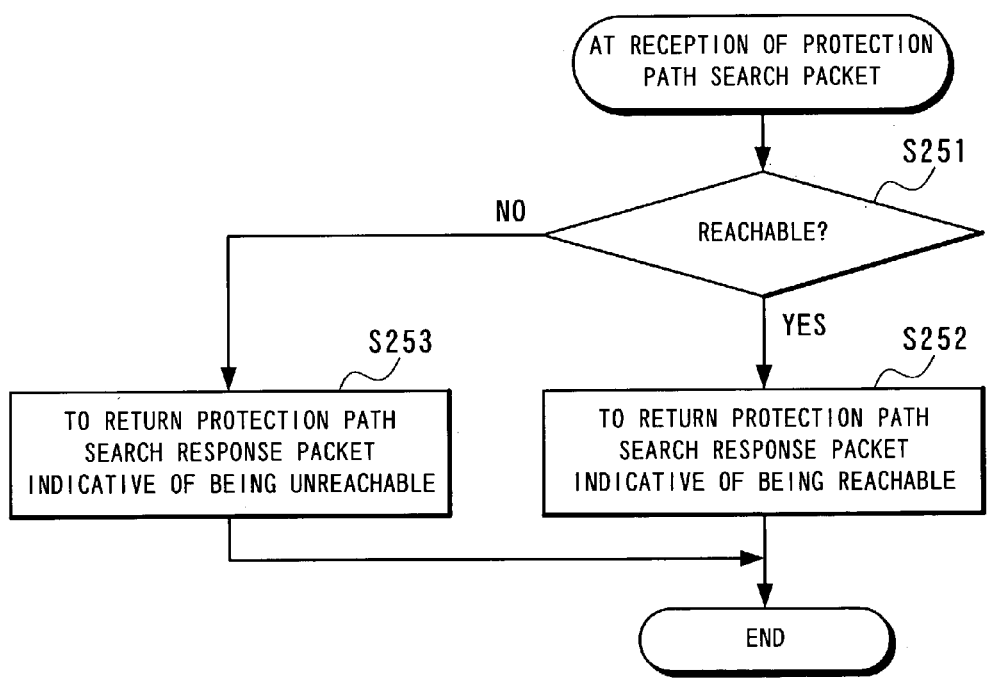
FIG. 21 is a flow chart showing an example of processing of the UNI-NNI ARP 2110.
Figure 22:
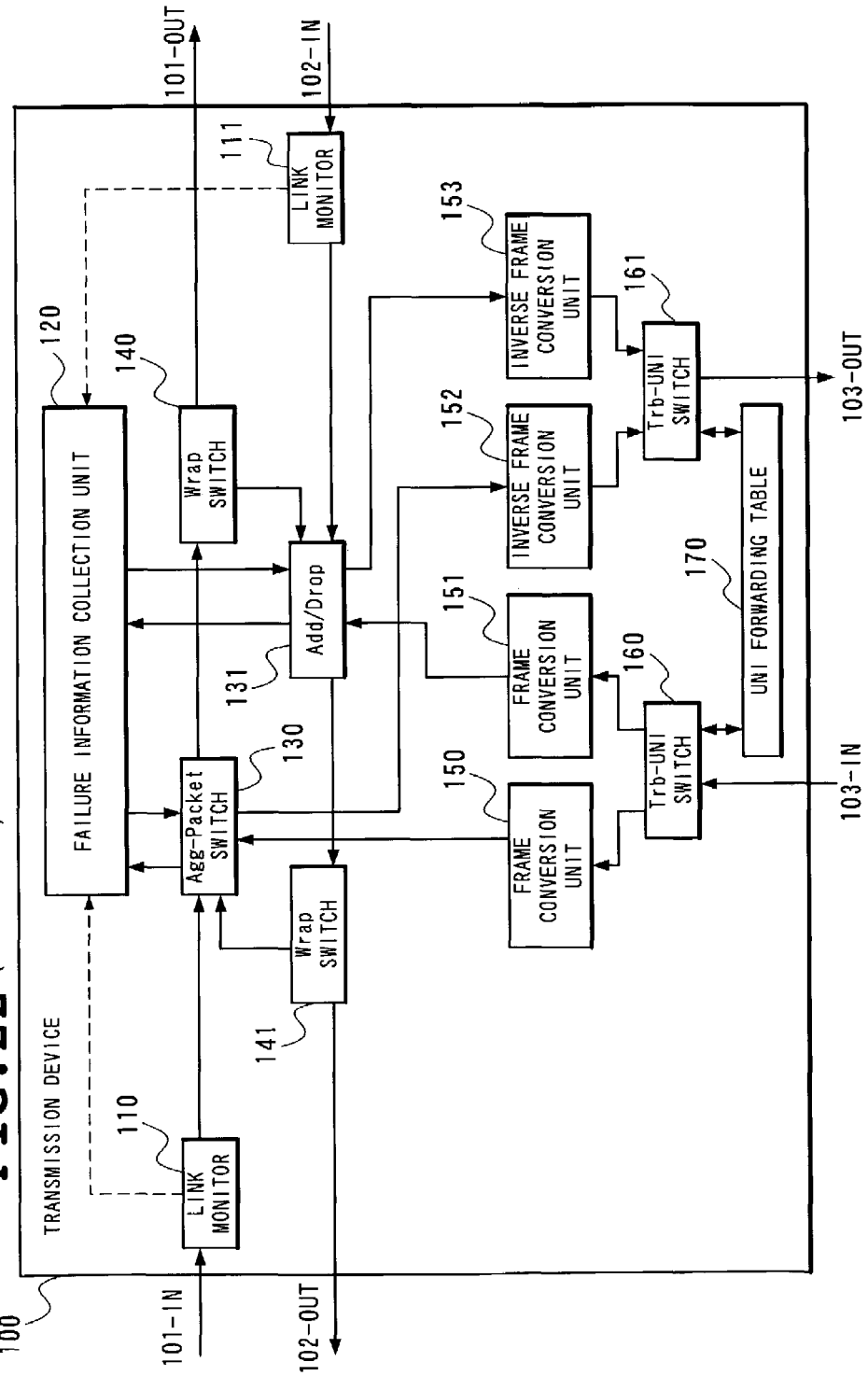
FIG. 22 is a block diagram showing an example of a structure of a conventional transmission device 100.
Figure 23A:
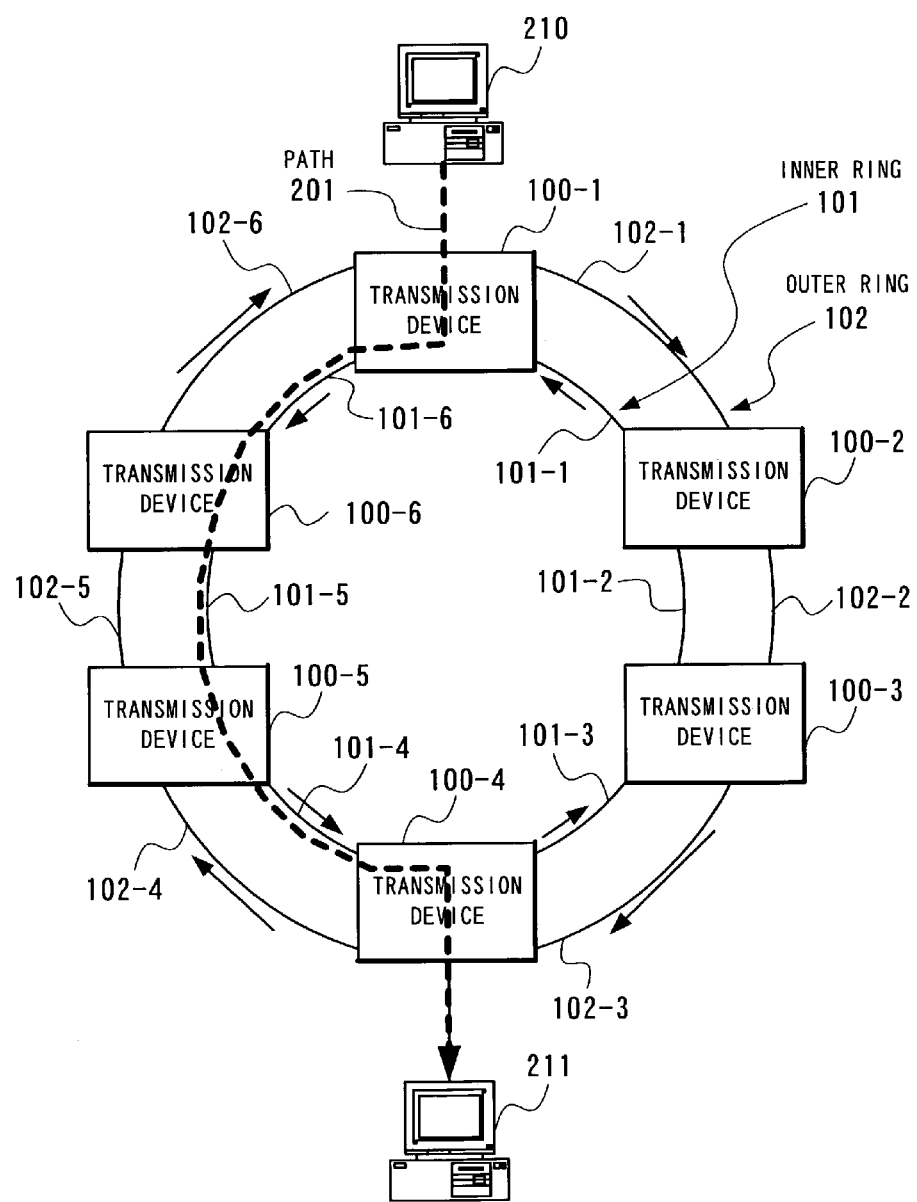
FIG. 23A is a diagram for use in explaining a conventional packet protection method.
Figure 23B:
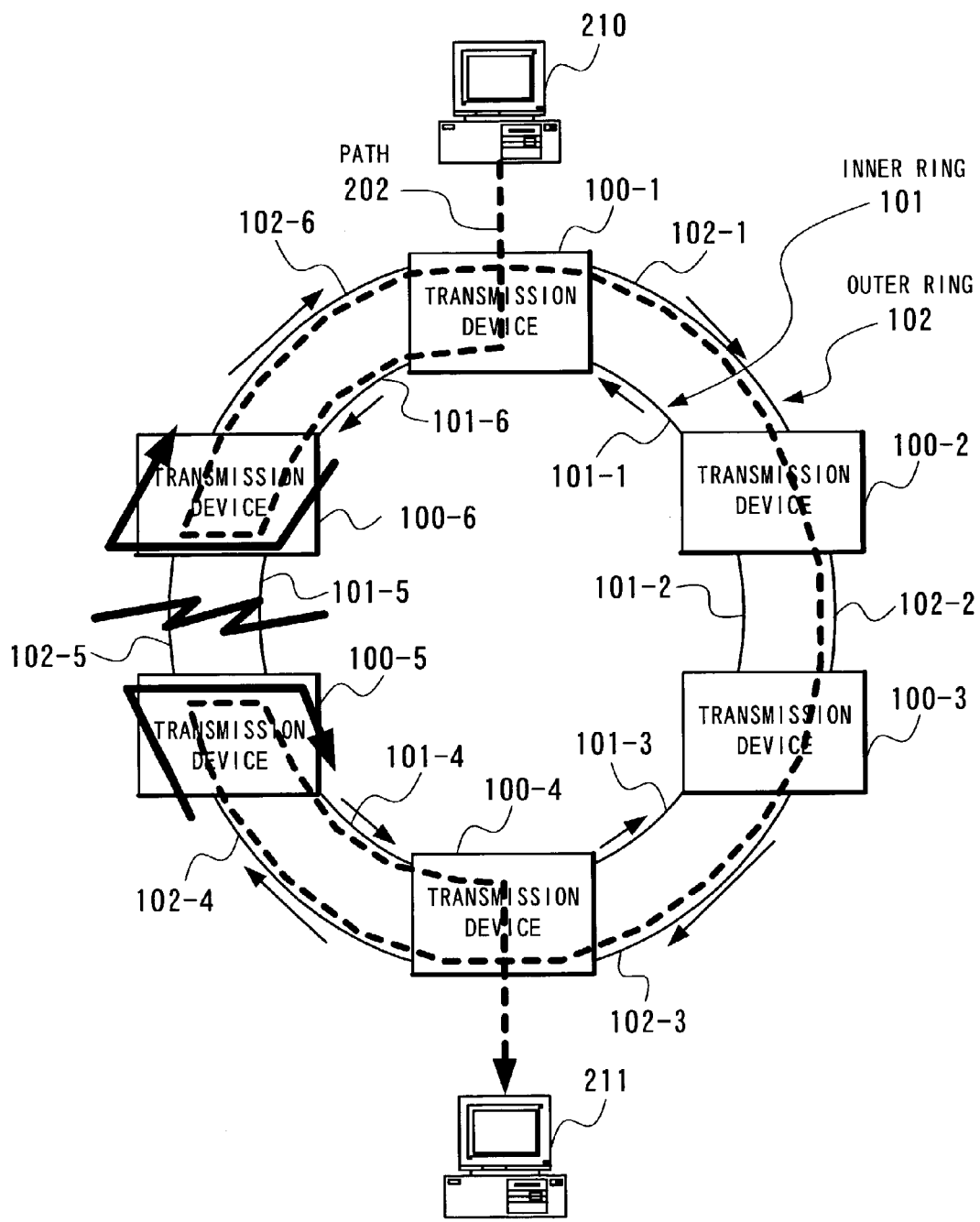
FIG. 23B is a diagram for use in explaining the conventional packet protection method.
Figure 24A:
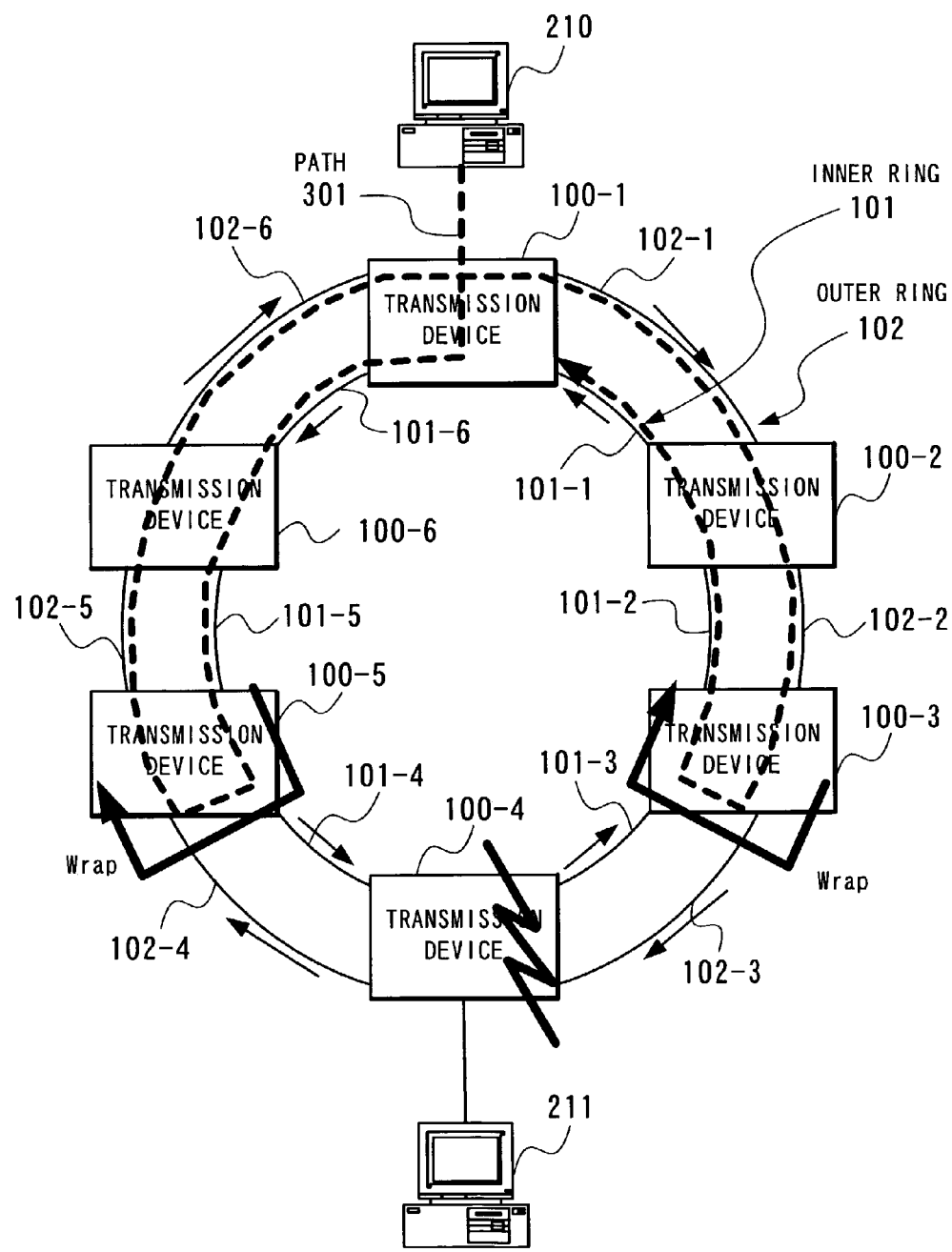
FIG. 24A is a diagram for use in explaining the conventional protection method at the time of a transmission device failure and a multiple failure.
Figure 24B:
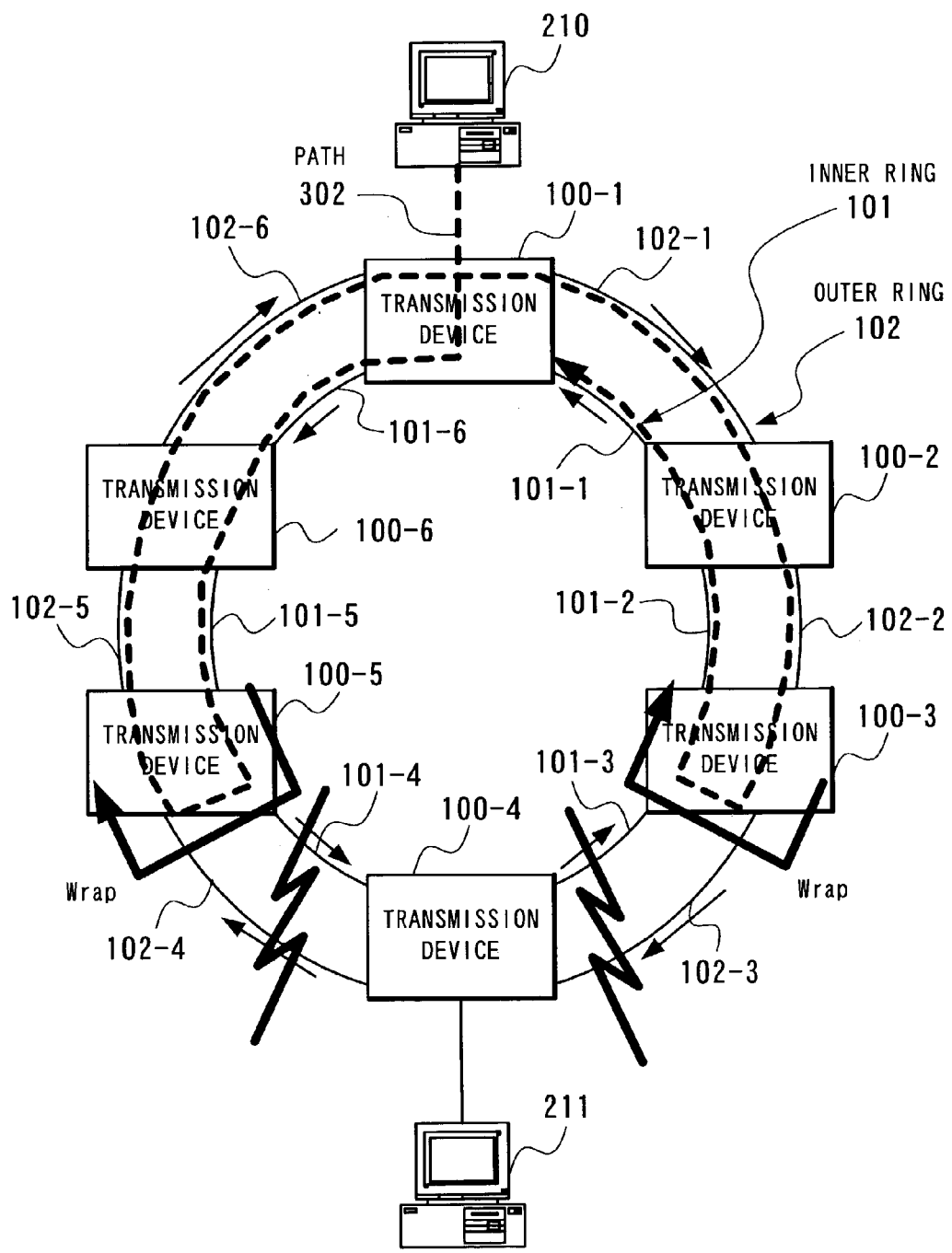
FIG. 24B is a diagram for use in explaining the conventional protection method at the time of a transmission device failure and a multiple failure.
Figure 25:
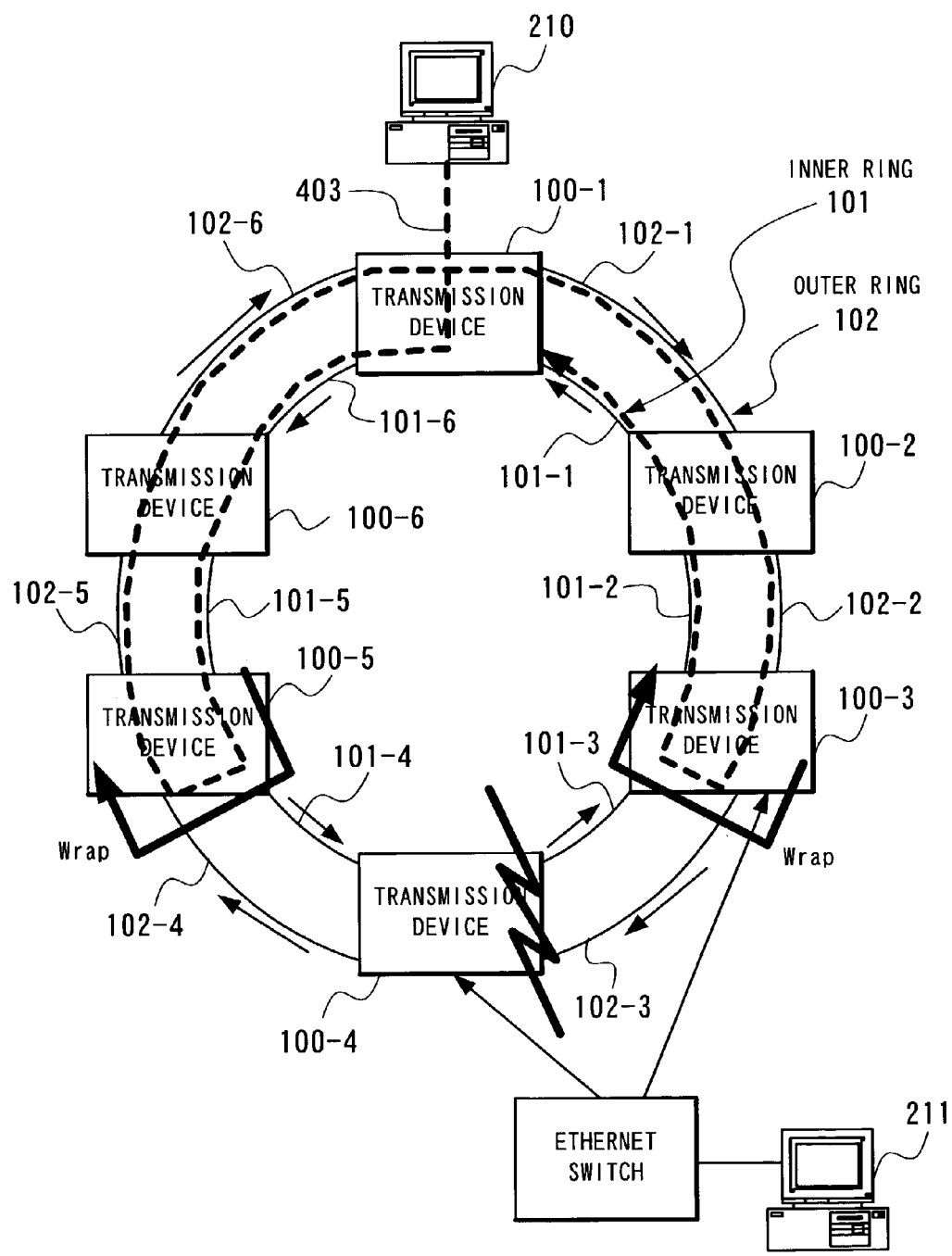
FIG. 25 is a diagram showing conventional protection for a failure at a transmission device dual homed to a terminal.

Upon receiving the protection path search packet, as shown by the flow chart of FIG. 21, the UNI-NNI ART 2110 in each of the transmission devices 2100-2, 2100-3, 2100-5 and 2100-6 determines whether the designated UNI address is reachable from its own transmission device or not (Step S251) and notifies the determination result to the transmission device 2100-1 through a path 2204 shown in FIG. 19B by using a protection path search response packet (Steps S252 and S253). More specifically, when the determination is made that the address is reachable (YES at Step S251), transmit a protection path search response packet indicative of being reachable to the transmission device 2100-1 (Step S252) and when the determination is made that it is unreachable (NO at Step S251), transmit a protection path search response packet indicative of being unreachable to the transmission device 2100-1 (Step S253). In the cases of examples shown in FIGS. 18A, 18B, 19A, 19B and 19C, only the transmission device 2100-3 transmits a protection path search response packet indicative of "being reachable" and the other transmission devices 2100-2, 2100-5 and 2100-6 transmit a protection path search response packet indicative of "being unreachable".

Upon receiving a protection path search response packet from each of the transmission devices 2100-2, 2100-3, 2100-5 and 2100-6, the UNI-NNI ARP 2110 in the transmission device 2100-1 determines whether there exists a protection path search response packet indicative of being reachable, that is, whether there exists a protection path or not (FIG. 20, Steps S242 and S243).

When there is no protection path (NO at Step S243), the processing ends. On the other hand, when there exists a protection path (YES at Step S243), select one of transmission source transmission devices of the protection path search response packet indicative of "being reachable" (Step S244). In the cases of the examples shown in FIGS. 18A, 18B, 19A, 19B and 19C, the transmission device 2100-3 is selected. Thereafter, at the time of conversion of a UNI packet into an NNI packet, when the NNI address of the transmission device 2100-4 is derived as a transmission destination NNI address based on the UNI packet, the UNI-NNI ART 2110 instructs the frame conversion unit 2130 to convert the UNI packet into an NNI packet including the NNI address of the transmission device 2100-4 as a transmission destination NNI address (Step S245).

Figure 19C:
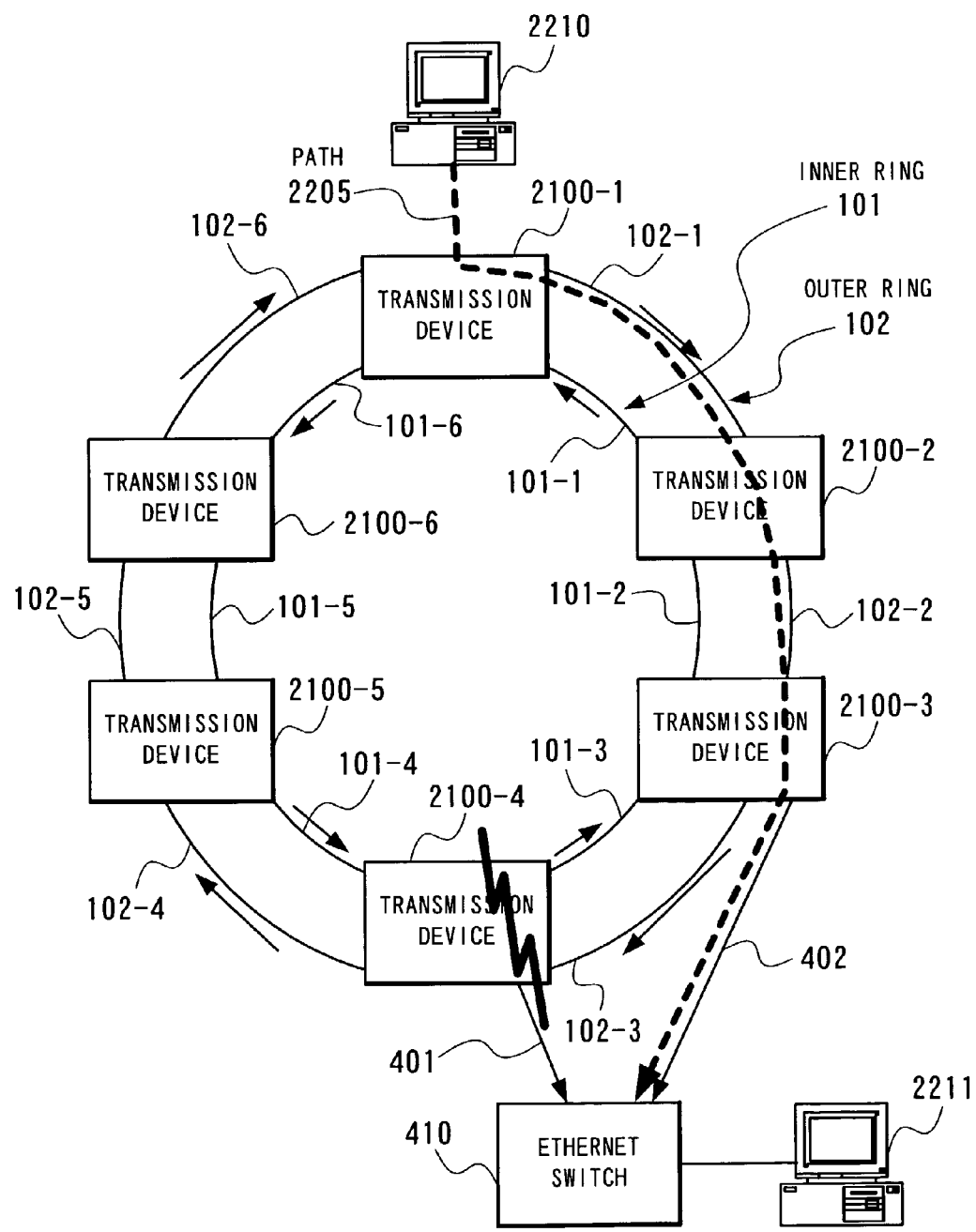
FIG. 19C is a diagram for use in explaining the fourth embodiment of the packet protection method in a ring network according to the present invention.

Hereinafter, a UNI packet from the terminal 2210 to the terminal 2211 is converted into an NNI packet at the transmission device 2100-1 and then transmitted through the transmission device 2100-2 to the transmission device 2100-3 where the packet is inversely converted into a UNI packet which will be transmitted to the terminal 2211 through a spare port 402 and an Ethernet switch 410 as shown in a path 2205 illustrated in FIG. 19C.

Upon receiving a protection path search packet, the UNI-NNI ART 2110 is allowed to refrain from transmitting a protection path search response packet when no terminal or no transmission device coincident with the UNI address in question exists. When receiving a protection path search response packet to find that a terminal coincident with the UNI address is connected to a plurality of transmission devices, select a transmission device whose number of hops is the smallest or a transmission device enabling transfer to be realized by using a least cost path and transfer an NNI packet whose transfer destination is the NNI address in question. Re-search of a protection path is conducted after a lapse of a certain time or when a UNI address whose transfer destination is an NNI address as a target of squelch is detected.

Transmission device realizing the same protection method can be realized not only by the structure shown in FIG. 17 but also by arranging the UNI-NNI ARP 2110 in the transmission devices 1400 and 1800 shown in FIGS. 10 and 14. In the case of the transmission device 1400 shown in FIG. 10, a protection path search response packet of the UNI-NNI ARP 2110 is transmitted and received to/from the Trb-UNI switches 160 and 161. When the transmission ring is different from a conventional path, the output port of the Trb-UNI switch 160 is changed by rewriting the UNI forwarding table 170. In addition, protection path search/search response packets of the transmission device 1800 in FIG. 14 are transmitted and received to/from the Trb-NNI switches 910 and 911. When the transmission ring is different from a conventional path, the output port of the Trb-NNI switch 910 is changed by rewriting the NNI forwarding table 920.

When a UNI packet which becomes unreachable due to a failure is thus allowed to detour by using other path than an NNI address to which transfer had been made before the occurrence of the failure, protection can be realized by using the protection path.

The transmission devices 500, 900, 1000, 1300, 1400, 1800 and 2100, though no description has been made with respect to the above-described embodiments, can be realized also by a computer. In this case, the computer reads a program recorded in a disk, a semiconductor memory or other recording medium to conduct the processing which has been described in each embodiment.

As described in the foregoing, the packet protection method in a ring network according to the present invention enables efficient use of network resources because either of NNI packets sent through an inner ring and through an outer ring are output to a tributary port as long as its transmission destination NNI address is one or any one of a plurality of NNI addresses applied to its own transmission device.

In addition, with the packet protection method in a ring network according to the present invention, when receiving a ring network failure information notification packet indicative of an input link in which a failure occurs, by making a transmission ring of an NNI packet which had been transmitted through the input link in question before the failure occurs be reverse to that used before the occurrence of the failure or when an NNI packet whose transmission source is its own transmission device is turned back, by making a transmission ring of an NNI packet whose transmission destination NNI address is the same as that of the NNI packet in question and whose transmission source is its own transmission device be reverse to a ring used so far, deterioration in network efficiency caused by wrapping can be prevented except for when immediately after the occurrence of the failure.

Moreover, the packet protection method in a ring network according to the present invention prevents an increase in useless traffic because when an NNI packet whose transmission source is its own transmission device returns after looping, an NNI packet whose transmission destination NNI address is the same as that of the NNI packet in question and whose transmission source is its own transmission device is squelched and when it is recognized based on a ring network failure information notification packet that an unreachable transmission device occurs, an NNI packet whose transmission source is its own transmission device and whose transmission destination NNI address is the NNI address of the unreachable transmission device in question is squelched.

Furthermore, the packet protection method in a ring network according to the present invention enables protection efficiency in the ring network to be increased by searching for a protection path by using a protection path search packet.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A method of packet protection in a ring network including a plurality of transmission devices, each of said plurality of transmission devices including a tributary port and are connected in a ring by an inner ring having a first packet transmission direction and an outer ring having a second packet transmission direction opposite said first packet transmission direction, said method of packet protection comprising:

reversing an initial packet transmission direction of a Network to Network Interface (NNI) packet that would have passed through a transmission link on which a transmission failure occurs at a first of said plurality of transmission devices having said failed transmission link as an output link, thereby reversing transmission direction of said NNI packet to one of said inner and said outer ring in said ring network;

receiving said NNI packet including a transmission destination address sent via said reversed transmission direction at a second of said plurality of transmission devices, said transmission destination address corresponding to said second of said plurality of transmission devices;

outputting said received NNI packet to a tributary port of said second of said plurality of transmission devices based on said receiving said NNI packet sent via said reversed transmission direction at said second of said plurality of transmission devices;

in one of two of said plurality of transmission devices having said failed transmission link as an input link, and connected to said transmission link in which said failure occurs, turning an NNI packet applied through one of said inner ring and said outer ring which fails to include said input link as a component back to one of said inner ring and said outer ring including said input link as a component;

converting, at each of said plurality of transmission devices, a UNI packet including a transmission destination UNI address which is applied through the tributary port into an NNI packet including a transmission destination NNI address;

sending the NNI packet to one of said outer ring and said inner ring;

determining when the ring network enters a state which makes a UNI packet including a certain transmission destination UNI address to be non-transmittable;

transmitting at each of said plurality of transmission devices a protection path search packet including said certain transmission destination UNI address to an other of said plurality of transmission devices;

receiving the protection path search packet at each of said other of said plurality of transmission devices;

determining whether said transmission device receiving said protection path search packet is connected to one of a terminal and a network including the transmission destination UNI address included in said protection path search packet;

returning protection path search response packet including a determination result, in response to said determining whether said transmission device receiving said protection path search packet is connected to one of a terminal and a network, to one of said plurality of transmission devices as a transmission source of said protection path search packet; and after receiving said protection path search response packet at said one of said plurality of transmission devices, and at a time of converting a UNI packet including said transmission destination UNI address into an NNI packet, taking, as a transmission destination NNI address of the NNI packet, an NNI address applied to any one of said plurality of transmission devices as transmission sources of the protection path search response packet indicating that one of said terminal and said network including said transmission destination UNI address is connected.

2. The method of packet protection method in a ring network as set forth in claim 1, further comprising:

detecting a failure at one of said plurality of transmission devices in an input transmission link connected to said one of said plurality of transmission devices;

transmitting, from said failure detecting transmission device, a ring network failure information notification packet indicative of the occurrence of the failure in said input transmission link to all other of said plurality of transmission devices ; and changing, at all of said plurality of transmission devices not connected to said transmission link in which the failure occurs, a transmission ring of an NNI packet whose transmission source is its own transmission device and that is initially addressed to be transmitted through said transmission link on which said transmission failure occurs.

3. The method of packet protection method in a ring network as set forth in claim 1, said method further comprising:

determining, at each of said plurality of transmission devices, that a received NNI packet comprises an NNI packet that is turned back by an other of said plurality of transmission devices; and changing a transmission ring of an NNI packet whose transmission source is its own transmission device and whose transmission destination NNI address is the same as the address of said received NNI packet into a reverse ring.

4. The method of packet protection method in a ring network as set forth in claim 1, said method further comprising:
- in one of two of said plurality of transmission devices connected to said transmission link in which said failure occurs having said failed transmission link as an input link, turning an NNI packet applied through one of said inner ring and said outer ring including said input link as a component;
- determining, at each of said plurality of transmission devices, that a received NNI packet is a loop NNI packet whose transmission source is its own transmission device and which is turned back after looping; and
- squelching an NNI packet whose transmission source is its own transmission device and whose transmission destination NNI address is the same as the address of said NNI packet.

5. The method of packet protection method in a ring network as set forth in claim 1, said method further comprising:
- detecting a failure in an input link of one of said plurality of transmission devices;
- transmitting a ring network failure information notification packet indicative of the occurrence of a failure in said input link to other transmission devices;
- turning an NNI packet applied through one of said inner ring and said outer ring which fails to include said input link as a component back to one of said inner ring and said outer ring including said input link as a component;
- recognizing when one of said plurality of transmission devices becomes unreachable based on a received ring network failure information notification packet; and
- squelching an NNI packet at each of said plurality of transmission devices whose transmission source is its own transmission device and whose transmission destination NNI address is an NNI address of an unreachable one of said plurality of transmission devices.

6. A transmission device connected to an input link and an output link of an inner ring and to an input link and an output link of an outer ring and including a tributary port, said transmission device comprising:
- means for, when a failure occurs in an output link of the inner ring connected to said transmission device, outputting a Network to Network Interface (NNI) packet applied through an input link of the inner ring in an first initial transmission direction to an output link of the outer ring in a direction opposite said first initial direction, and when a failure occurs in an output link of the outer ring connected to said transmission device, outputting an NNI packet applied through an input link of the outer ring in a second initial transmission direction to an output link of the inner ring in a direction opposite said second initial transmission direction; and
- means for, when receiving an NNI packet whose transmission destination NNI address corresponds to said transmission device, outputting said NNI packet from said transmission device received through one of the inner ring and the outer ring to the tributary port of said transmission device, based on receiving said NNI packet sent via said direction opposite said one of said first and said second initial transmission directions,
- wherein when there occurs a failure in an input link of said inner ring, outputs an NNI packet applied from sin input link of said outer ring to an output link of said inner ring,
- wherein when there occurs a failure in an input link of said outer ring, outputs an NNI packet applied from an input link of said inner ring to an output link of said outer ring,
- wherein when determining that the ring network enters a state which makes a UNI packet including a certain transmission destination UNI address is non-transmittable transmits a protection path search packet including said certain transmission destination when receiving a protection path search packet, determines whether one of a terminal and a network includes the transmission destination UNI address included in the protection path search packet in question is reachable, and returns a protection path search response packet including the determination result to a transmission device which has transmitted said protection path search packet through one of said inner ring and outer ring, and
- wherein when receiving said protection path search response packet, at the time of converting a UNI packet including said transmission destination UNI address into an NNI packet, taking, as a transmission destination NNI address of the NNI packet in question, an NNI address applied to any one transmission device among transmission devices as transmission sources of the protection path search response packet indicating that one of a terminal and a network includes said transmission destination UNI address is connected.

7. The transmission device as set forth in claim 6, wherein when a failure occurs in a link not connected to said transmission device, said transmission device changes a transmission ring of an NNI packet whose transmission source is its own transmission device and which had been transmitted through said link before the failure occurs in said link into on of said inner ring and said outer ring in a transmission direction reverse to one of said inner ring and said outer ring used before the occurrence of the failure.

8. The transmission device as set forth in claim 6, wherein when a received NNI packet is determined to he an NNI packet which is turned back by an other transmission device and whose transmission source is its own transmission device, thereinafter changes a transmission ring of an NNI packet whose transmission source is its own transmission device and whose transmission destination NNI address is the same as an address of said received NNI packet into a reverse ring.

9. The transmission device as set forth in claim 6, wherein
- when detecting a failure in an input link, turning an NNI packet applied through a ring using none of said input link as a component back to a ring using said input link as a component, and
  - wherein when determining that the ring network enters a state which makes an NNI packet include a certain NNI address as a transmission destination NNI address that is non-transmittable, thereinafter squelching an NNI packet whose transmission source is its own transmission device and whose transmission destination NNI address is the same as a transmission destination NNI address of said NNI packet.

10. The transmission device as set forth in claim 6, wherein when detecting a failure in an input link of said inner ring, thereinafter outputting an NNI packet applied from an input link of said outer ring to an output link of said inner ring,
- wherein when detecting a failure in an input link of said outer ring, thereinafter outputting an NNI packet applied from an input link of said inner ring to an output link of said outer ring, and wherein when there occurs a transmission device which becomes unreachable among outer transmission devices connected to its transmission device in a ring through said inner ring and said outer ring, squelching an NNI packet whose transmission source is its own transmission device and whose transmission destination NNI address is an NNI address of said unreachable transmission device.

11. A transmission device connected to an input link and an output link of an inner ring and to an input link and an output link of an outer ring and including a tributary port, said transmission device comprising:

a first link monitor that detects a failure in an input link of said inner ring;

a second link monitor that detects a failure in an input link of said outer ring;

a first Wrap switch that outputs a Network to Network Interface (NNI) packet applied through said input link of said inner ring to said output link of said inner ring at a time of a pass mode, and outputting an NNI packet applied through said input link of said inner ring to said output link of said outer ring at a time of a Wrap mode;

a second Wrap switch that outputs an NNI packet applied through said input link of said outer ring to said output link of said outer ring at the time of the pass mode and outputting an NNI packet applied through said input link of said outer ring to said output link of said inner ring at the time of the Wrap mode;

a first Agg-Packet switch that holds one of one and a plurality of NNI addresses corresponding to said transmission device and when a transmission destination NNI address of an NNI packet applied through said input link of said inner ring is said one of one and any one of the plurality of NNI addresses corresponding to said transmission device, outputting said NNI packet to said tributary port;

a second Agg-Packet switch that holds one of one and a plurality of NNI addresses corresponding to said transmission device and when a transmission destination NNI address of an NNI packet applied through said input link of said outer ring is said one of one and said any one of the plurality of NNI addresses corresponding to said transmission device, outputting said NNI packet to said tributary port; and a first failure information collection and failure section specifying unit that outputs, when one of said first link monitor and said second link monitor detects a link transmission failure, a ring network failure information notification packet indicative of a failure transmission link section to said output link of one of said inner ring and said output link of said outer ring, and when a ring network failure information notification packet is applied through said input link of one of said inner ring and through said input link of said outer ring, wherein if said ring network failure information notification packet indicates the occurrence of a link transmission failure in said output link of the inner ring connected to said transmission device, changing said first Wrap switch to the Wrap mode, and if said ring network failure information notification packet indicates the occurrence of a link transmission failure in said output link of the outer ring connected to its transmission device, changing said second Wrap switch to the Wrap mode, a first Loop detector that determines whether an NNI packet applied to said input link of said inner ring is a loop NNI packet returned after being output from said output link of said inner ring to loop;

a second Loop detector that determines whether an NNI packet applied to said input link of said outer ring is a loop NNI packet returned after being output from said output link of said outer ring to loop; and a squelch circuit for, when the determination is made by one of said first Loop detector and said second Loop detector, that the packet is a loop NNI packet, squelching an NNI packet whose transmission source is said transmission device and whose transmission destination NNI address is the same as a transmission destination NNI address of said loop NNI packet, and a UNI-NNI ARP for, when determining that the ring network enters a state which makes a UNI packet including a certain transmission destination UNI address non-transmittable, transmitting a protection path search packet including said certain transmission destination UNI address to other transmission device, when receiving a protection path search packet, determining whether one of a terminal and a network including the transmission destination UNI address included in the protection path search packet in question is reachable, and returning a protection path search response packet including the determination result to a transmission device which has transmitted said protection path search packet through one of said inner ring and outer ring, and when receiving said protection path search response packet, at a time of converting a UNI packet including said transmission destination UNI address into an NNI packet taking, as a transmission destination NNI address of the NNI packet, an NNI address applied to any one transmission device among transmission devices as transmission sources of the protection path search response packet indicating that one of a terminal and a network having said transmission destination UNI address is connected.

12. The transmission device as set forth in claim 11, wherein said first and said second Agg-Packet switches are configured to hold a first and a second NNI address, said transmission device further comprising:

a first frame conversion unit that converts an applied UNI packet into an NNI packet including said first NNI address as a transmission source NNI address and outputting the convened NNI packet to said output link of said inner ring trough said first Wrap switch;

a second frame conversion unit tat converts an applied NNI packet into an NNI packet including said second NNI address as a transmission source NNI address and outputting the converted NNI packet to said output link of said outer ring trough said second Wrap switch;

a UNI forwarding table in which a transmission destination UNI address of a UNI packet applied through said tributary port and information indicative of a transmission ring of an NNI packet converted from the UNI packet should be transmitted on one of the outer ring and the inner ring are registered corresponding to each other;

a Tributary (Trb)-UNI switch that refers to said UNI forwarding table when a UNI packet is applied through said tributary port, and when information indicative of said inner ring is registered corresponding to a transmission destination UNI address of said UNI packet, transferring said UNI packet to said first frame conversion unit and when information indicative of said outer ring is registered, transferring said UNI packet to said second frame conversion unit; and wherein when said ring network failure information notification packet applied through one of said input link of said inner ring and said input link of said outer ring indicates the occurrence of a transmission failure in a link not connected to said transmission device, said failure information collection and failure section specifying unit rewrites said UNI forwarding table such that a transmission ring of an NNI packet whose transmission source is its own transmission device and which had been transmitted through said link before the transmission failure occurs in said link is reversed to a ring used before the failure occurs in said link.

13. The transmission device as set forth in claim 11, further comprising:

in place of said first Agg-Packet switch, a third Agg-Packet switch that holds an NNI address applied to said transmission device and when a transmission destination NNI address of an NNI packet applied through said input link of said inner ring is the NNI address applied to said transmission device, outputting said NNI packet to said tributary port;

in place of said second Agg-Packet switch, a fourth Agg-Packet switch that holds an NNI address applied to its own transmission device and when a transmission destination NNI address of an NNI packet applied through an input link of said outer ring is the NNI address applied to said transmission device, outputting said NNI packet to said tributary port;

a frame conversion unit that converts an input UNI packet into an NNI packet including the NNI address corresponding to said transmission device as a transmission source NNI address and including an address obtained based on a transmission destination UNI address of said UNI packet as a transmission destination NNI address;

an NNI forwarding table in which a transmission destination NNI address of an NNI packet output from the frame conversion unit and information indicative of whether the NNI packet should be sent out through one of said inner ring and said outer ring are registered corresponding to each other;

a Tributary (Trb)-NNI switch that determines, when an NNI packet is output from said frame conversion unit, whether said NNI packet is to be transmitted using one of the inner ring and the outer ring based on a transmission destination NNI address of the NNI packet in question and the contents of said NNI forwarding table, and if the determination is made that transmission is to be made using the inner ring, outputting said NNI packet to said output link of said inner ring through said first Wrap switch, and if the determination is made that transmission is to be made using the outer ring, outputting said NNI packet to the output link of said outer ring through said second Wrap switch; and in place of said first failure information collection and failure section specifying unit, a second failure information collection and failure section specifying unit that outputs, when one of said first link monitor and said second link monitor detects a failure, said ring network failure information notification packet indicative of a transmission failure section to one of said output link of said inner ring and said output link of said outer ring, and when said ring network failure information notification packet is applied through one of said input link of said inner ring and said input link of said outer ring, if said ring network failure information notification packet indicates the occurrence of a transmission failure in said output link of the inner ring connected to said transmission device, changing said first Wrap switch to the Wrap mode, if said ring network failure information notification packet indicates the occurrence of a transmission failure in said output link of the outer ring connected to said transmission device, changing said second Wrap switch to the Wrap mode and if said ring network failure information notification packet applied through one of said input link of said inner ring and said input link of said outer ring indicates the occurrence of a transmission failure in a link not connected to said transmission device, rewriting said NNI forwarding table such that a transmission ring of an NNI packet whose transmission source is said transmission device and which had been transmitted Through said transmission link before the transmission failure occurs in said link is reversed to the ring used before the occurrence of the transmission failure.

14. The transmission device as set forth in claim 13, further comprising:

in place of one of said first and said second failure information collection and failure section specifying unit, a third failure information collection and failure section specifying unit for, when one of said first link monitor and said second link monitor detects a transmission failure, outputting said ring network failure information notification packet indicative of a failure section to said output link of one of said inner ring and said output link of said outer ring, and when said ring network failure information notification packet is applied through one of said input link of said inner ring and through said input link of said outer ring, if said ring network failure information notification packet indicates the occurrence of a transmission failure in said output link of the inner ring connected to its transmission device, changing said first Wrap switch to the Wrap mode, and if said ring network failure information notification packet indicates the occurrence of a transmission failure in said output link of the outer ring connected to its transmission device, changing said second Wrap switch to the Wrap mode;

a first Wrap detector that determines whether an NNI packet applied from said input link of said inner ring is a return NNI packet turned back by other transmission device after being output from said output link of said outer ring, and when the determination is made that the packet is a return NNI packet, updating said NNI forwarding table such that thereinafter a transmission ring of an NNI packet whose transmission source is said transmission device and whose transmission destination is the same as a transmission destination of said return NNI packet is reversed to the transmission ring used before; and a second Wrap detector that determines whether an NNI packet applied from said input link of said outer ring is a return NNI packet turned back by other transmission device after being output from said output link of said inner ring, and when the determination is made that the packet is a return NNI packet, updating said NNI forwarding table such that thereinafter a transmission ring of an NNI packet whose transmission source is said transmission device and whose transmission destination is the same as a transmission destination of said return NNI packet is reversed to the transmission ring used before.

15. The transmission device as set forth in claim 13, further comprising:

in place of said first and second failure information collection and failure sector specifying unit, a third failure information collection and squelch determination unit for, when one of said first link monitor and said second link monitor detects a transmission failure, outputting said ring network failure information notification packet indicative of a failure section to said output link of one of said inner ring and said output link of said outer ring, when said ring network failure information notification packet is one of applied through said input link of said inner ring and through an input link of said outer ring, if said ring network failure information notification packet indicates the occurrence of a transmission failure in said output link of the inner ring connected to its transmission device, changing said first Wrap switch to the Wrap mode and if said ring network failure information notification packet indicates the occurrence of a transmission failure in said output link of the outer ring connected to its transmission device, changing said second Wrap switch to the Wrap mode, and when there occurs a transmission device which becomes unreachable among other transmission devices connected to its transmission device one of through said inner ring and said outer ring, squelching of an NNI packet whose transmission source is said transmission device and whose transmission destination NNI address is an NNI address of said unreachable transmission device; and a squelch circuit that squelches an NNI packet according to said third instruction of said failure information collection and squelch determination unit.

16. The transmission device as set forth in claim 11, wherein said first and said second Agg-Packet switches are configured to hold a first and a second NNI address, said transmission device Thither comprising:

a first frame conversion unit that converts an applied UNI packet into an NNI packet including said first NNI address as a transmission source NNI address and outputting the converted NNI packet to said output link of said inner ring through said first Wrap switch;

a second frame conversion unit that converts an applied NNI packet into an NNI packet including said second NNI address as a transmission source NNI address and outputting the convened NNI packet to said output Link of said outer ring through said second Wrap switch, a UNI forwarding table in which a transmission destination UNI address of a UNI packer applied through said tributary port and information indicative of a transmission ring of an NNI packet convened from the UNI packet should be transmitted on one of the outer ring and the inner ring are registered corresponding to each other;

a Tributary (Trb)-UNI switch that refers to said UNI forwarding table when a UNI packet is applied through said tributary port, and if information indicative of said inner ring is registered corresponding to a transmission destination UNI address of said UNI packet, transferring said UNI packet to said first frame conversion unit and if information indicative of said outer ring is registered, transferring said UNI packet to said second frame conversion unit;

a first Wrap detector that determines whether an NNI packet applied from said input link of said inner ring is a return NNI packet turned back by other transmission device after being output from said output link of said outer ring, and when the determination is made that the packet is a return back NNI packet, updating said UNI forwarding table such that thereinafter a transmission ring of an NNI packet whose transmission source is said transmission device and whose transmission destination is the same as a transmission destination of said return NNI packet is reversed to the ring used before; and a second Wrap detector that determines whether an NNI packet applied from said input link of said outer ring is a return NNI packet turned back by other transmission device after being output from said output link of said inner ring, and when the determination is made that the packet is a return NNI packet, updating said UNI forwarding table such that thereinafter a transmission ring of an NNI packet whose transmission source is said transmission device and whose transmission destination is the same as a transmission destination of said return NNI packet is reversed to the ring used before.

17. A programmable storage medium tangibly embodying a program of machine-readable instructions executable by a digital processing apparatus to perform operations supporting a method of controlling a transmission device connected to an input link and an output link of an inner ring and to an input link and an output link of an outer ring and including a tributary port, the operations comprising:

when a transmission failure occurs in said output link of the inner ring connected to said transmission device, outputting a Network to Network Interface (NNI) packet applied through said input link of the inner ring to said output link of the outer ring, and when a transmission failure occurs in said output link of the outer ring connected to said transmission device, outputting an NNI packet applied through said input link of the outer ring to said output link of the inner ring;

when receiving at said transmission device an NNI packet whose transmission destination NNI address corresponds to one of any one of a plurality of NNI addresses applied to its own transmission device, outputting said NNI packet through one of the inner ring and the outer ring, and the tributary port of said transmission device based on receiving said NNI packet sent via one of said output link of said inner ring and said output link of said outer ring, when there occurs a transmission failure in said input link of said inner ring, outputting an NNI packet applied from said input link of said outer ring to said output link of said inner ring;

when there occurs a transmission failure in said input link of said outer ring, outputting an NNI packet applied from said input link of said inner ring to said output link of said outer ring;

when determining that the ring network enters a state which makes a UNI packet including a certain transmission destination UNI address non-transmittable, transmitting a protection path search packet including said certain transmission destination UNI address to an other transmission device;

when receiving a protection path search packet determining whether one of a terminal and a network including the transmission destination UNI address included in the protection path search packet in question is reachable, and returning a protection path search response packet including the determination result to a transmission device which has transmitted said protection path search packet through one of said inner ring and outer ring; and when receiving said protection path search response packet, at a time of converting a UNI packet including said transmission destination UNI address into an NNI packet, taking, as a transmission destination NNI address of the NNI packet, an NNI address applied to any one transmission device among transmission devices as transmission sources of the protection path search response packet indicating that one of a terminal and a network including said transmission destination UNI address is connected.

18. The programmable storage medium tangibly embodying a program of machine-readable instructions as set forth in claim 17, the operations further comprising:

when a transmission failure occurs in a link not connected to said transmission device, thereinafter changing a transmission ring of an NNI packet whose transmission source is its own transmission device and which had been transmitted through said link before the failure occurs in said link into a ring reverse to the ring used before the occurrence of the failure.

19. The programmable storage medium tangibly embodying a program of machine-readable instructions as set forth in claim 17, the operations further comprising:

when a received NNI packet is determined to be an NNI packet which is turned back by an other transmission device and whose transmission source is said transmission device, thereinafter changing a transmission ring of an NNI packet whose transmission source is said transmission device and whose transmission destination NNI address is the same as an address of said received NNI packet into a reverse ring.

20. The programmable storage medium tangibly embodying a program of machine-readable instructions as set forth in claim 17, the operations further comprising:

when detecting a transmission failure in said input link, turning an NNI packet applied through a ring using none of said input link as a component back to a ring using said input link as a component; and when determining that the ring network enters a state which makes an NNI packet including a certain NNI address as a transmission destination NNI address non-transmittable, squelching an NNI packet whose transmission source is said transmission device and whose transmission destination NNI address is the same as a transmission destination NNI address of said NNI packet.

21. The programmable storage medium tangibly embodying a program of machine-readable instructions as set forth in claim 17, the operations further comprising:

when detecting a transmission failure in said input link of said inner ring, thereinafter outputting an NNI packet applied from said input link of said outer ring to said output link of said inner ring;

when detecting a transmission failure in said input link of said outer ring, thereinafter outputting an NNI packet applied from said input link of said inner ring to said output link of said outer ring; and when a transmission device becomes unreachable in a ring through said inner ring and said outer ring, squelching an NNI packet whose transmission source is said transmission device and whose transmission destination NNI address is an NNI address of said unreachable transmission device.

* * * * *